(12) United States Patent
Zhang et al.

(10) Patent No.: US 12,543,310 B2
(45) Date of Patent: Feb. 3, 2026

(54) THREE-DIMENSIONAL MEMORY DEVICES AND FABRICATING METHODS THEREOF

(71) Applicant: Yangtze Memory Technologies Co., Ltd., Hubei (CN)

(72) Inventors: Kun Zhang, Hubei (CN); Wenxi Zhou, Hubei (CN); Zhiliang Xia, Hubei (CN); Zongliang Huo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 849 days.

(21) Appl. No.: 17/704,740

(22) Filed: Mar. 25, 2022

(65) Prior Publication Data

US 2023/0069778 A1 Mar. 2, 2023

Related U.S. Application Data

(63) Continuation of application No. PCT/CN2021/115299, filed on Aug. 30, 2021.

(51) Int. Cl.
*H01L 29/76* (2006.01)
*G11C 16/04* (2006.01)
(Continued)

(52) U.S. Cl.
CPC ......... *H10B 43/27* (2023.02); *G11C 16/0483* (2013.01); *H10B 41/10* (2023.02);
(Continued)

(58) Field of Classification Search
CPC ........ H10B 43/27; H10B 41/10; H10B 43/10; H10B 41/27
See application file for complete search history.

(56) References Cited

U.S. PATENT DOCUMENTS

| 11,257,831 B2 | 2/2022 | Xu et al. |
| 2017/0104000 A1 | 4/2017 | Park et al. |
| (Continued) | | |

FOREIGN PATENT DOCUMENTS

| CN | 111052381 A | 4/2020 |
| CN | 112106198 A | 12/2020 |
| (Continued) | | |

OTHER PUBLICATIONS

International Search Report of the International Searching Authority directed to related International Patent Application No. PCT/CN2021/115299, mailed May 26, 2022; 5 pages.
(Continued)

*Primary Examiner* — Ismail A Muse
(74) *Attorney, Agent, or Firm* — HANLEY, FLIGHT & ZIMMERMAN, LLC

(57) ABSTRACT

Embodiments of three-dimensional (3D) memory devices and fabricating methods thereof are disclosed. A disclosed 3D memory device can comprise an alternating conductive/dielectric stack on a substrate, a plurality of channel structures in the alternating conductive/dielectric stack, and a plurality of gate line slit (GLS) structures in the alternating conductive/dielectric stack. Each GLS structure can include a plurality of first type GLS portions penetrating the alternating conductive/dielectric stack, and a plurality of second type GLS portions in an upper portion of the alternating conductive/dielectric stack.

20 Claims, 54 Drawing Sheets

(51) Int. Cl.
    *H10B 41/10*     (2023.01)
    *H10B 41/27*     (2023.01)
    *H10B 41/35*     (2023.01)
    *H10B 43/10*     (2023.01)
    *H10B 43/27*     (2023.01)
    *H10B 43/35*     (2023.01)

(52) U.S. Cl.
    CPC ............ *H10B 41/27* (2023.02); *H10B 41/35* (2023.02); *H10B 43/10* (2023.02); *H10B 43/35* (2023.02)

(56) References Cited

U.S. PATENT DOCUMENTS

| | | | |
|---|---|---|---|
| 2017/0179154 A1* | 6/2017 | Furihata | H10D 89/911 |
| 2018/0342557 A1 | 11/2018 | Mori | |
| 2019/0043889 A1* | 2/2019 | Park | H10B 43/10 |
| 2019/0081059 A1 | 3/2019 | Xu et al. | |
| 2021/0005625 A1* | 1/2021 | Dai | H10B 43/35 |

FOREIGN PATENT DOCUMENTS

| | | |
|---|---|---|
| CN | 112768459 A | 5/2021 |
| CN | 112885841 A | 6/2021 |

OTHER PUBLICATIONS

International Searching Authority, "International Preliminary Report on Patentability," issued in connection with International Patent Application No. PCT/CN2021/115299, mailed on Mar. 5, 2024, 4 pages.

State Intellectual Property Office of People's Republic of China, "First Examination Action," issued in connection with China Patent Application No. 202180003247.7, mailed on Jul. 7, 2025, 12 pages. [English language machine translation included.]

* cited by examiner

THREE-DIMENSIONAL MEMORY DEVICES AND FABRICATING METHODS THEREOF

CROSS REFERENCE TO RELATED APPLICATIONS

This application is a continuation of International Application No. PCT/CN2021/115299, filed on Aug. 30, 2021, which is incorporated herein by reference in its entirety.

TECHNICAL FIELD

The present disclosure generally relates to the field of semiconductor technology, and more particularly, to a method for forming a three-dimensional (3D) memory device.

BACKGROUND

Planar memory cells are scaled to smaller sizes by improving process technology, circuit design, programming algorithm, and fabrication process. However, as feature sizes of the memory cells approach a lower limit, planar process and fabrication techniques become challenging and costly. As such, memory density for planar memory cells approaches an upper limit. A three-dimensional (3D) memory architecture can address the density limitation in planar memory cells.

As semiconductor technology advances, 3D memory devices, such as 3D NAND memory devices, keep scaling more film layers to improve the area utilization of wafers. In some existing 3D NAND memory devices, as the number of film layers increases and the structure of the film layer becomes more complicated, the silicon substrate used as a carrier of the film layers may not support the wafer deformation caused by film stresses, which may eventually lead to an arcing of the wafer. Further, as the number of oxide/nitride (ON) layers increases, an etch depth of gate line slit (GLS) increases accordingly, resulting a risk of unstable structure due to stress and other factors. Such unstable structure may cause memory finger collapse and affect subsequent 3D memory device fabricating processes, such as increasing overlay error in the lithographic alignment process.

BRIEF SUMMARY

Embodiments of three-dimensional (3D) memory devices and fabricating methods thereof are disclosed herein.

One aspect of the present disclosure provides a three-dimensional (3D) memory device, comprising: an alternating conductive/dielectric stack on a substrate; a plurality of channel structures in the alternating conductive/dielectric stack; a plurality of gate line slit (GLS) structures in the alternating conductive/dielectric stack, each including: a plurality of first type GLS portions penetrating the alternating conductive/dielectric stack, and a plurality of second type GLS portions in an upper portion of the alternating conductive/dielectric stack.

In some embodiments, the plurality of first type GLS portions and the plurality of second type GLS portions are arranged in staggered positions next to each other in a bit line direction.

In some embodiments, the 3D memory device further comprises a memory block including at least three memory fingers; wherein two GLS structures are located on edges of the memory block. In some embodiments, each second type GLS portion of one of the two GLS structures is aligned with another second type GLS portion of another of the two GLS structures in a bit line direction. In some embodiments, each second type GLS portion of one of the two GLS structures overlaps with a first type GLS portion of another of the two GLS structures in a bit line direction.

In some embodiments, the 3D memory device further comprises a memory block including at least three memory fingers; wherein a middle memory finger is sandwiched by two GLS structures. In some embodiments, each second type GLS portion of one of the two GLS structures is aligned with another second type GLS portion of another of the two GLS structures in a bit line direction. In some embodiments, each second type GLS portion of one of the two GLS structures overlaps with a first type GLS portion of another of the two GLS structures in a bit line direction.

In some embodiments, the 3D memory device further comprises a memory block including at least three memory fingers; wherein each memory finger is sandwiched by two GLS structures. In some embodiments, each second type GLS portion of one GLS structure overlaps with a first type GLS portion in an adjacent second type GLS structures in a bit line direction, and is aligned with another second type GLS portion in a next GLS structure in the bit line direction. In some embodiments, each second type GLS portion of one GLS structure located on an edge of the memory block overlaps with a first type GLS portion in an adjacent second type GLS structures in a bit line direction, and is aligned with another second type GLS portion in another GLS structure located on another edge of the memory block in the bit line direction.

In some embodiments, a length of the second type GLS portion along a word line direction is equal to or less than a half width of a memory finger in a bit line direction.

In some embodiments, a conductive wall in the second type GLS portion is in contact with a conductive wall in the first type GLS portion along the WL direction.

In some embodiments, each channel structures comprises: a functional layer on a sidewall of a channel hole; a dielectric filling structure in each channel hole; and a channel layer between the functional layer and the dielectric filling.

Another aspect of the present disclosure provides a method for forming a three-dimensional (3D) memory device, comprising: forming a lower alternating dielectric stack on a substrate; forming an upper alternating dielectric stack on the lower alternating dielectric stack, and forming a plurality of sacrificial structures in the upper alternating dielectric stack; forming a plurality of gate line slits (GLSs), each including: a plurality of first type GLS segments penetrating the upper alternating dielectric stack and the lower alternating dielectric stack, and a plurality of second type GLS segments in the upper alternating conductive/dielectric stack; transforming the upper alternating dielectric stack and the lower alternating dielectric stack into an alternating conductive/dielectric stack; and forming a GLS structure in each GLS.

In some embodiments, forming the plurality of GLS includes forming the plurality of first type GLS portions and the plurality of first type GLS portions in a staggered positions next to each other in a bit line direction.

In some embodiments, forming the GLS structure in each GLS including: forming a plurality of first type GLS portions in the plurality of first type GLS segments, each first type GLS portion penetrating the alternating conductive/dielectric stack, and forming a plurality of second type GLS portions in the plurality of second type GLS segments, each second type GLS portion extends in the upper alternating conductive/dielectric stack.

In some embodiments, forming the an upper alternating dielectric stack and the plurality of sacrificial structures includes: forming one or more dielectric layer pairs on the lower alternating dielectric stack; forming a plurality of recesses in the one or more dielectric layer pairs; forming a sacrificial structure in each recess; and forming one or more additional dielectric layer pairs to cover the plurality of sacrificial structures.

In some embodiments, forming the plurality of GLSs includes: forming the plurality of first type and the plurality of second type GLS segments in a same etching process, wherein an etching ratio of the dielectric pairs is larger than an etching ratio of the sacrificial structures.

In some embodiments, the method further comprises: before forming the upper alternating dielectric stack, forming a plurality of sacrificial lower channel filling structures in the lower alternating dielectric stack; and after forming the upper alternating dielectric stack, forming a plurality of channel structures penetrating the upper alternating dielectric stack and the lower alternating dielectric stack by removing the plurality of sacrificial lower channel filling structures and portions of the upper alternating dielectric stack corresponding to the plurality of sacrificial lower channel filling structures.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
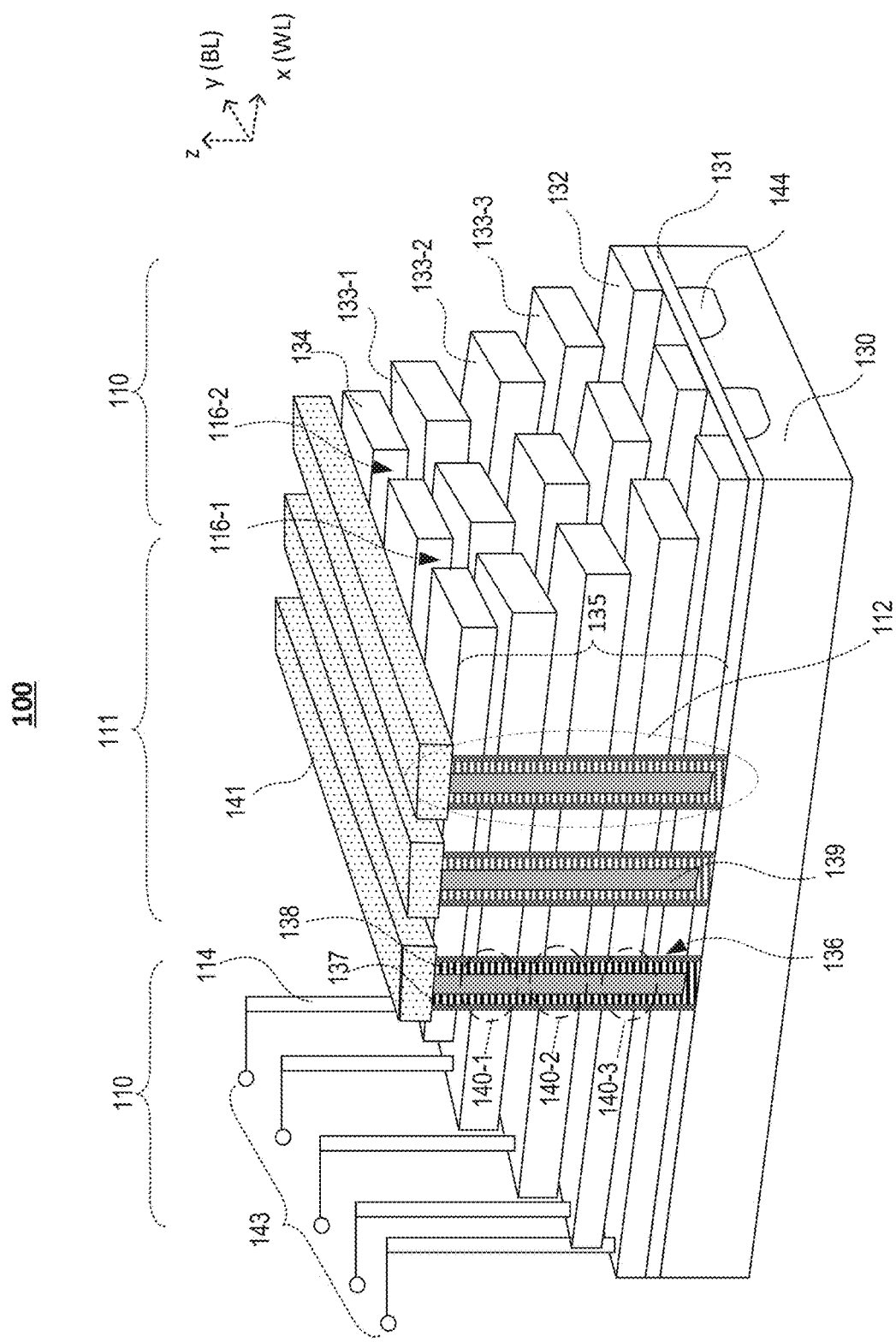
FIG. 1 illustrates a schematic diagram of a 3D memory device in a perspective view in accordance with some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "substrate" refers to a material onto which subsequent material layers are added. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer can extend over the entirety of an underlying or overlying structure, or may have an extent less than the extent of an underlying or overlying structure. Further, a layer can be a region of an Homogeneous or inhomogeneous continuous structure that has a thickness less than the thickness of the continuous structure. For example, a layer can be located between any pair of lateral planes between, or at, a top surface and a bottom surface of the continuous structure. A layer can extend laterally, vertically, and/or along a tapered surface. A substrate can be a layer, can include one or more layers therein, and/or can have one or more layer thereupon, thereabove, and/or therebelow. A layer can include multiple layers. For example, an interconnection layer can include one or more conductor and contact layers (in which contacts, interconnect lines, and/or vias are formed) and one or more dielectric layers.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

As used herein, the term "3D memory device" refers to a semiconductor device with vertically-oriented strings of memory cell transistors (i.e., region herein as "memory strings," such as NAND strings) on a laterally-oriented substrate so that the memory strings extend in the vertical direction with respect to the substrate. As used herein, the term "vertical/vertically" means nominally perpendicular to a lateral surface of a substrate.

Various embodiments in accordance with the present disclosure provide a method for forming a 3D memory device with a novel design for strengthen a structure of Gate Line Slit (GLS) structure for a memory array (also referred to herein as an "array device").

FIG. 1 illustrates a perspective view of a portion of an exemplary three-dimensional (3D) memory array structure 100, according to some existing 3D NAND memory. The memory array structure 100 includes a substrate 130, an insulating film 131 over the substrate 130, a tier of bottom select gates (BSGs) 132 over the insulating film 131, and a plurality of tiers of control gates 133, also referred to as "word lines" (WLs) stacking on top of the BSGs 132 to form a film stack 135 of alternating conductive and dielectric layers. The dielectric layers adjacent to the tiers of control gates are not shown in FIG. 1 for clarity.

The control gates of each tier are separated by slit structures 116-1 and 116-2 through the film stack 135. The memory array structure 100 also includes a tier of top select gates (TSGs) 134 over the stack of control gates 133. The stack of TSGs 134, control gates 133 and BSGs 132 is also referred to as "gate electrodes." The memory array structure 100 further includes memory strings 112 and doped source line regions 144 in portions of substrate 130 between adjacent BSGs 132. Each memory strings 112 includes a channel hole 136 extending through the insulating film 131 and the film stack 135 of alternating conductive and dielectric layers. Memory strings 112 also includes a memory film 137 on a sidewall of the channel hole 136, a channel layer 138 over the memory film 137, and a core filling film 139 surrounded by the channel layer 138. A memory cell 140 can be formed at the intersection of the control gate 133 and the memory string 112. A portion of the channel layer 138 underneath the control gate 133 is also referred to as the channel of the memory cell 140. The memory array structure 100 further includes a plurality of bit lines (BLs) 141 connected with the memory strings 112 over the TSGs 134. The memory array structure 100 also includes a plurality of metal interconnect lines 143 connected with the gate electrodes through a plurality of contact structures 114. The edge of the film stack 135 is configured in a shape of staircase to allow an electrical connection to each tier of the gate electrodes.

To pursue higher storage capacity in a 3D memory, the number of memory cells and the dimensions of memory blocks have been increased greatly. As a result, the distance from the memory cells in the middle of each memory block to the contact structures at the end of word lines also increases, leading to larger parasitic resistance and slower read/write speed. To resolve this issue, staircase structures (SS) can be formed in the middle regions of each memory block, where a set of contact structures and metal interconnect lines can be formed for each set of staircase structure. However, to form electrical connections between the word lines located in the middle regions of the memory blocks and word-liner driver circuits located in the peripheral region, layout of metal interconnect lines is complicated and can induce routing congestion and increase manufacturing cost.

In FIG. 1, for illustrative purposes, three tiers of control gates 133-1, 133-2, and 133-3 are shown together with one tier of TSG 134 and one tier of BSG 132. In this example, each memory string 112 can include three memory cells 140-1, 140-2 and 140-3, corresponding to the control gates 133-1, 133-2 and 133-3, respectively. The number of control gates and the number of memory cells can be more than three to increase storage capacity. The memory array structure 300 can also include other structures, for example, TSG cut structures, common source contacts and dummy memory strings, etc. These structures are not shown in FIG. 1 for simplicity.

Figure 2:
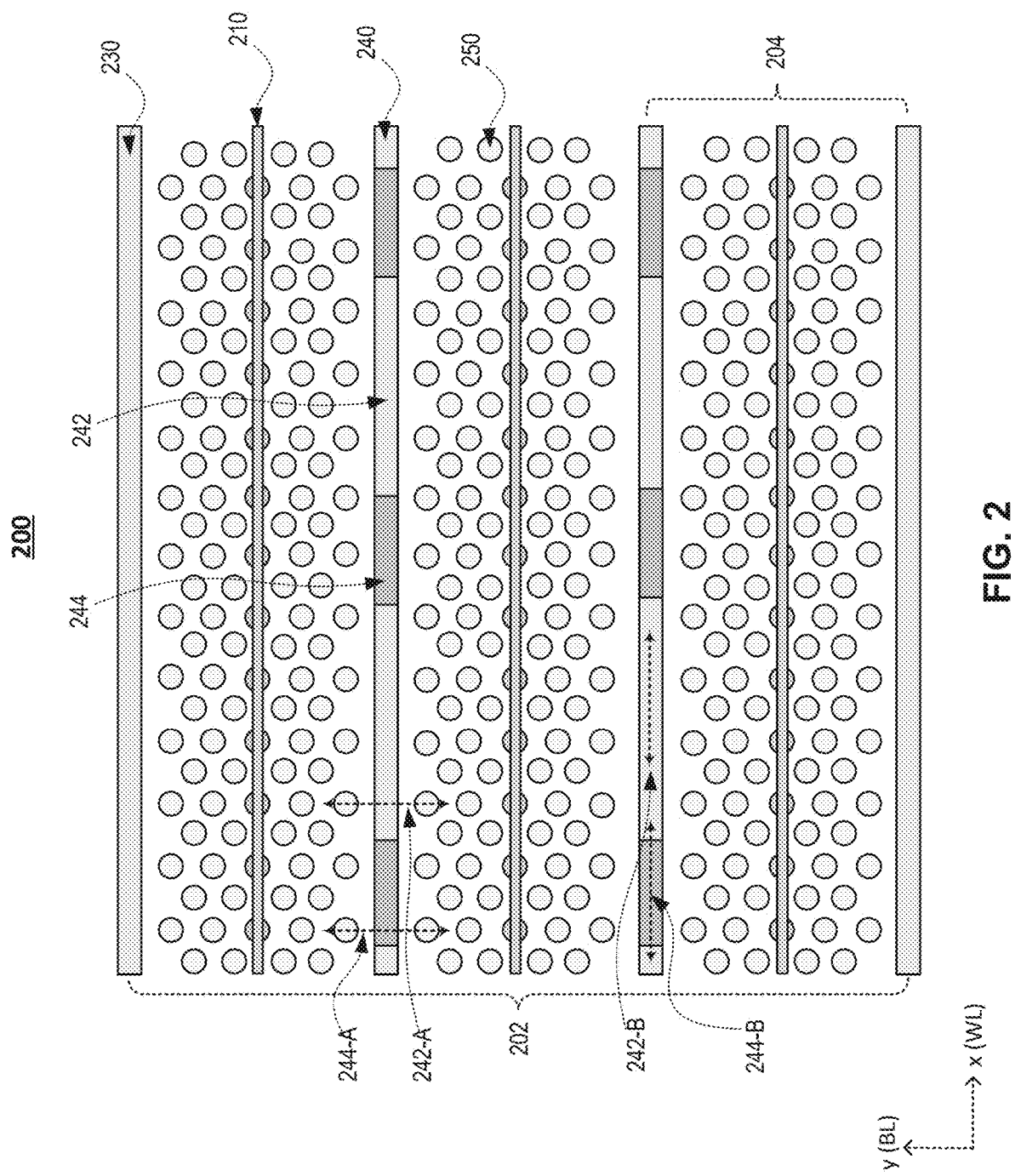
FIG. 2 illustrates a schematic diagram of a 3D memory device in a top view in accordance with some embodiments of the present disclosure.

Referring to FIG. 2, a schematic diagram of a 3D memory device is shown in a top view. As shown, in an exemplary memory block 202 of a 3D NAND memory devices, multiple Gate Line Slit (GLS) structures 230 and 240 can laterally extend in parallel along a word line (WL) direction (also referred as x-direction) to divide the memory array of the memory block 202 into multiple memory fingers 204.

Each memory finger 204 can include multiple (e.g., nine) rows of channel structures 250 arranged in a staggered manner between two adjacent GLS structures 230 and/or 240. A top selective gate (TSG) cut 210 is located in the middle of each memory finger 204 to separate each memory finger 204 into two equal parts. Due to the size limitation and fabricating process sequence, the TSG cut 210 is formed after forming the multiple rows of channel structures 250, and occupies the locations of the middle row (e.g., fifth row) of the multiple (e.g., nine) rows of channel structures 250.

As discussed in the background section, as the number of film layers increases and the structure of the film layer becomes more complicated, the silicon substrate used as a carrier of the film layers may not support the wafer deformation caused by film stresses, which may eventually lead to an arcing of the wafer. Further, as 3D memory devices keep scaling more number of ON layers to improve the area utilization of wafers, the etch depth of GLS increases accordingly, resulting a risk of collapse of the WL structure between adjacent GLS structures 30 in the subsequent process due to stress and other factors. Such WL structure collapse can affect subsequent 3D memory device fabricating processes, such as increasing overlay error in the lithographic alignment process.

The present disclosure provide various segment GLS structure designs as a technical solution to avoid the WL structure collapse. In some embodiments as shown in FIG. 2, the multiple GLS structures can include first type GLS structures 230 and second type GLS structures 240. Each second type GLS structure 240 can include a plurality of first type GLS portions 242 and a plurality of second type GLS portions 244 arranged in a staggered way along the WL direction.

Figure 3A:
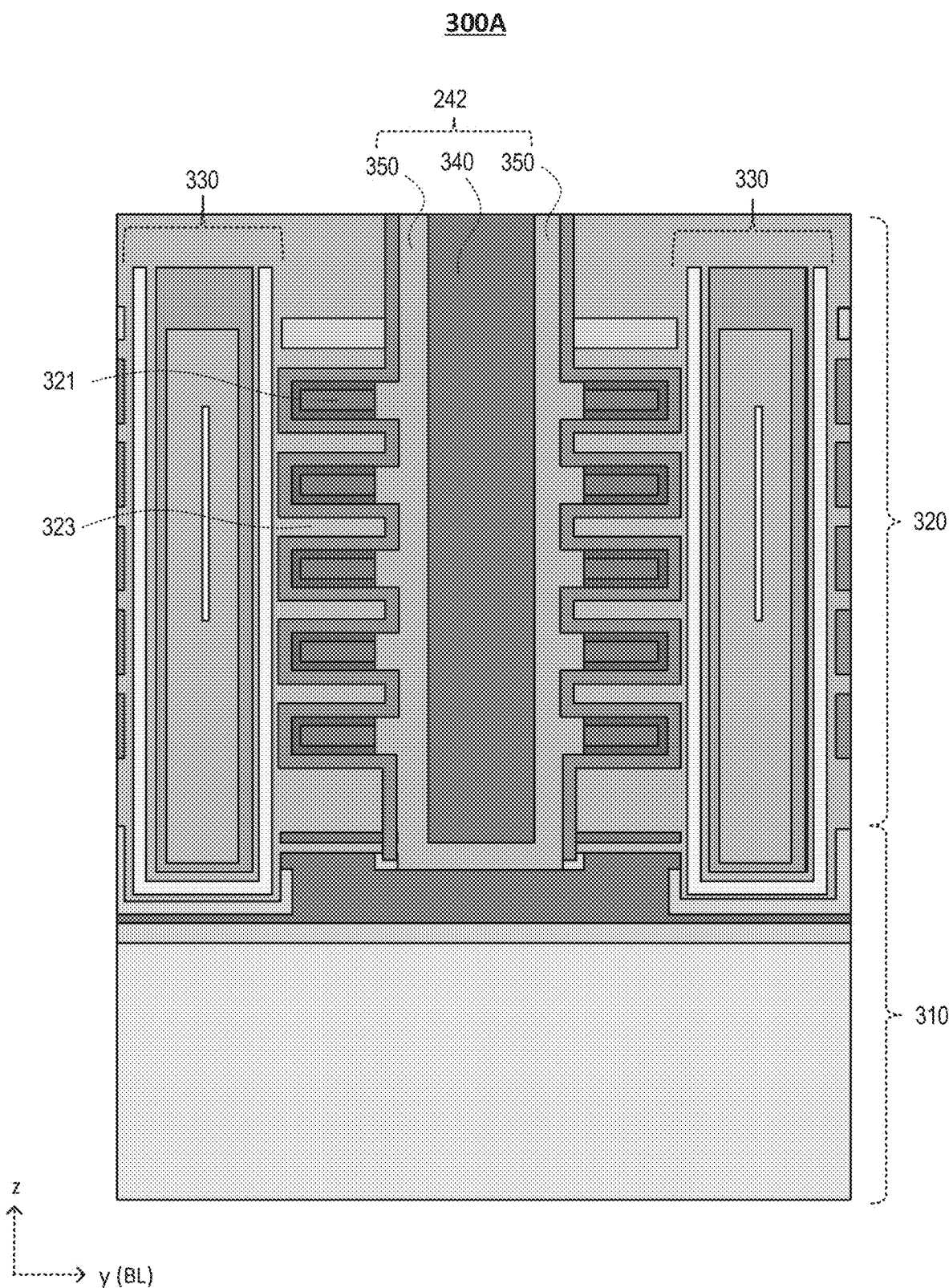
FIGS. 3A-3B illustrate schematic diagrams of portions of a 3D memory device in a cross-sectional view in accordance with some embodiments of the present disclosure.
Figure 3B:
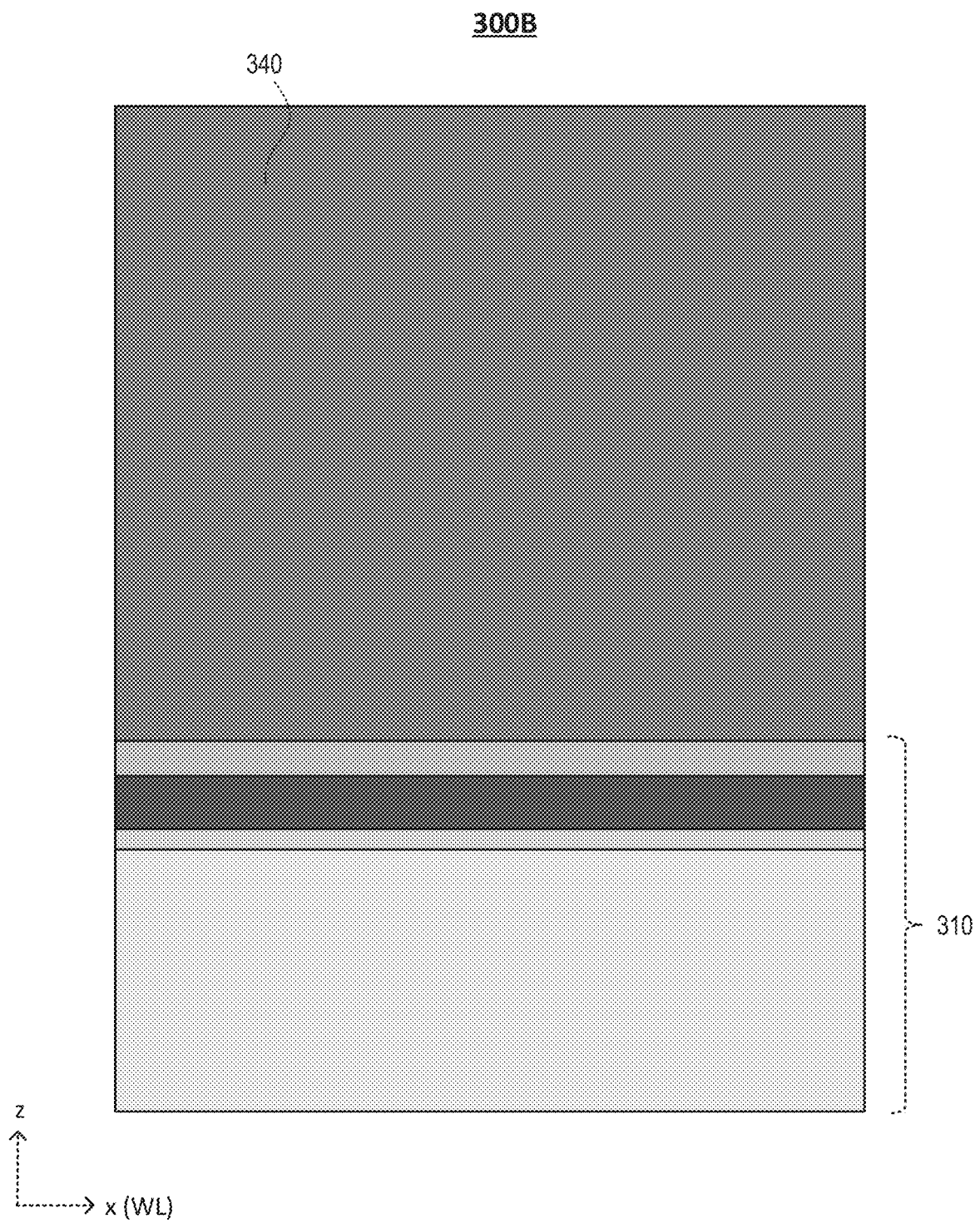

In some embodiments, the first type GLS portion 242 and the first type GLS structure 230 can have a similar structure, which includes a conductive wall horizontally extending along the WL direction, vertically penetrating the film stack, and sandwiched by an insulating coating. Referring to FIGS. 3A and 3B, schematic diagrams of an exemplary first type GLS portion 242 are shown in cross-sectional views along 242-A direction (e.g., BL direction) and 242-B direction (e.g., WL direction) respectively, in accordance with some embodiments.

As shown in FIG. 3A, a film stack 320 is formed on a substrate 310. In some embodiments, the substrate 310 can be any suitable semiconductor substrate having any suitable structure, such as a monocrystalline single-layer substrate, a polycrystalline silicon (polysilicon) single-layer substrate, a polysilicon and metal multi-layer substrate, etc. In some other embodiments, the substrate 310 can include any other suitable additional layers.

The film stack 320 can include a plurality of gate structures and dielectric layers 323 alternate in a vertical direction. Each gate structure can include a conductive layer 321 functioned as word lines (i.e., gate electrodes). The conductive layer 321 can include any suitable conductive material, e.g., tungsten, aluminum, copper, cobalt, or any combination thereof, for forming the word lines (i.e., gate electrodes).

Each gate structure can further include one or more insulating layers surrounding the conductive layer 321. The film stack 320 can include any suitable number of layers of the conductive layers 321 and the dielectric layers 323. In some embodiments, the dielectric layers 323 can include any suitable dielectric material. For example, the dielectric layers 323 can be silicon oxide layers. In some embodiments, a total number of layers of the conductive layers 321 and the dielectric layers 323 in the film stack 320 is equal to or larger than 64. The numbers of layers of the conductive layers 321 and the dielectric layers 323 shown in the figures are reduced for simplicity and do not limit the scope of the present disclosure.

The plurality of conductive layers 321 and dielectric layers 323 are extended in a lateral direction that is parallel to a surface of the substrate 310. The conductive layers 321 can each have the same thickness or have different thicknesses. For example, a thickness of each conductive layer 321 can be in a range from about 10 nm to about 150 nm. Similarly, the dielectric layers 323 can each have the same thickness or have different thicknesses. For example, a thickness of each dielectric layer 323 can be in a range from about 10 nm to about 150 nm. In some embodiments, a total thickness of the film stack 320 can be larger than 1000 nm. It is noted that, the thickness ranges are provided for illustration, and should not be construed to limit the scope of the appended claims.

A plurality of channel structures 330 (e.g., memory strings 112 as shown in FIG. 1, channel structures 250 as shown in FIG. 2) can extend vertically through the film stack 320. Each channel structure 330 can include a channel hole extending vertically through the film stack 320, a functional layer on the sidewall of the channel hole, a dielectric filling structure filling the channel hole, and a channel layer between the functional layer and the dielectric filling structure. The functional layer can be a composite dielectric layer, such as a combination of a barrier layer, a storage layer, and a tunneling layer. The multiple channel structures 330 can be arranged as an array in the film stack 320, as shown in FIG. 2.

As shown in FIG. 3A, the first type GLS portion 242 can include a conductive wall 340 sandwiched by spacer layers 350. The conductive wall 340 in the first type GLS portion 242 can extend vertically through the film stack 320. The spacer layer 350 is also referred as a gate line spacer (GLSP) layer, can be used to provide electrical insulation between the conductive layers 321 and the conductive wall 340. In some embodiments, the spacer layer 350 can have a laminated structure. In some embodiments, the conductive wall 340 can include any suitable conductive material, such as tungsten, aluminum, copper, polysilicon, silicides, and/or combinations thereof, etc. As shown in FIG. 3B, the conductive wall 340 in the first type GLS portion 242 can be in contact with a doped region in the substrate 310, and can be used as an array common source (ACS) of the multiple NAND strings (e.g., memory strings 112).

Figure 4A:
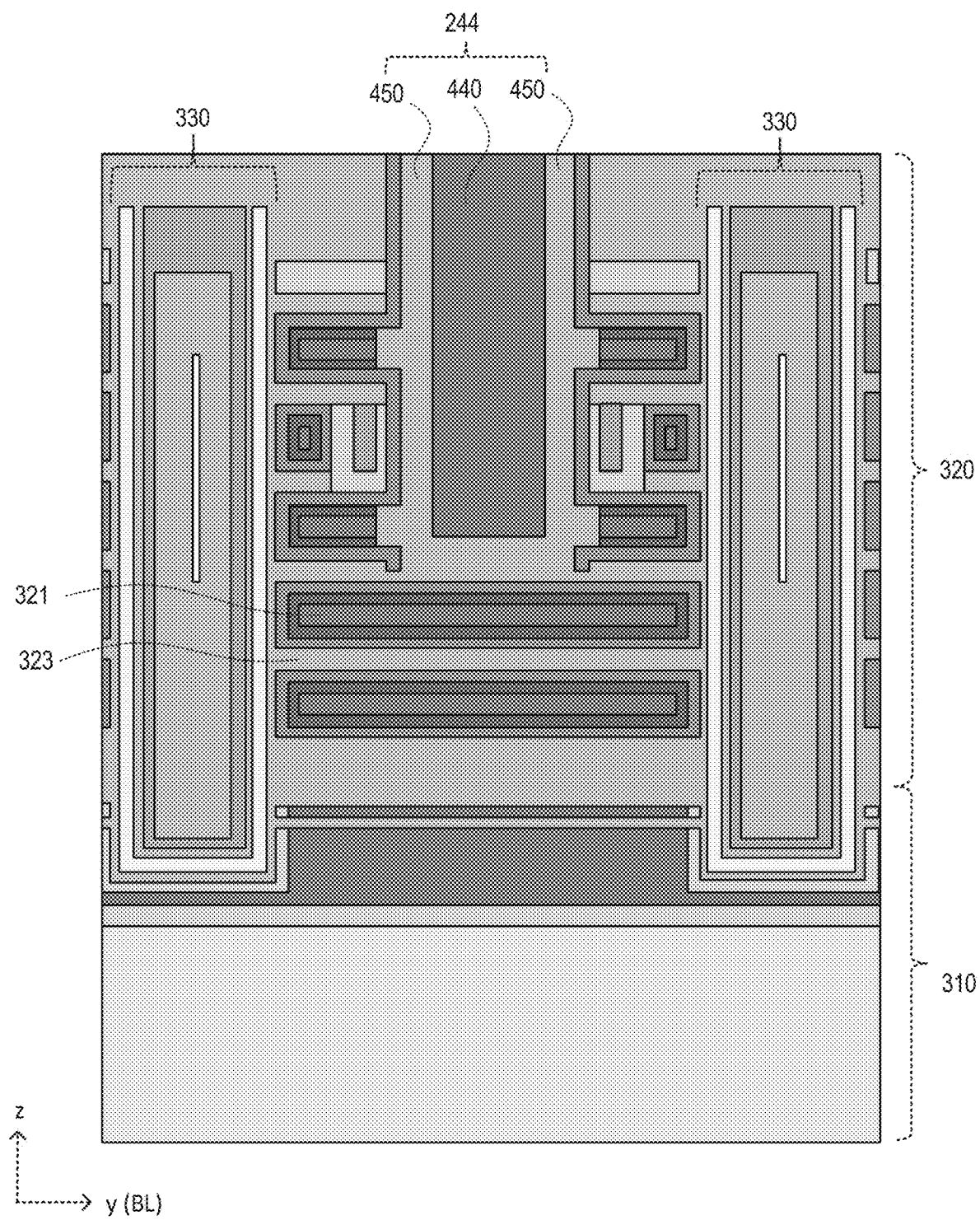
FIGS. 4A-4B illustrate schematic diagrams of portions of a 3D memory device in a cross-sectional view in accordance with some embodiments of the present disclosure.
Figure 4B:
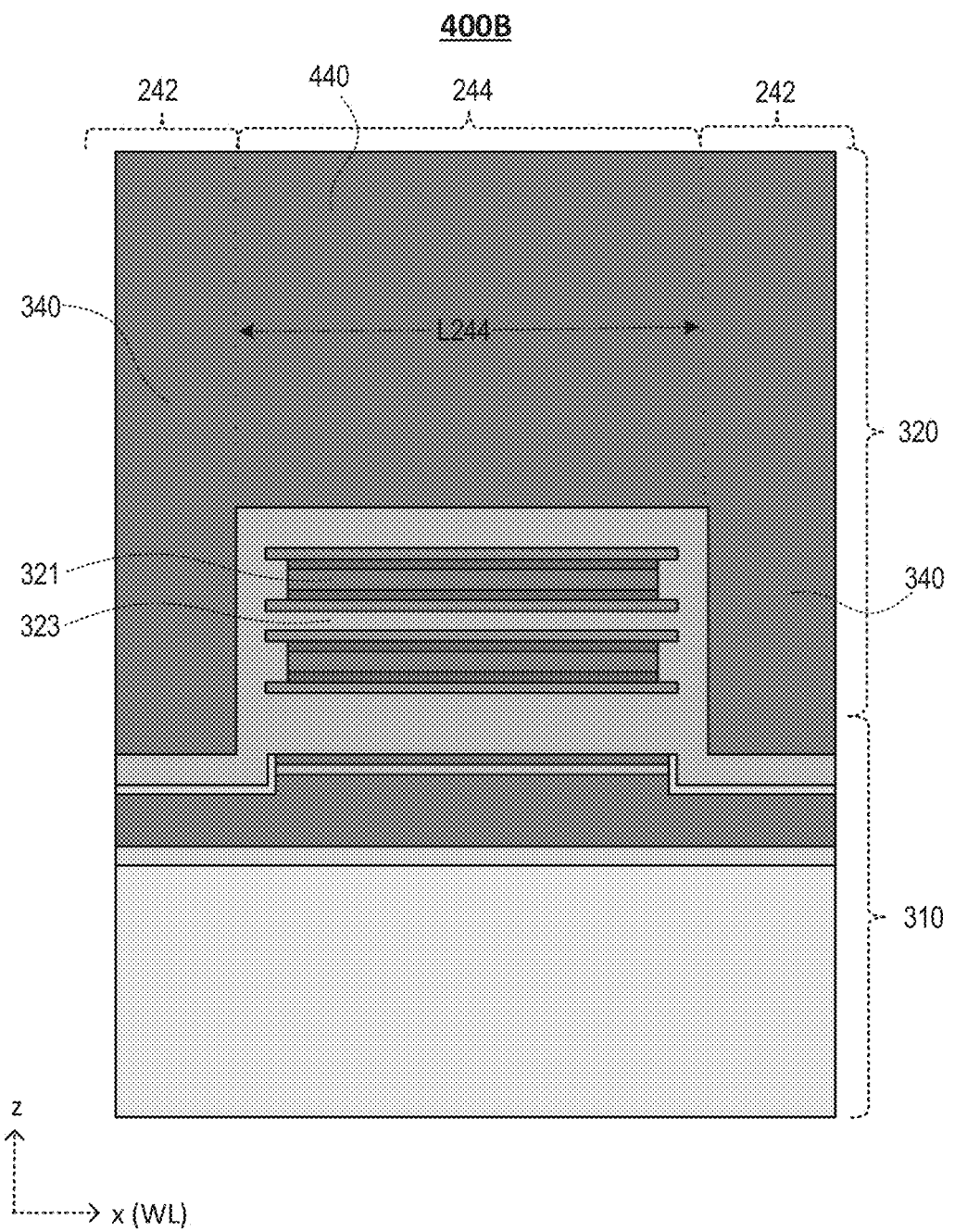

Referring to FIGS. 4A and 4B, schematic diagrams of an exemplary second type GLS portion 244 are shown in cross-sectional views along 244-A direction (e.g., BL direction) and 244-B direction (e.g., WL direction) respectively, in accordance with some embodiments.

As shown in FIG. 4A, the second type GLS portion 244 can include a conductive wall 440 sandwiched by spacer layers 450. Different from the conductive wall 340 in first type GLS portion 242, the conductive wall 440 in the second type GLS portion 244 extends vertically in an upper portion of the film stack 320. As shown in FIG. 4B, the conductive wall 440 in the second type GLS portion 244 can be in contact with the conductive wall 340 in the first type GLS portion 242 along the WL direction. In some embodiments, a length L244 of the second type GLS portion 244 along the WL direction is equal to or less than a half width of the memory finger 204 in the BL direction, which is a half of the pitch of the nine rows of channel structures 250 in the BL direction (e.g., the distance from a TSG cut 210 to an adjacent first type GLS structures 230 or second type GLS structures 240). It is noted that, the numbers of layers of the conductive layers 321 and the dielectric layers 323 in the upper portion or lower portion of the film stack 320 shown in the figures are reduced for simplicity and do not limit the scope of the present disclosure.

Referring to FIGS. 5A-5F, various exemplary designs of GLS structures are shown in a schematic top view, according to some embodiments of the present disclosure.

Figure 5A:
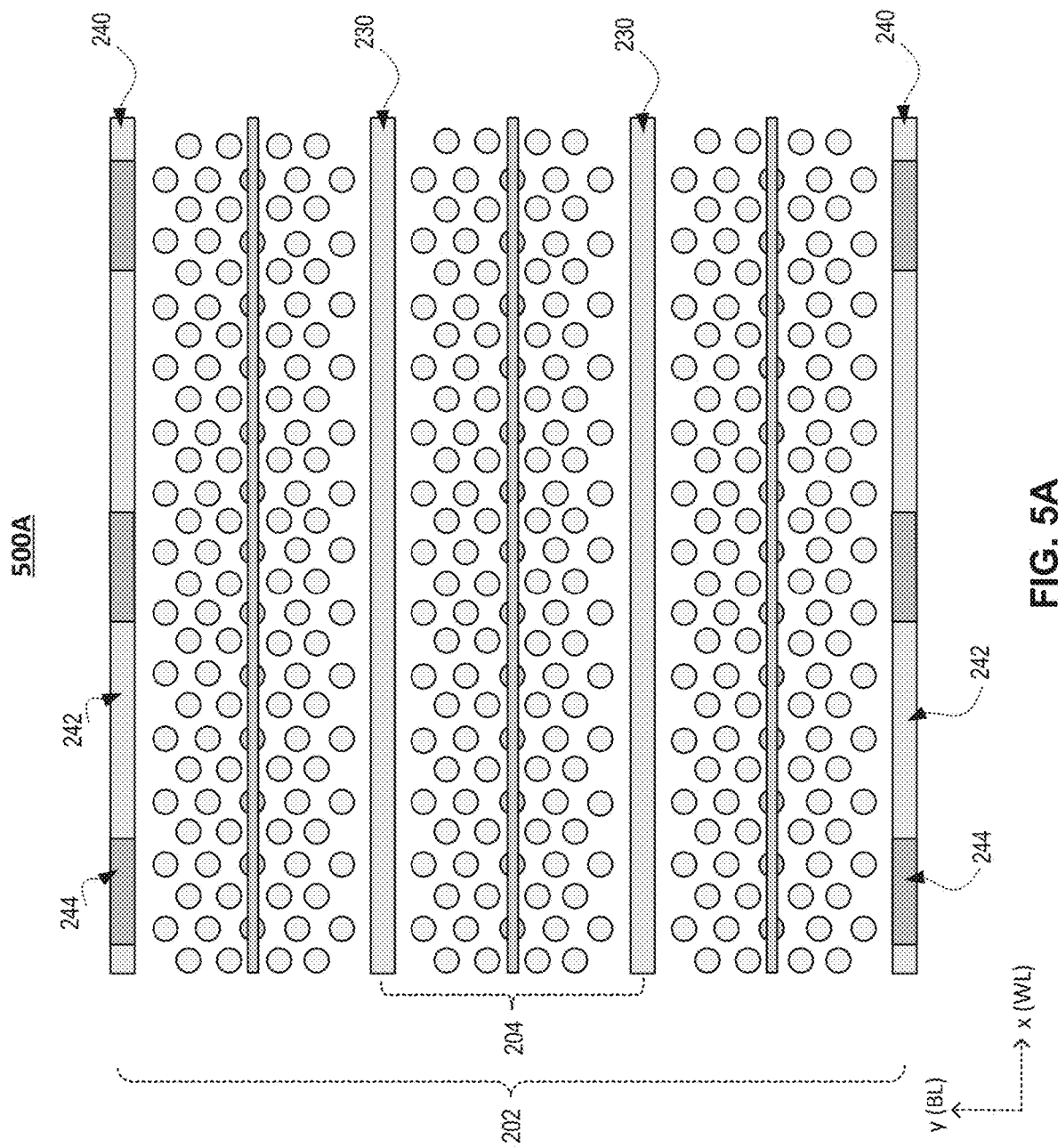
FIGS. 5A-5F illustrate various designs of 3D memory devices a top view in accordance with some embodiments of the present disclosure.

As shown in a first design 500A as illustrated in FIG. 5A, there are two first type GLS structures 230 and two second type GLS structures 240 in one memory block 202. The middle memory finger 204 can be sandwiched by the two first type GLS structures 230. The two second type GLS structures 240 can be located on the two edges of the memory block 202 in the BL direction respectively. In addition, the first type GLS portions 242 in the two second type GLS structures 240 are aligned with each other in the BL direction, and the second type GLS portions 244 in the two second type GLS structures 240 are aligned with each other in the BL direction.

Figure 5B:
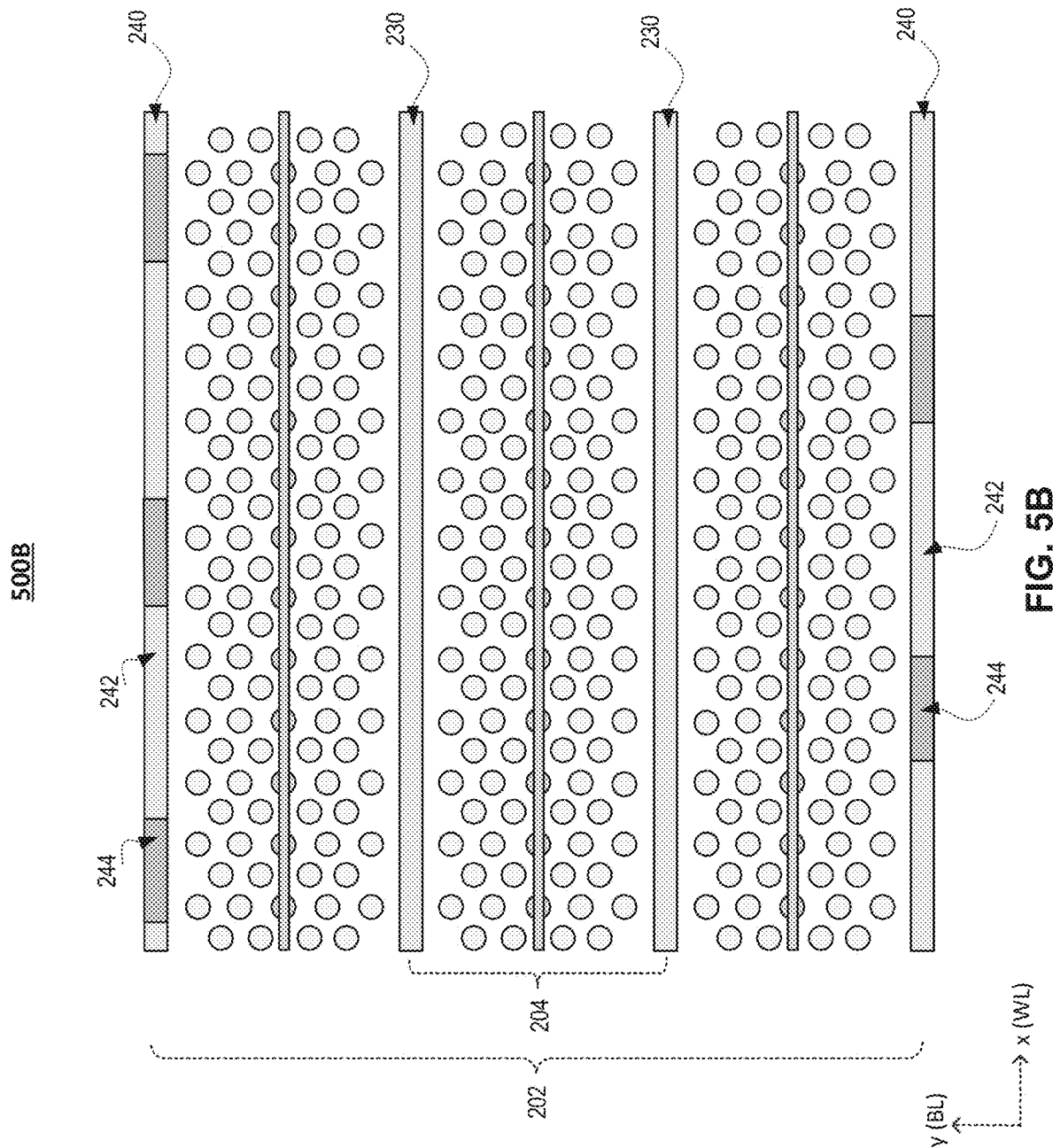

As shown in a second design 500B as illustrated in FIG. 5B, there are two first type GLS structures 230 and two second type GLS structures 240 in one memory block 202. The middle memory finger 204 can be sandwiched by the two first type GLS structures 230. The two second type GLS structures 240 can be located on the two edges of the memory block 202 in the BL direction respectively. Different from the first design 500A, in the second design 500B, the first type GLS portions 242 and the second type GLS portions 244 in the two second type GLS structures 240 are arranged in staggered positions in the BL direction. That is, a second type GLS portion 244 in one second type GLS structure 240 overlaps with a first type GLS portions 242 in another second type GLS structures 240 in the BL direction.

Figure 5C:
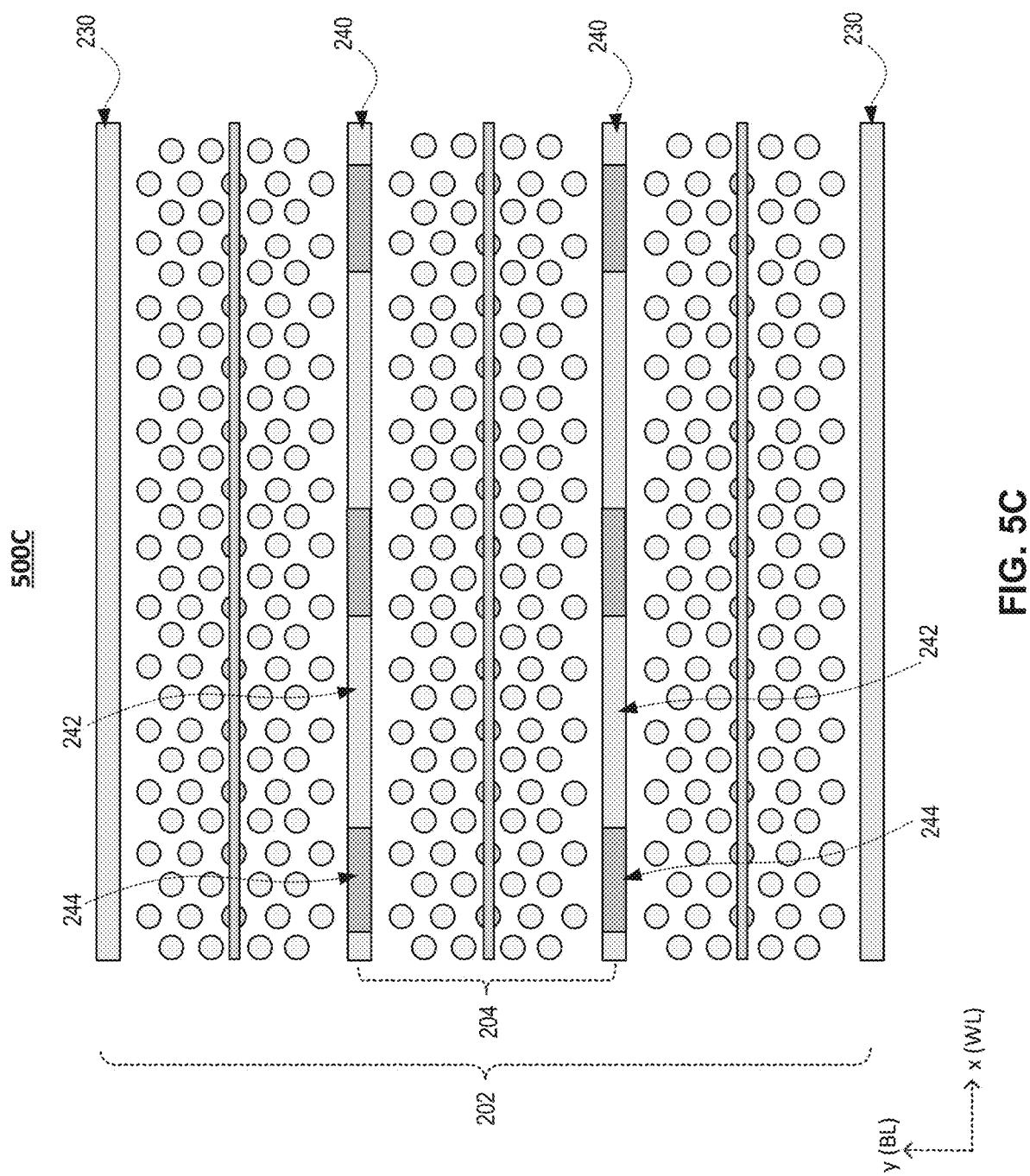

As shown in a third design 500C as illustrated in FIG. 5C, there are two first type GLS structures 230 and two second type GLS structures 240 in one memory block 202. Different from the first design 500A, in the third design 500C, the middle memory finger 204 can be sandwiched by the two second type GLS structures 240. The two first type GLS structures 230 can be located on the two edges of the memory block 202 in the BL direction respectively. In addition, the first type GLS portions 242 in the two second type GLS structures 240 are aligned with each other in the BL direction, and the second type GLS portions 244 in the two second type GLS structures 240 are aligned with each other in the BL direction.

Figure 5D:
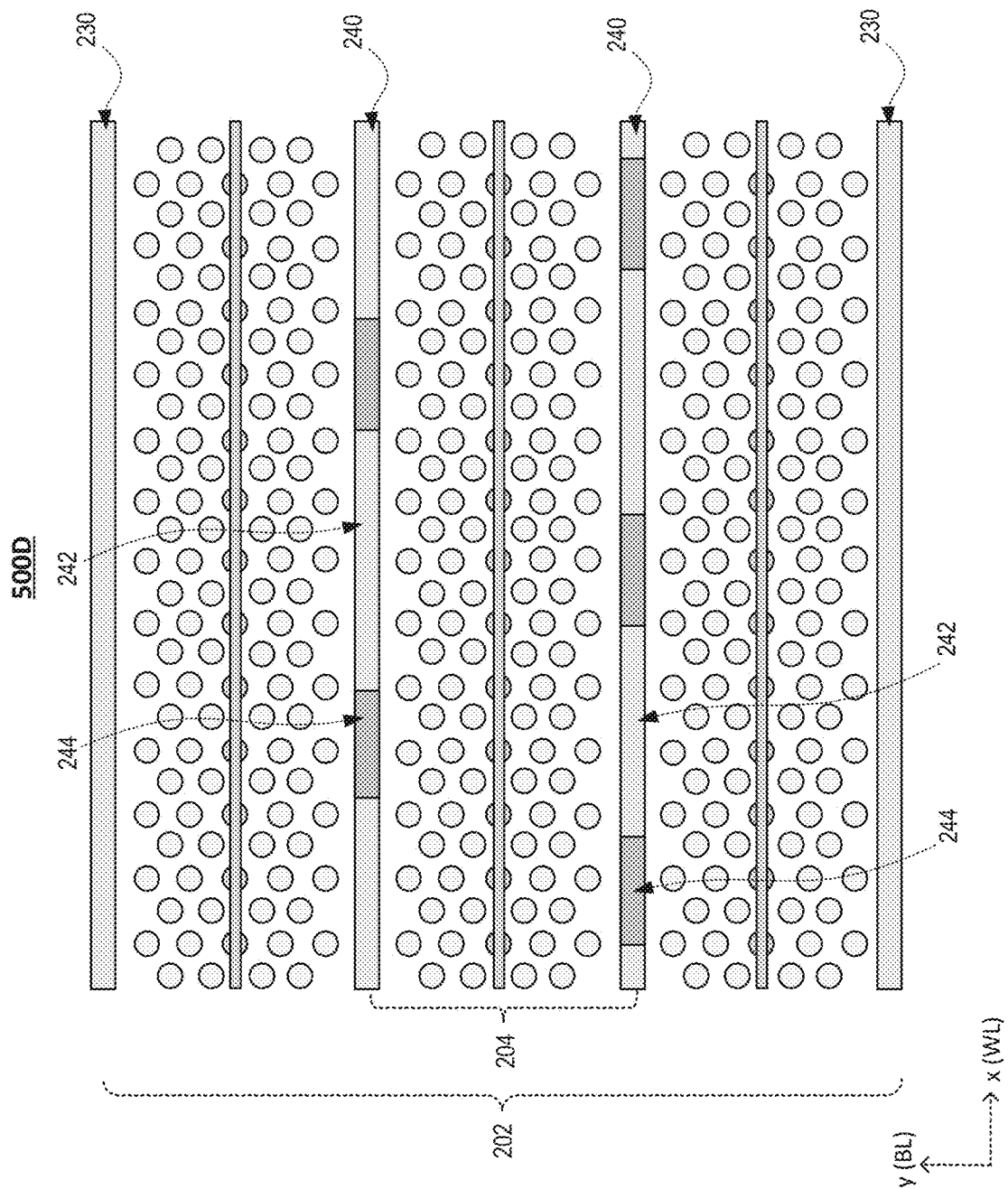

As shown in a fourth design 500D as illustrated in FIG. 5D, there are two first type GLS structures 230 and two second type GLS structures 240 in one memory block 202. Different from the first design 500A, in the third design 500C, the middle memory finger 204 can be sandwiched by the two second type GLS structures 240. The two first type GLS structures 230 can be located on the two edges of the memory block 202 in the BL direction respectively. Different from the third design 500C, in the fourth design 500D, the first type GLS portions 242 and the second type GLS portions 244 in the two second type GLS structures 240 are arranged in staggered positions in the BL direction. That is, a second type GLS portion 244 in one second type GLS structure 240 overlaps with a first type GLS portions 242 in another second type GLS structures 240 in the BL direction.

Figure 5E:
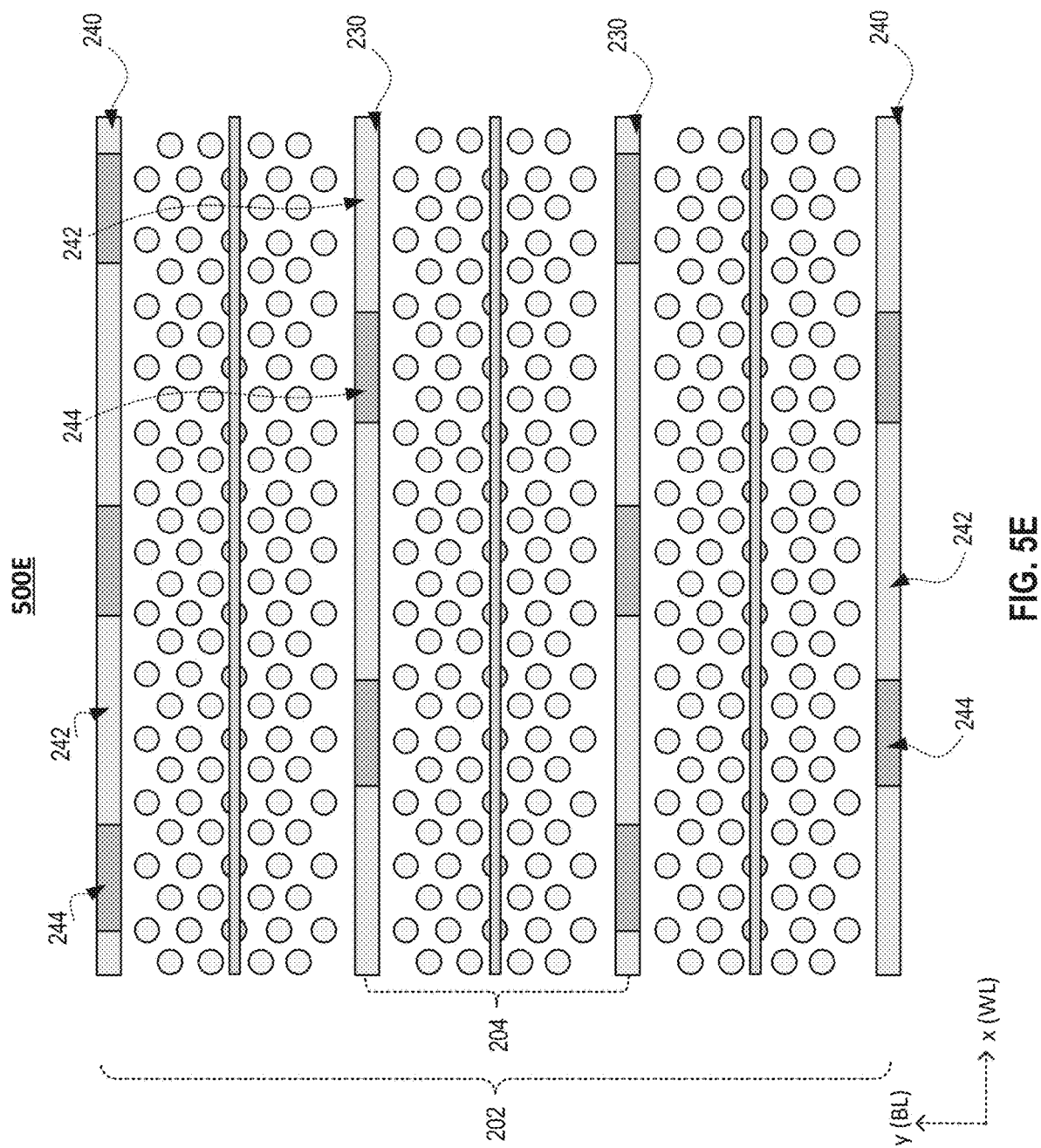

As shown in a fifth design 500E as illustrated in FIG. 5E, there are four second type GLS structures 240 in one memory block 202. That is, each of the three memory fingers 204 is sandwiched by two second type GLS structures 240. The second type GLS portions 244 in adjacent second type GLS structures 240 are arranged in staggered positions in the BL direction. That is, a second type GLS portion in one second type GLS structure 240 overlaps with a first type GLS portions 242 in an adjacent second type GLS structures 240 in the BL direction, and is aligned with another second type GLS portion in a next second type GLS structure 240.

Figure 5F:
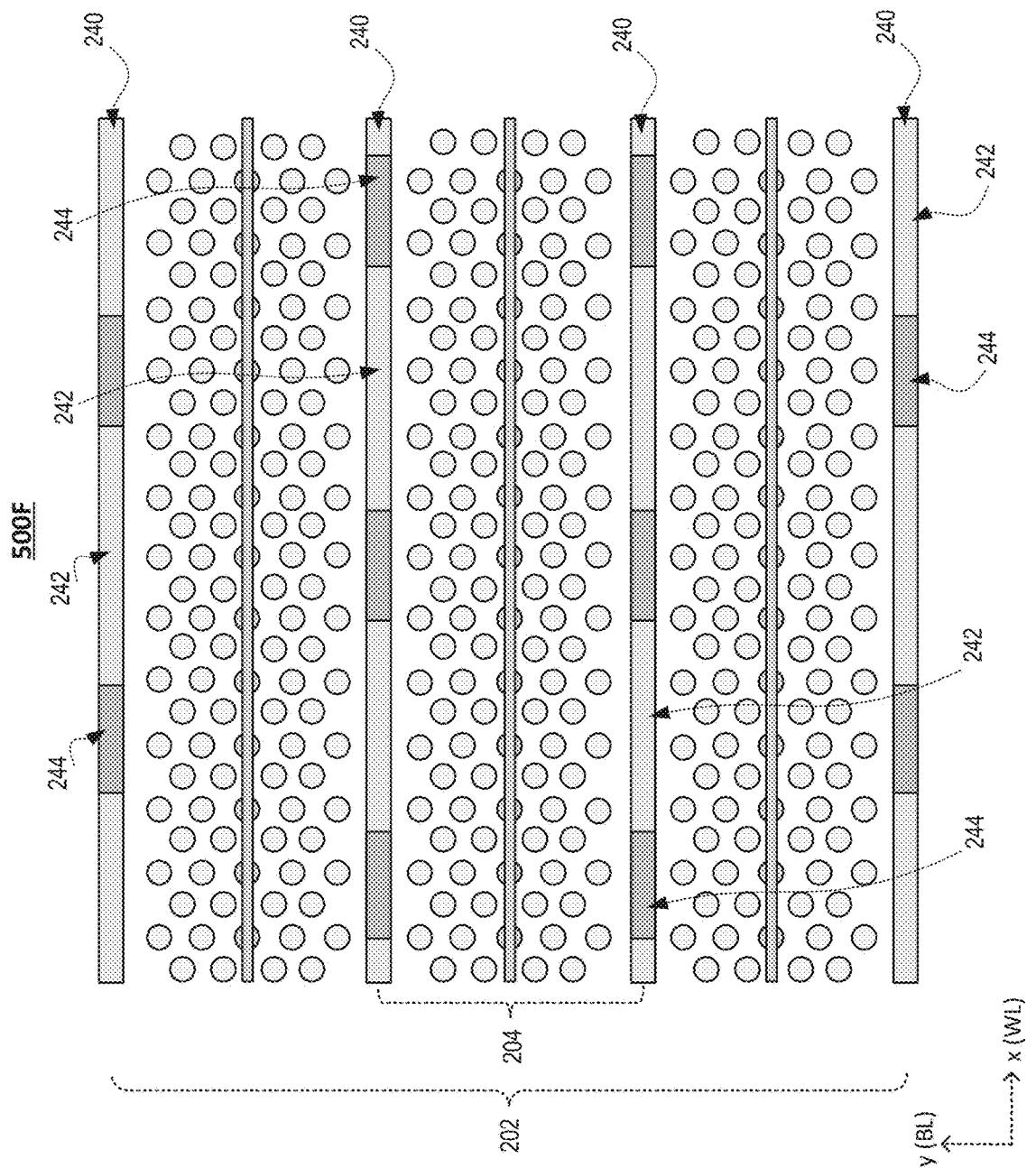

As shown in a sixth design 500F as illustrated in FIG. 5F, there are four second type GLS structures 240 in one memory block 202. That is, each of the three memory fingers 204 is sandwiched by two second type GLS structures 240. The second type GLS portions 244 in the two middle second type GLS structures 240 are aligned with each other in the BL direction. The second type GLS portions 244 in the two outside second type GLS structures 240 are aligned with each other in the BL direction. But the second type GLS portions 244 in one outside second type GLS structure 240 and in its adjacent middle second type GLS structure 240 are arranged in staggered positions in the BL direction. That is, a second type GLS portion in one outside second type GLS structure 240 overlaps with a first type GLS portions 242 in each of the two middle second type GLS structures 240 in the BL direction, and is aligned with another second type GLS portion in a next outside second type GLS structure 240.

The above disclosed segment GLS structure designs provide a plurality of first type GLS portions 242 and a plurality of second type GLS portions 244 arranged in a staggered way along the WL direction. In the second type GLS portions 244, the conductive wall 440 is located only in an upper portion of the film stack 320. The remained lower portion of the film stack 320 can connect the two adjacent memory fingers 240, thus increasing the stress supporting and reducing the risk of memory finger collapse. Further, the remained lower portion of the film stack 320 can effectively acts as a widen GLS outer channel spacer, which can reduce the risk of GLS outer channel merge. Therefore, the gate line pitch can be reduced, thereby reducing the die size while keeping the same storage capacity of the 3D NAND memory device.

Figure 6A:
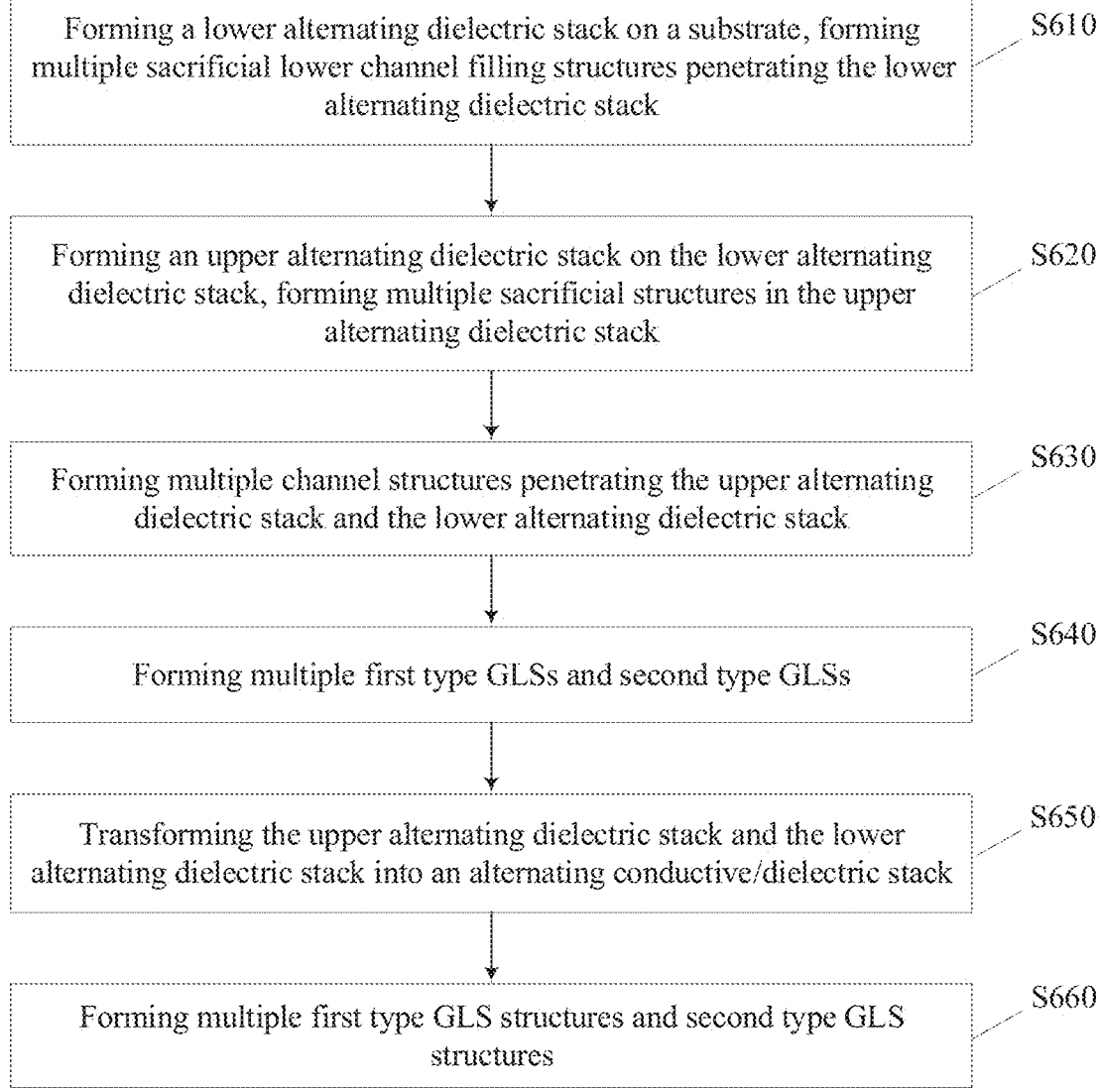
FIGS. 6A-6B illustrate flow diagrams of an exemplary method for forming a 3D memory device in accordance with some embodiments of the present disclosure.

Referring to FIG. 6A, a flow diagram of an exemplary method for forming a 3D memory device is shown in accordance with some embodiments of the present disclosure. FIGS. 7A-7B, 8A-8B, 9A-9B, 10A-10B, 11A-11B, 12A-12B, 13A-13B, 14A-14B, 15A-15B, 16A-16B, 17A-17B, 18A-18B, 19A-19B, 20A-20B, 21A-21B, 22A-22B, 23A-23B, 24A-24B, and 25A-25B illustrate schematics of some portions of an exemplary 3D memory device at certain fabricating stages of the method shown in FIG. 6A in various views according to some embodiments of the present disclosure.

Figure 7A:
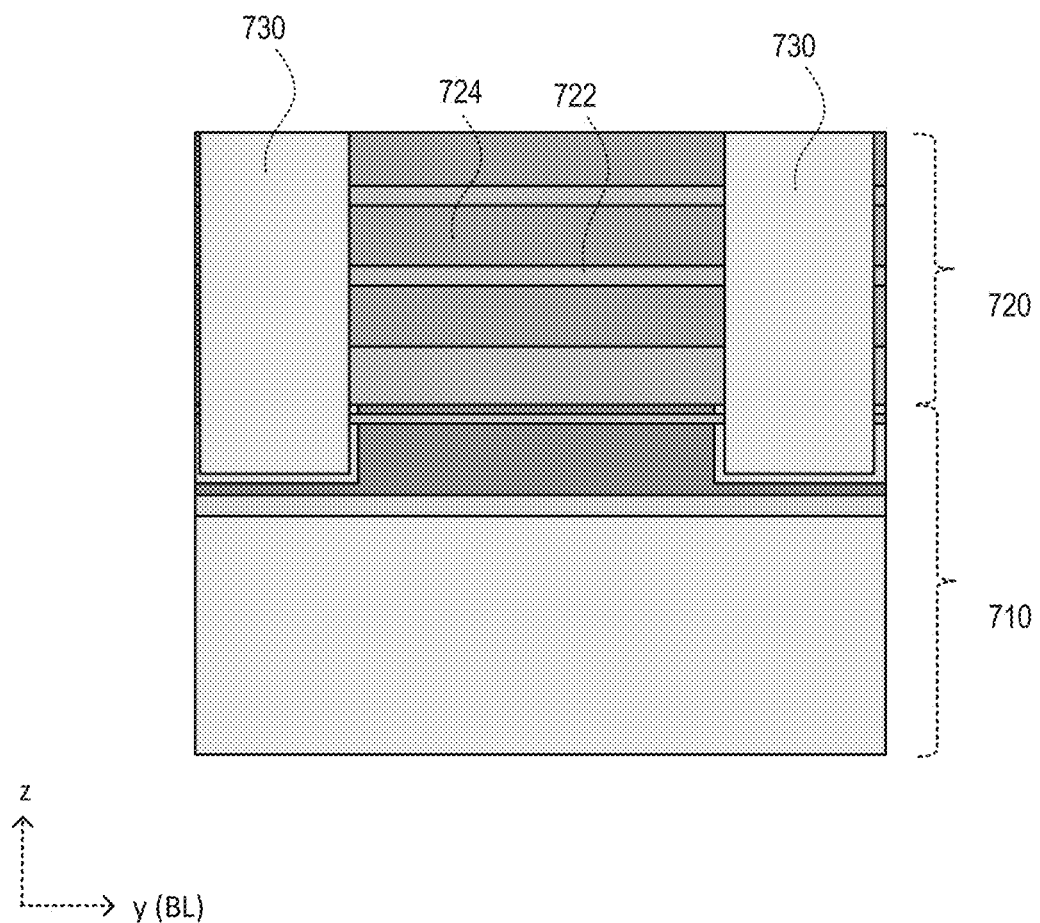
FIGS. 7A-7B, 8A-8B, 9A-9B, 10A-10B, 11A-11B, 12A-12B, 13A-13B, 14A-14B, 15A-15B, 16A-16B, 17A-17B, 18A-18B, 19A-19B, 20A-20B, 21A-21B, 22A-22B, 23A-23B, 24A-24B, and 25A-25B illustrate schematics of some portions of an exemplary 3D memory device at certain fabricating stages of the method shown in FIGS. 6A-6B in various views according to some embodiments of the present disclosure.
Figure 7B:
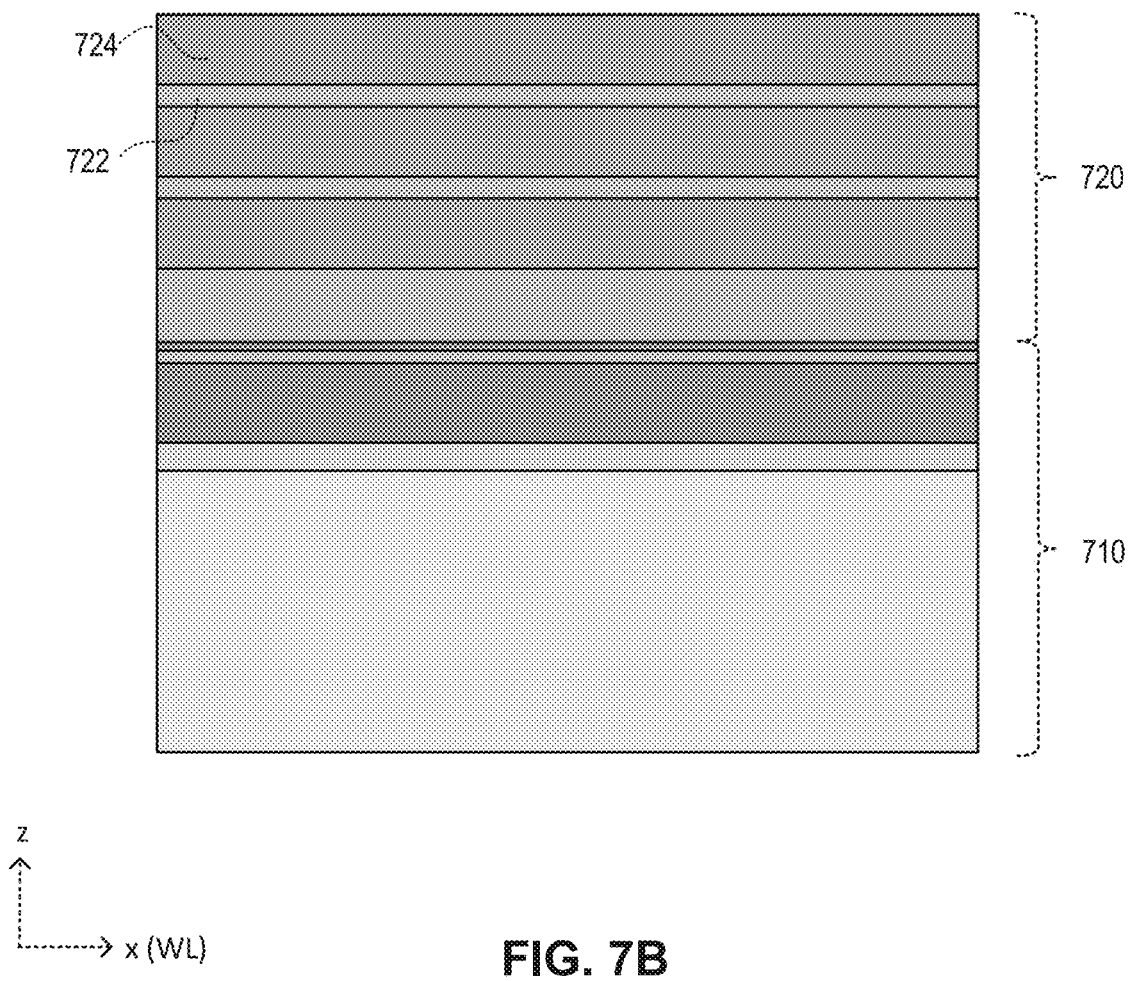
Figure 8A:
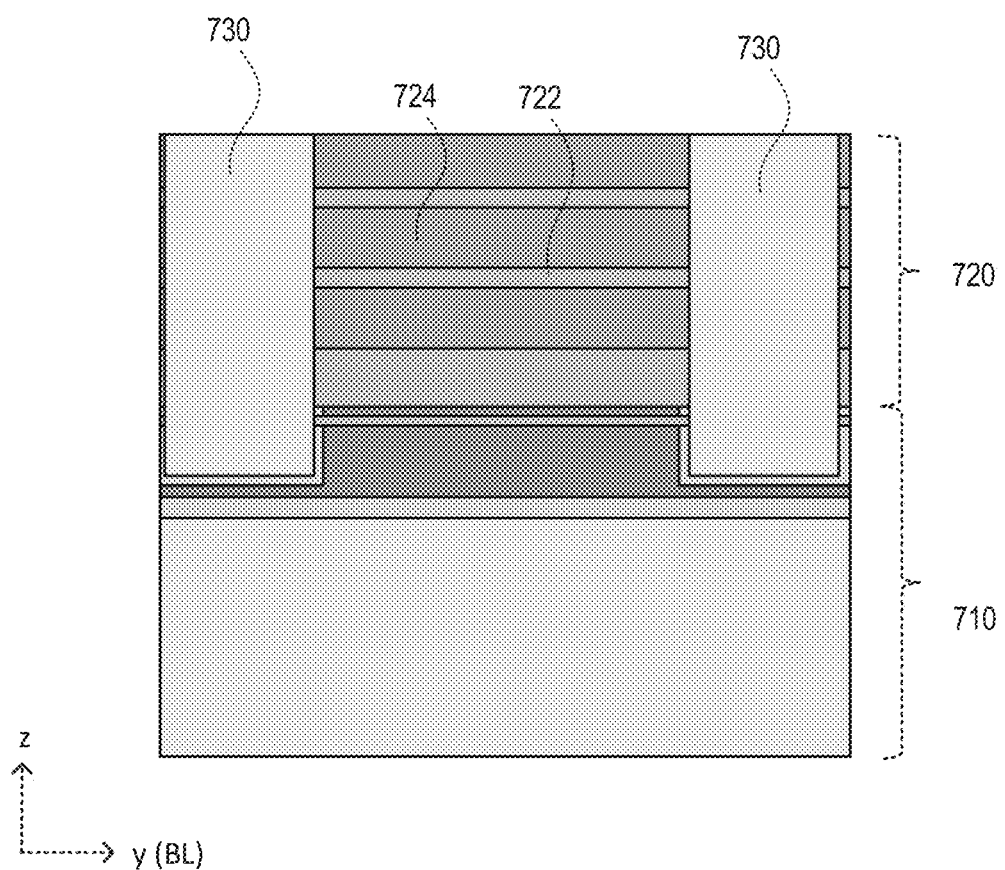
Figure 8B:
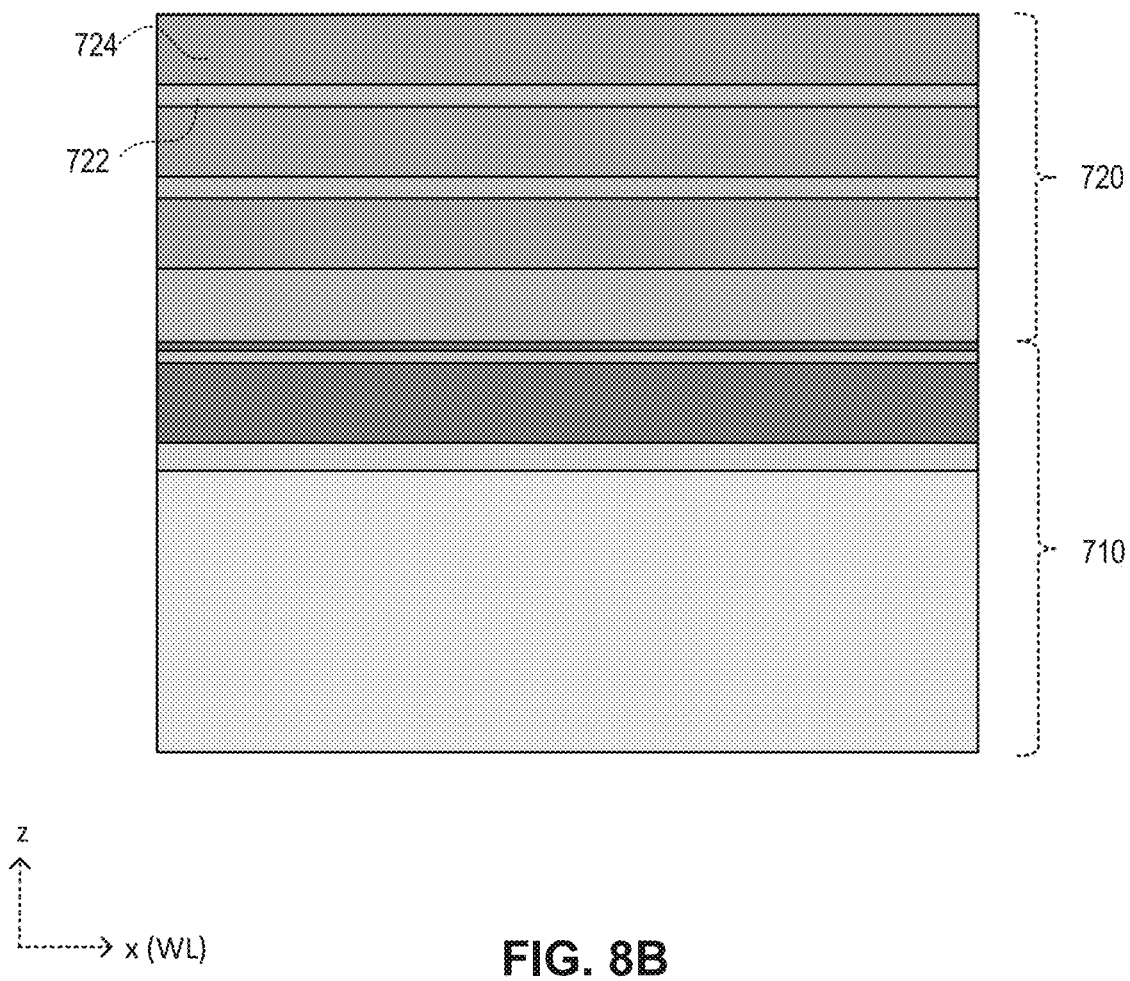
Figure 9A:
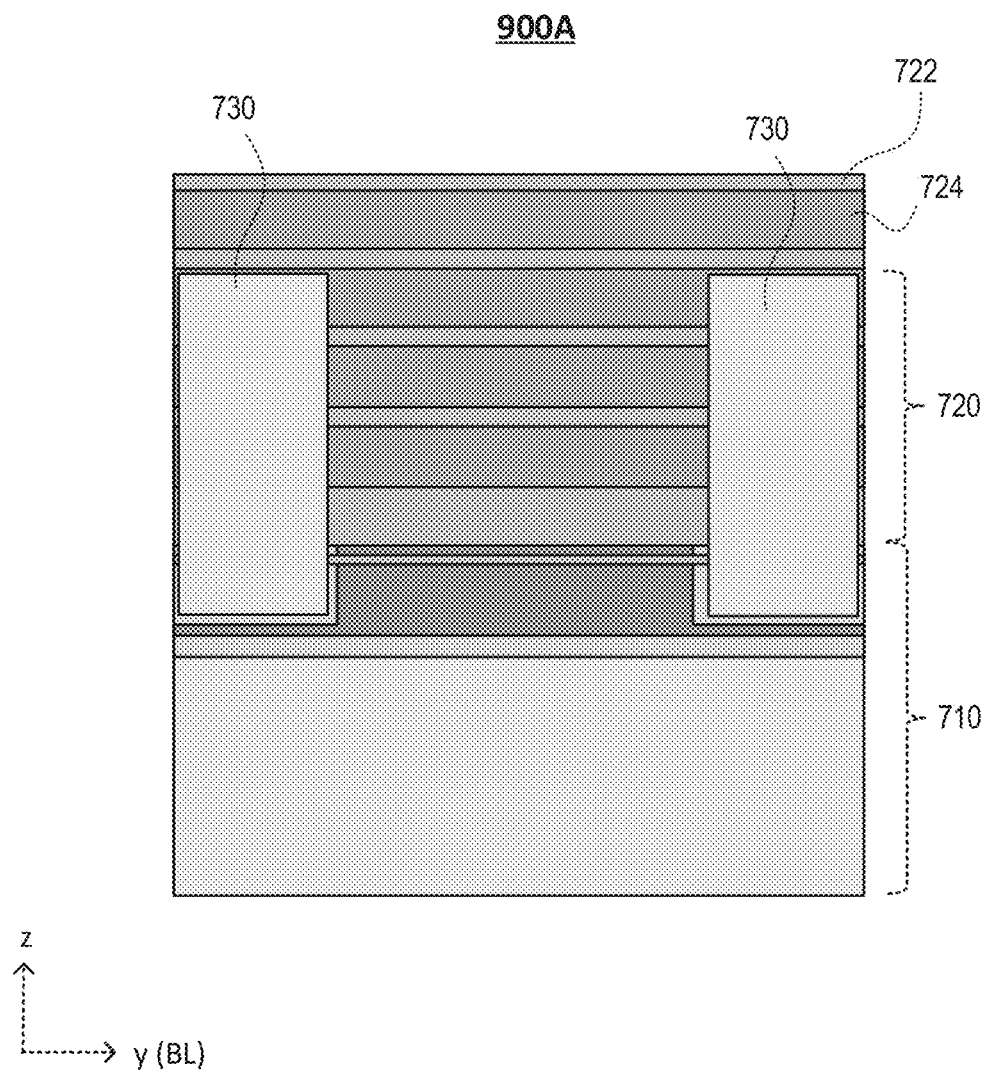
Figure 9B:
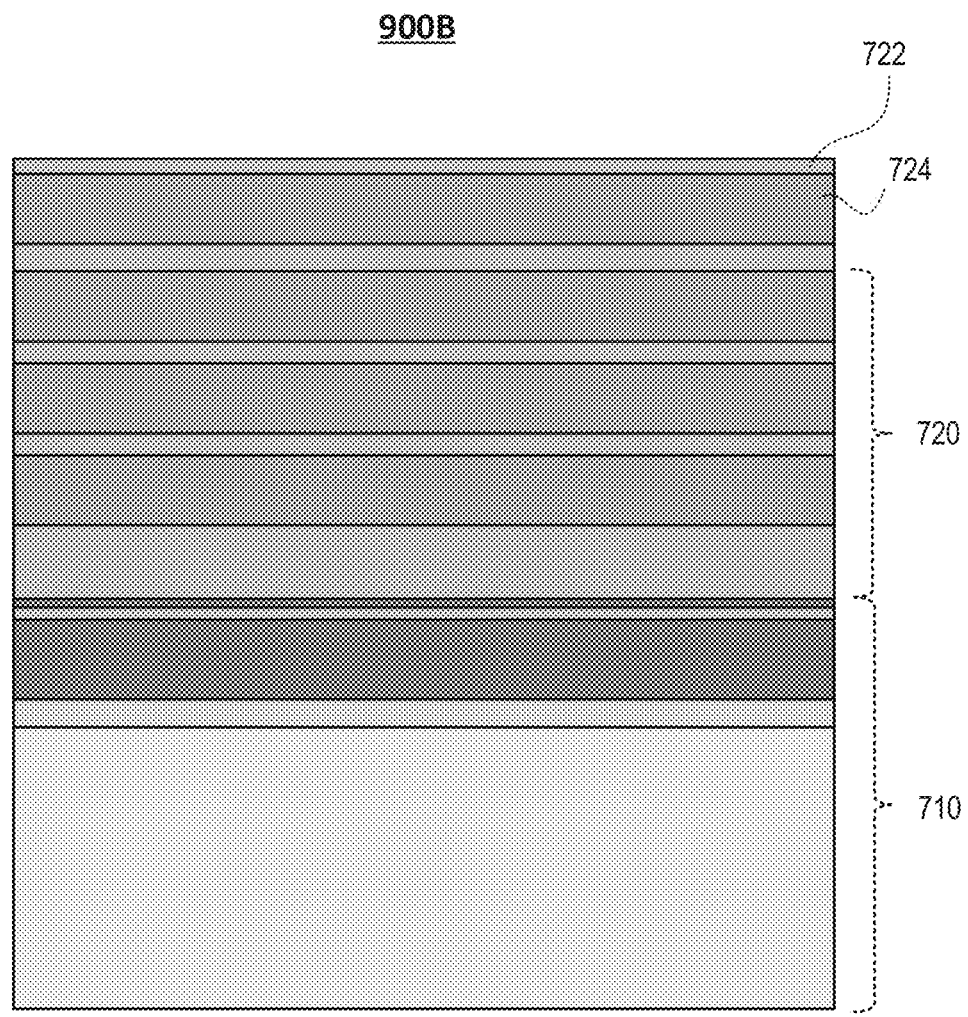

As shown in FIG. 6A, the method 600 can start at operation S610, in which a lower alternating dielectric stack can be formed on a substrate, a plurality of sacrificial lower channel filling structures can be formed penetrating the lower alternating dielectric stack. FIGS. 7A-7B and 8A-8B illustrate some portions of the 3D structure in a cross-sectional view of after operation S610. Specifically, FIGS. 7A-7B illustrate schematic diagrams of a portion of the 3D structure corresponding to the to-be-formed first type GLS portions 242 along 242-A direction and 242-B direction respectively as shown in FIG. 2, and FIGS. 8A-8B illustrate schematic diagrams of a portion of the 3D structure corresponding to the to-be-formed second type GLS portions 244 along 244-A direction and 244-B direction respectively as shown in FIG. 2, according to some embodiments.

As shown in FIGS. 7A-7B and 8A-8B, a lower alternating dielectric stack 720 can be formed on a substrate 710. In some embodiments, the substrate 310 can be any suitable semiconductor substrate having any suitable structure, such as a monocrystalline single-layer substrate, a polycrystalline silicon (polysilicon) single-layer substrate, a polysilicon and metal multi-layer substrate, etc. In some other embodiments, the substrate 310 can include any other suitable additional layers.

The lower alternating dielectric stack 720 including a plurality of dielectric layer pairs. The lower alternating dielectric stack 720 can include an alternating stack of a first dielectric layer 722 (e.g., oxide layers) and a second dielectric layer 724 (e.g., nitride layers) that is different from first dielectric layer, for example. The plurality of first dielectric layers 722 and second dielectric layers 724 are extended in a lateral direction that is parallel to the surface of the substrate 710. In some embodiments, there are more layers than the dielectric layer pairs made of different materials and with different thicknesses in the lower alternating dielectric stack 720. The lower alternating dielectric stack 720 can be formed by one or more thin film deposition processes including, but not limited to, Chemical Vapor Deposition (CVD), Physical Vapor Deposition (PVD), Atomic Layer Deposition (ALD), or any combination thereof. The lower alternating dielectric stack 720 can include any suitable number of layers of the oxide layers 722 and the nitride layers 724. For example, a total number of layers of the oxide layers 722 and the nitride layers 724 in the lower alternating dielectric stack 720 can be equal to or larger than 64. In some embodiments, the lower alternating dielectric stack 720 includes more oxide layers or more nitride layers with different materials and/or thicknesses than the oxide/nitride layer pair.

As shown in FIGS. 7A-7B, a plurality of sacrificial lower channel filling structures can be formed penetrating the lower alternating dielectric stack. In some embodiments, fabricating process for forming the plurality of sacrificial lower channel filling structures can include forming multiple lower channel holes penetrating the lower alternating dielectric stack 720, and filling the multiple lower channel holes with a sacrificial material.

A process of forming the multiple lower channel holes can include forming a hard mask layer (not shown) on the lower alternating dielectric stack 200, and coating a photoresist layer (not shown) on the hard mask layer. A pattering process can be performed to pattern the hard mask layer. Using the hard mask layer as a mask, an etching process can be followed to etch the lower alternating dielectric stack 720 to form the multiple lower channel holes. Each lower channel hole can completely penetrate the lower alternating dielectric stack 720 and extend into the substrate 710. The etching process to form the multiple lower channel holes can be a dry etching, a wet etching, or a combination thereof. After the etching process, the photoresist layer and the hard mask layer can be removed.

In some embodiments, a cleaning process can be performed to clean the multiple lower channel holes. The cleaning process can be a plasma ashing process including a high temperature ashing, and/or a wet stripping. For example, a plasma source can be used to generate a reactive species, such as oxygen or fluorine. The reactive species can combine with the photoresist remained in the channel holes to form ash, which can be removed with a vacuum pump. Specifically, in some embodiments, monatomic oxygen plasma can be created by exposing oxygen gas at a low pressure to high power radio waves, which ionize the oxygen gas. The residue of the reaction between the oxygen and photoresist material can generate ash in the plasma asher. The byproducts of the ashing process, such as volatile carbon oxides, water vapor can be pumped away with the vacuum pump within the plasma asher.

A sacrificial lower channel filling structure 730 can be formed in each lower channel hole. A sacrificial filling material can be deposited to fill in the multiple lower channel holes to form the sacrificial lower channel filling structure 730. Any suitable planarization method (e.g., chemical-mechanical planarization (CMP)) and/or recess etch (e.g., dry etch and/or wet etch) can be performed to remove any excessive sacrificial filling material over the lower alternating dielectric stack 720. The sacrificial filling material can include any suitable non-conductive material (e.g., amorphous silicon, polysilicon, silicon germanium, amorphous carbon, silicon nitride, diamond-like carbon, and porous organosilicate glass), and can be deposited by any suitable deposition method such as CVD and/or spin coating.

After operation S610, the portions corresponding to the to-be-formed first type GLS portions 242 and the to-be-formed second type GLS portions 244 have the same structure. Thus, along the BL direction, the structure shown in FIG. 8A is the same as the structure shown in FIG. 7A. Along the WL direction, the structure shown in FIG. 8B is the same as the structure shown in FIG. 7B.

Referring back to FIG. 6A, the method 60W can proceed to operation S620, in which an upper alternating dielectric stack can be formed on the lower alternating dielectric stack, a plurality of sacrificial structures can be formed in the upper alternating dielectric stack and each corresponding to a to-be-formed second type GLS portion. In some embodiments, operation S620 can include a plurality steps shown in exemplary flow diagram. FIGS. 9A-9B, 10A-10B, 11A-11B, 12A-12B, 13A-13B, 14A-14B, 15A-15B, 16A-16B, 17A-17B and 18A-18B illustrate some portions of the 3D structure in a cross-sectional view of certain stages of operation S620. Specifically, FIGS. 9A-9B, 11A-11B, 13A-13B, 15A-15B, and 17A-17B illustrate schematic diagrams of a portion of the 3D structure corresponding to the to-be-formed first type GLS portions 242 along 242-A direction and 242-B direction respectively as shown in FIG. 2. FIGS. 10A-10B, 12A-12B, 14A-14B, 16A-16B, and 18A-18B illustrate schematic diagrams of a portion of the 3D structure corresponding to the to-be-formed second type GLS portions 244 along 244-A direction and 244-B direction respectively as shown in FIG. 2.

Figure 10A:
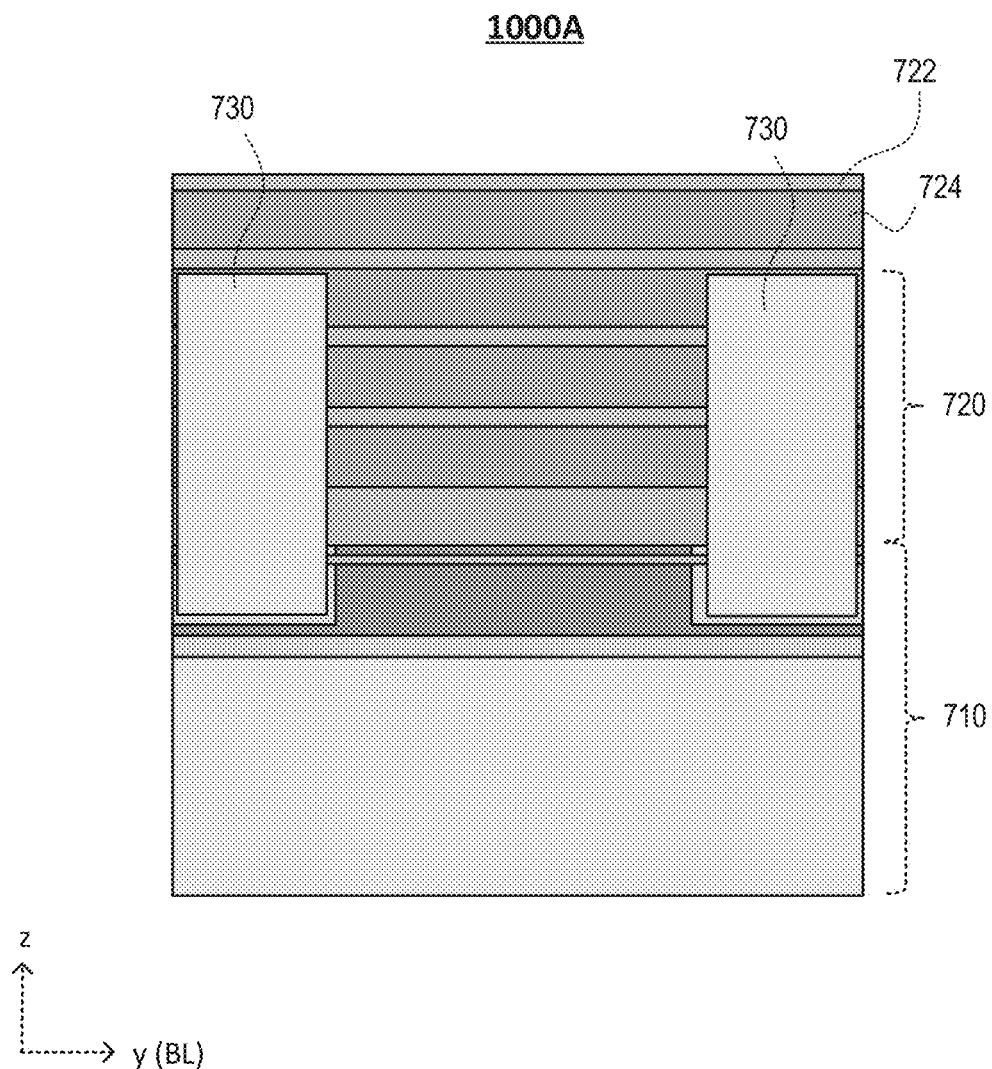
Figure 10B:
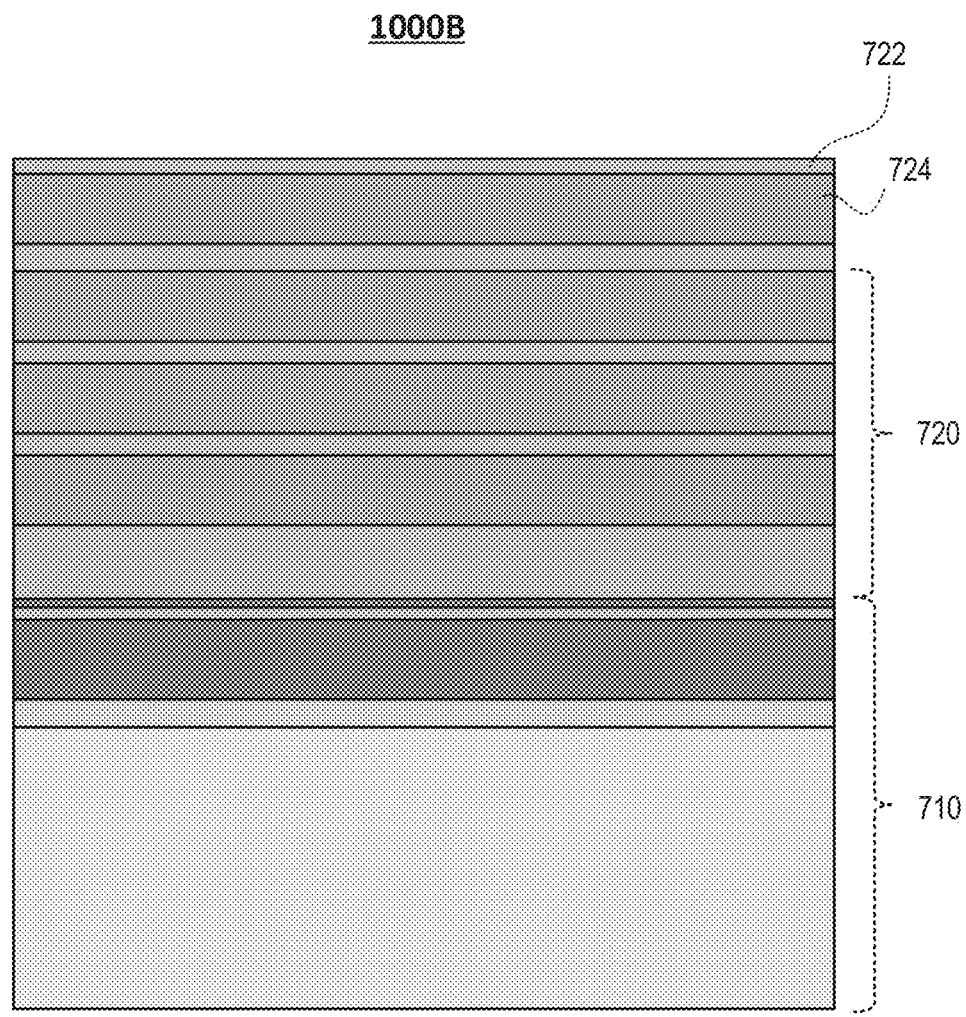

As shown in FIGS. 6B, 9A-9B and 10A-10B, operation S620 can include step S621 for forming one or more dielectric layer pairs each including a first dielectric layer 722 (e.g., oxide layer) and a second dielectric layer 724 (e.g., nitride layer). The one or more dielectric layer pairs can be formed by one or more thin film deposition processes including, but not limited to, CVD, PVD, ALD, or any combination thereof. After step S621, the portions corresponding to the to-be-formed first type GLS portions 242 and the to-be-formed second type GLS portions 244 have the same structure. Thus, along the BL direction, the structure shown in FIG. 10A is the same as the structure shown in FIG. 9A. Along the WL direction, the structure shown in FIG. 10B is the same as the structure shown in FIG. 9B.

Figure 6B:
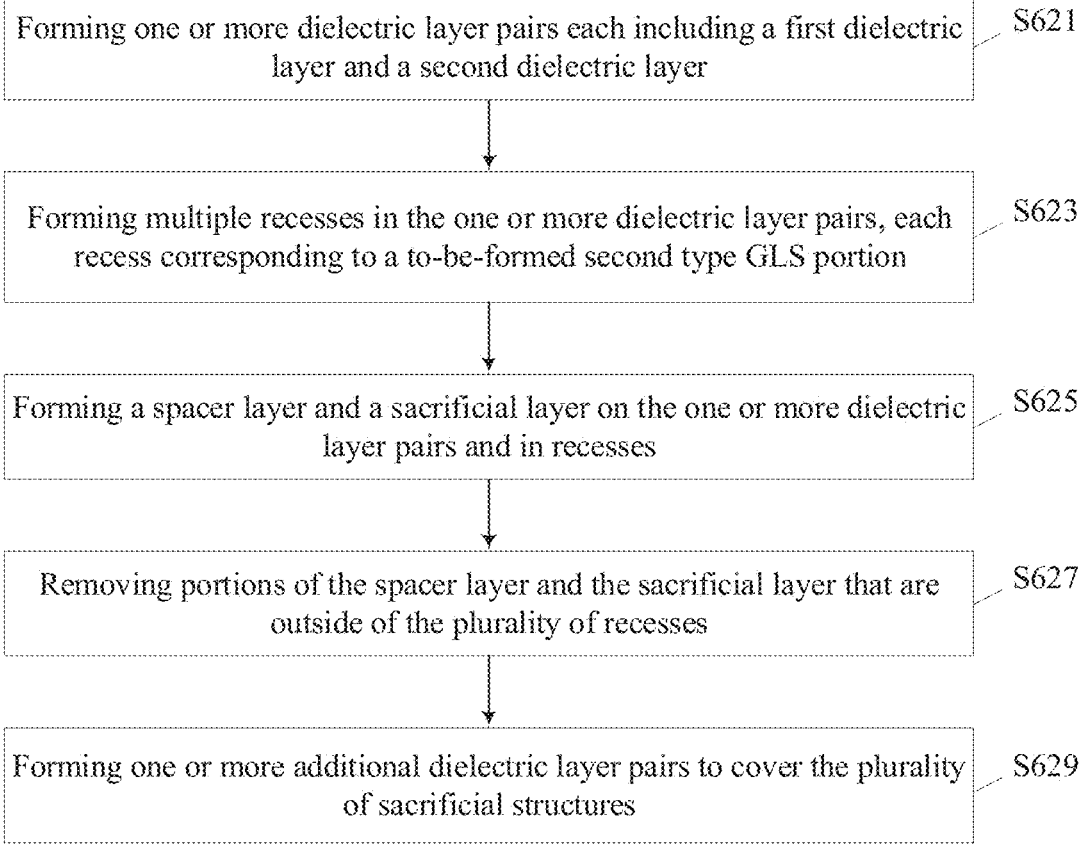
Figure 12A:
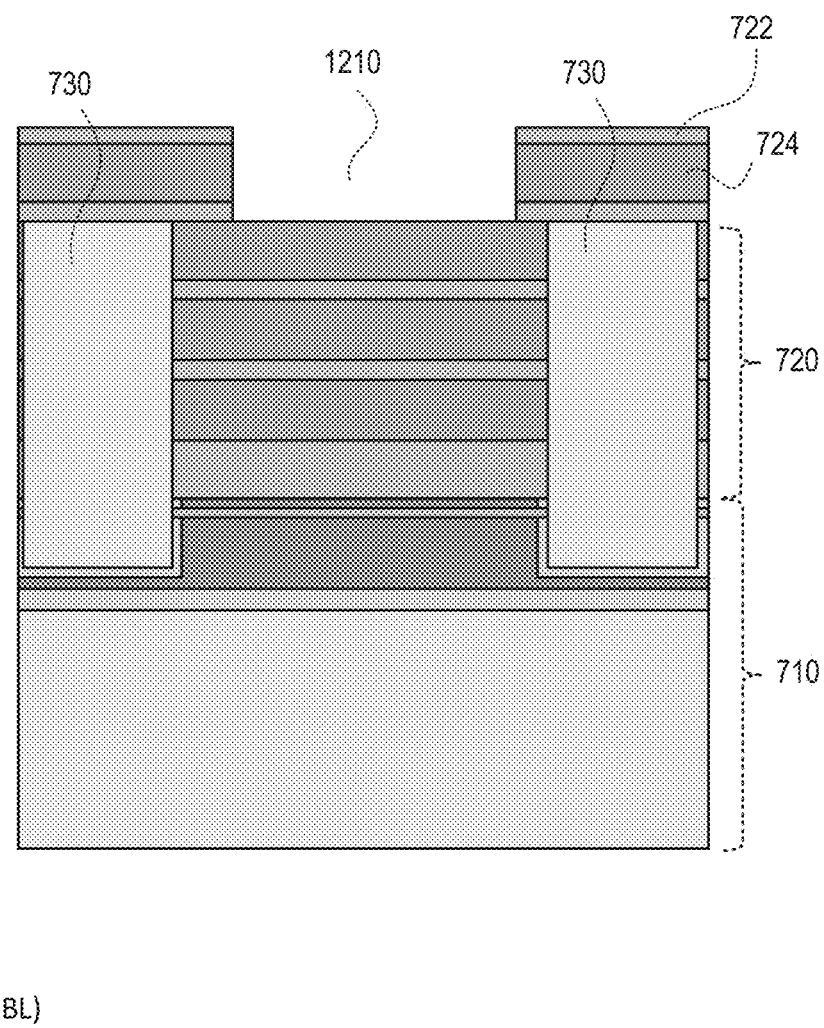
Figure 12B:
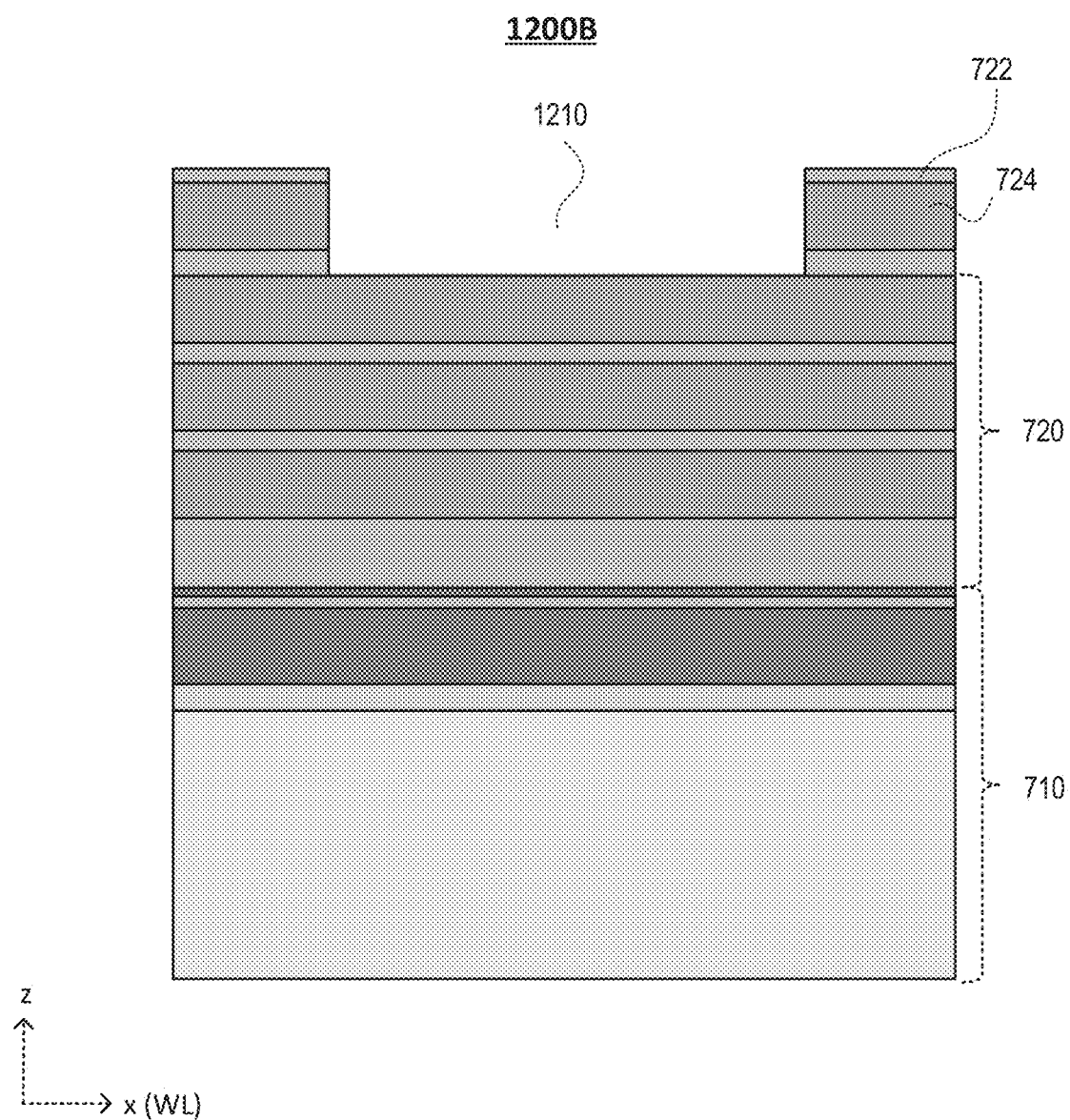
Figure 13A:
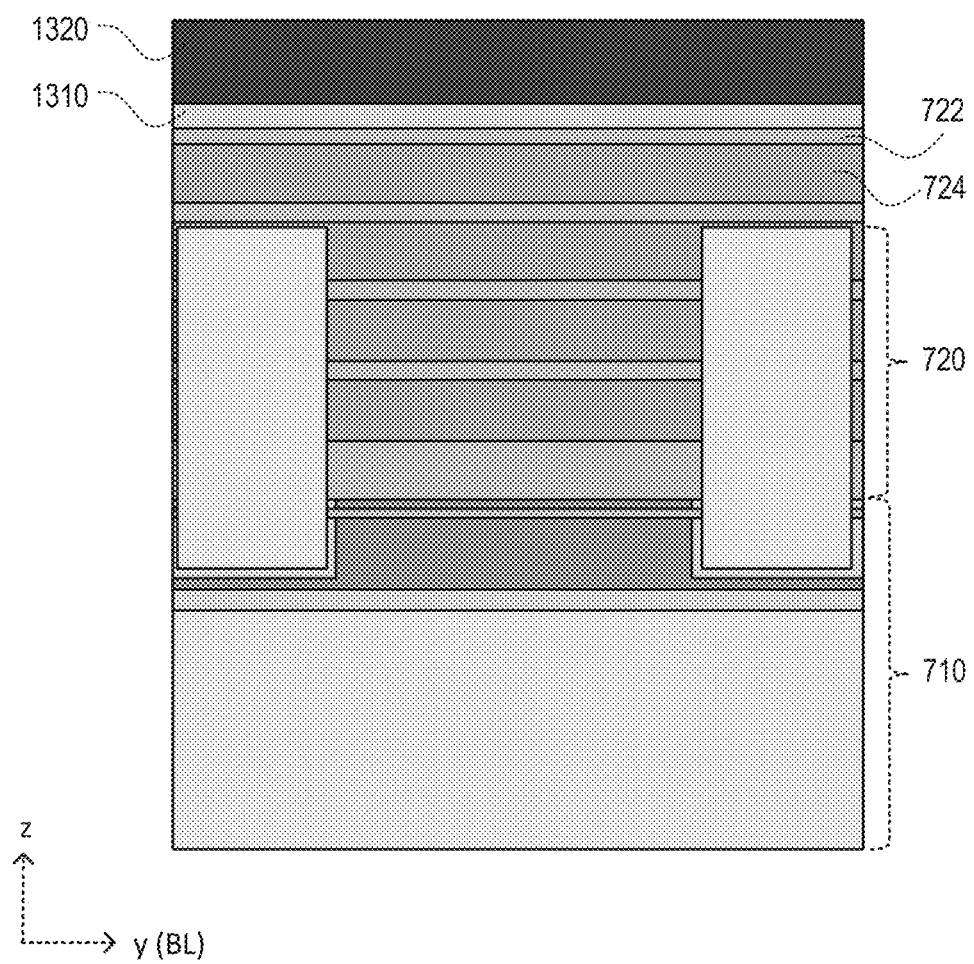
Figure 13B:
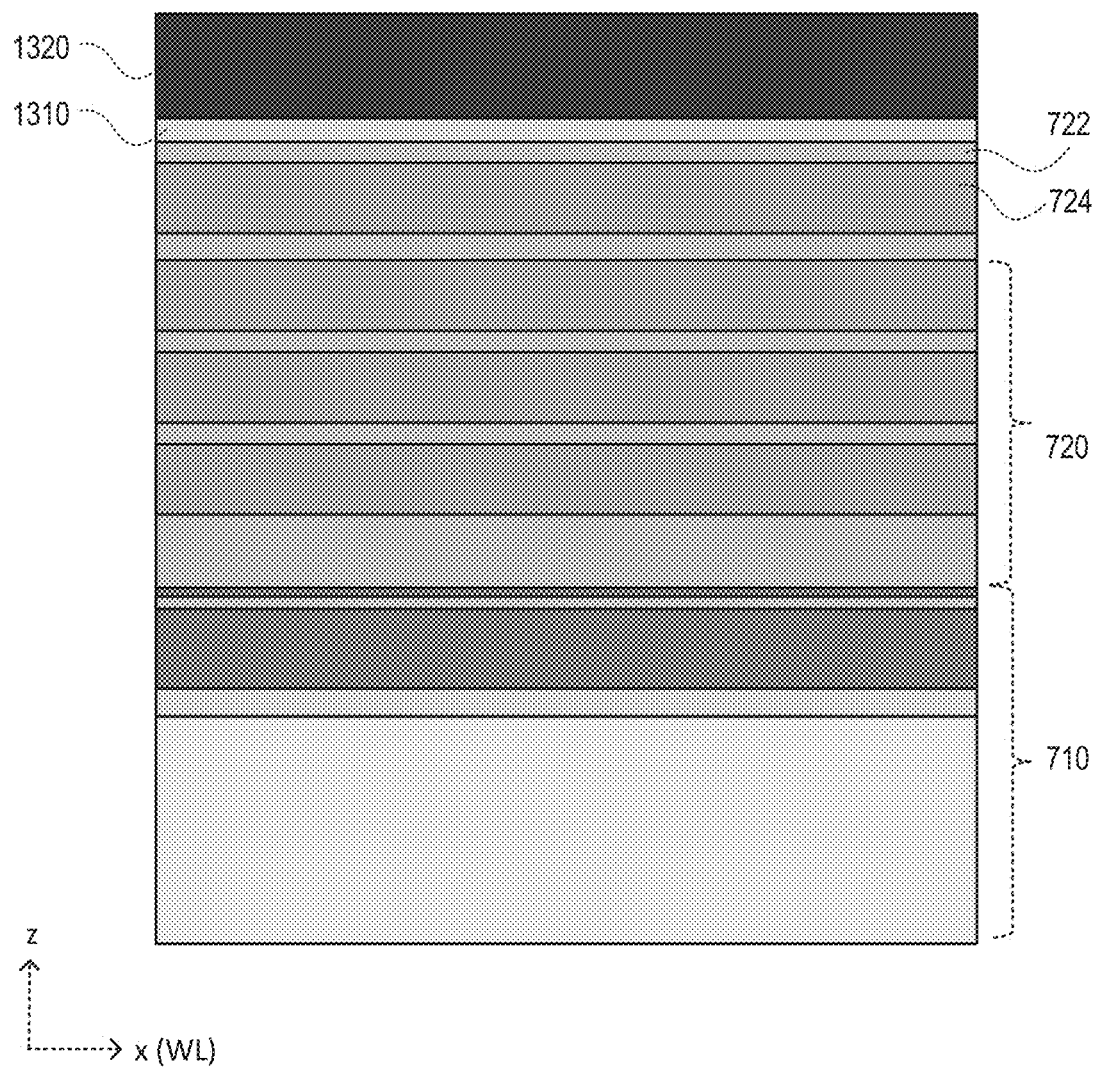

As shown in FIGS. 6B, 12A and 12B, operation S620 can include step S623 for forming a plurality of recesses 1210 in the one or more dielectric layer pairs, each recess 1210 corresponding to a to-be-formed second type GLS portion. In some embodiments, the plurality of recesses 1210 can be formed by any suitable patterning processes. For example, a mask layer (not shown) can be formed over the one or more dielectric layer pairs, and the mask layer can be patterned by using, e.g., photolithography, to form openings corresponding to the multiple to-be-formed second type GLS portion in the patterned mask layer. A suitable etching process, e.g., dry etch and/or wet etch, can be performed to remove portions of the one or more dielectric layer pairs exposed by the openings until the multiple opening expose the top surface of the lower alternating dielectric stack 720. The mask layer can be removed after the formation of the multiple recesses 1210. The width of the recesses 1210 in the BL direction is larger than a to-be-formed second type GLS portion.

Figure 11A:
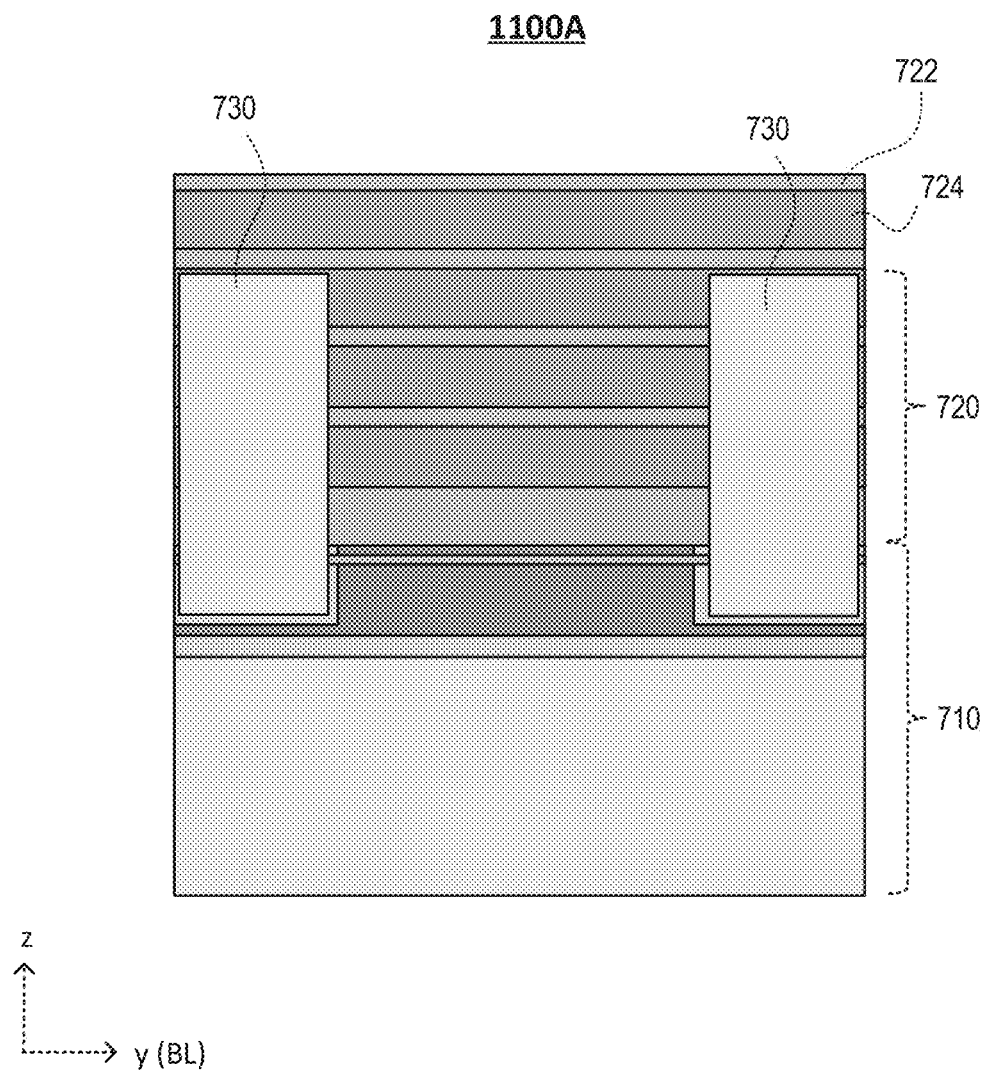
Figure 11B:
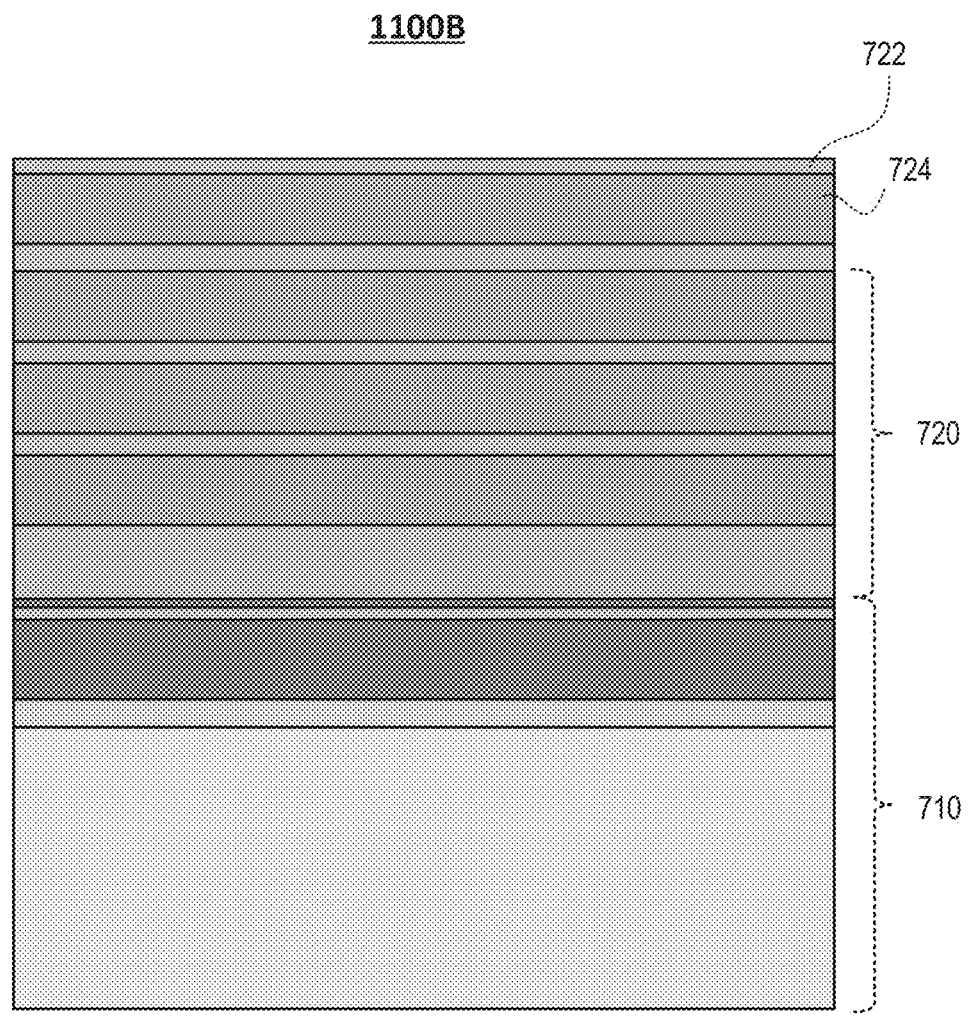
Figure 11B:
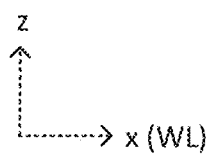

Since the recesses 1210 are only formed in the positions corresponding to the to-be-formed second type GLS portion, after step S623, the portions corresponding to the to-be-formed first type GLS portions 242 remain the same structure. Thus, along the BL direction, the structure shown in FIG. 11A is the same as the structure shown in FIG. 10A. Along the WL direction, the structure shown in FIG. 11B is the same as the structure shown in FIG. 10B.

Figure 14A:
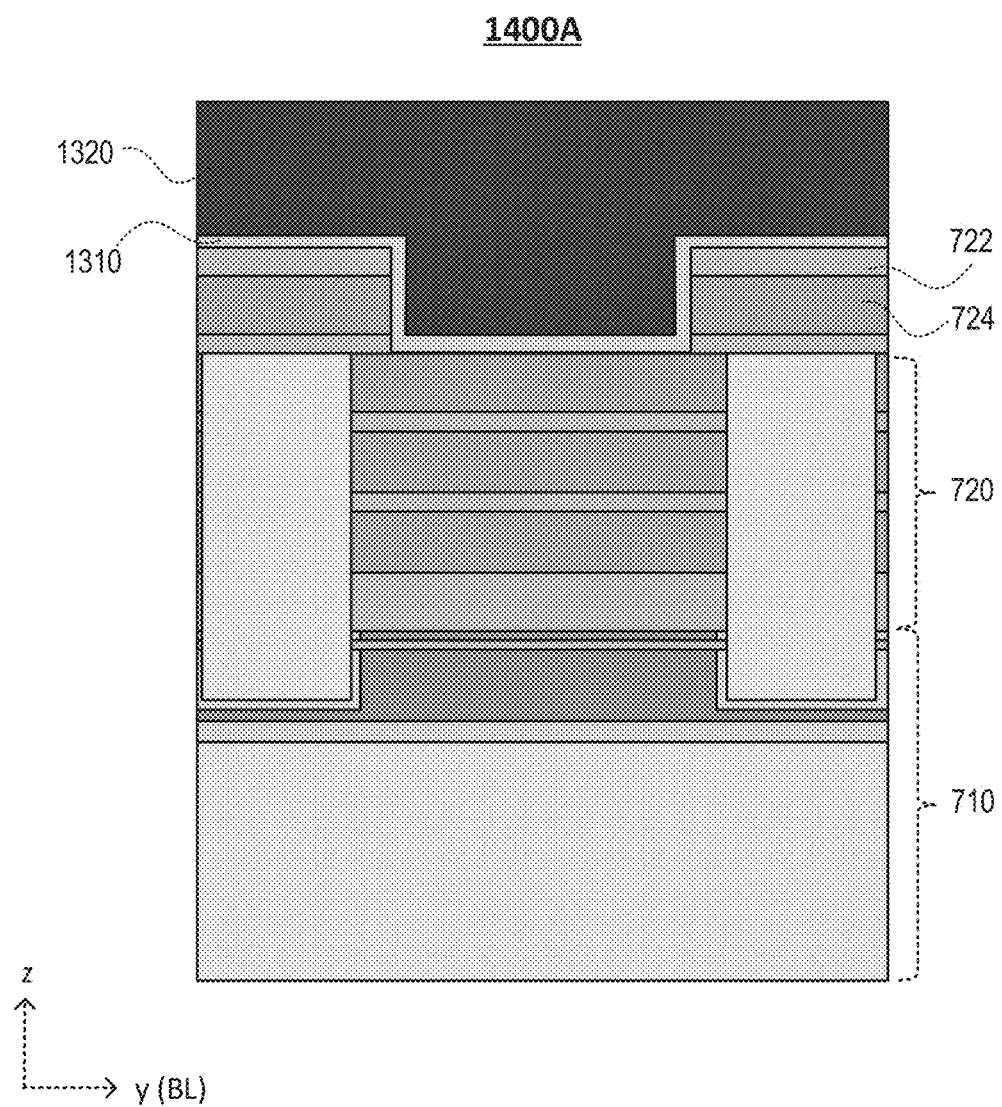
Figure 14B:
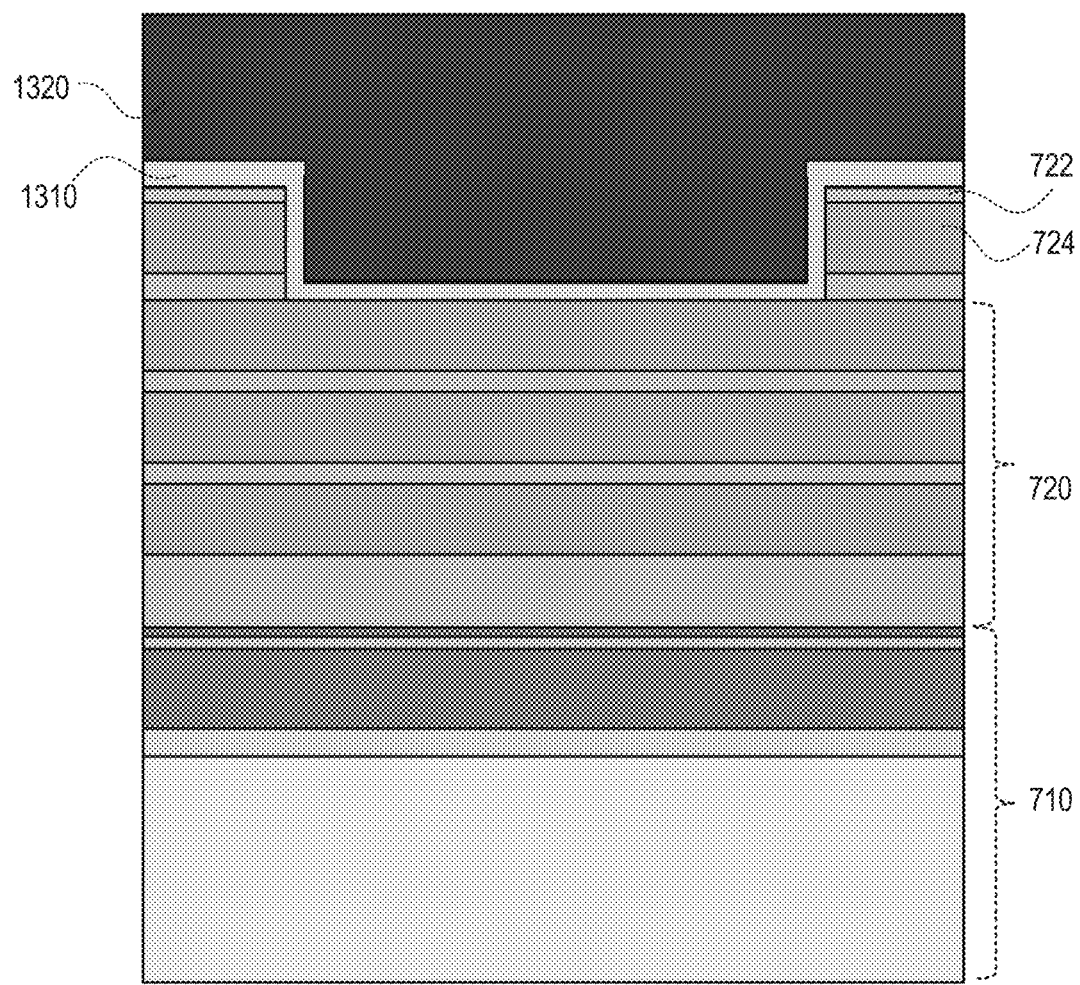

As shown in FIGS. 6B, 13A-13B and 14A-14B, operation S620 can include step S625 for forming a spacer layer 1310 and a sacrificial layer 1320 on the one or more dielectric layer pairs and in the plurality of recesses 1210. In some embodiments, the spacer layer 1310 can be an oxide layer formed by any suitable thin film deposition process including, but not limited to, CVD, PVD, ALD, or any combination thereof. As shown in FIGS. 14A and 14B, the spacer layer 1310 can be formed to cover the sidewalls and bottom surface of each recess 1210. The sacrificial layer 1320 can include any suitable non-conductive material (e.g., amorphous silicon, polysilicon, silicon germanium, amorphous carbon, silicon nitride, diamond-like carbon, and porous organosilicate glass), and can be deposited by any suitable deposition method such as CVD, PVD, ALD, or any combination thereof. As shown in FIGS. 14A and 14B, the sacrificial layer 1320 can be formed to fill each recess 1210 and cover the spacer layer 1310.

Figure 15A:
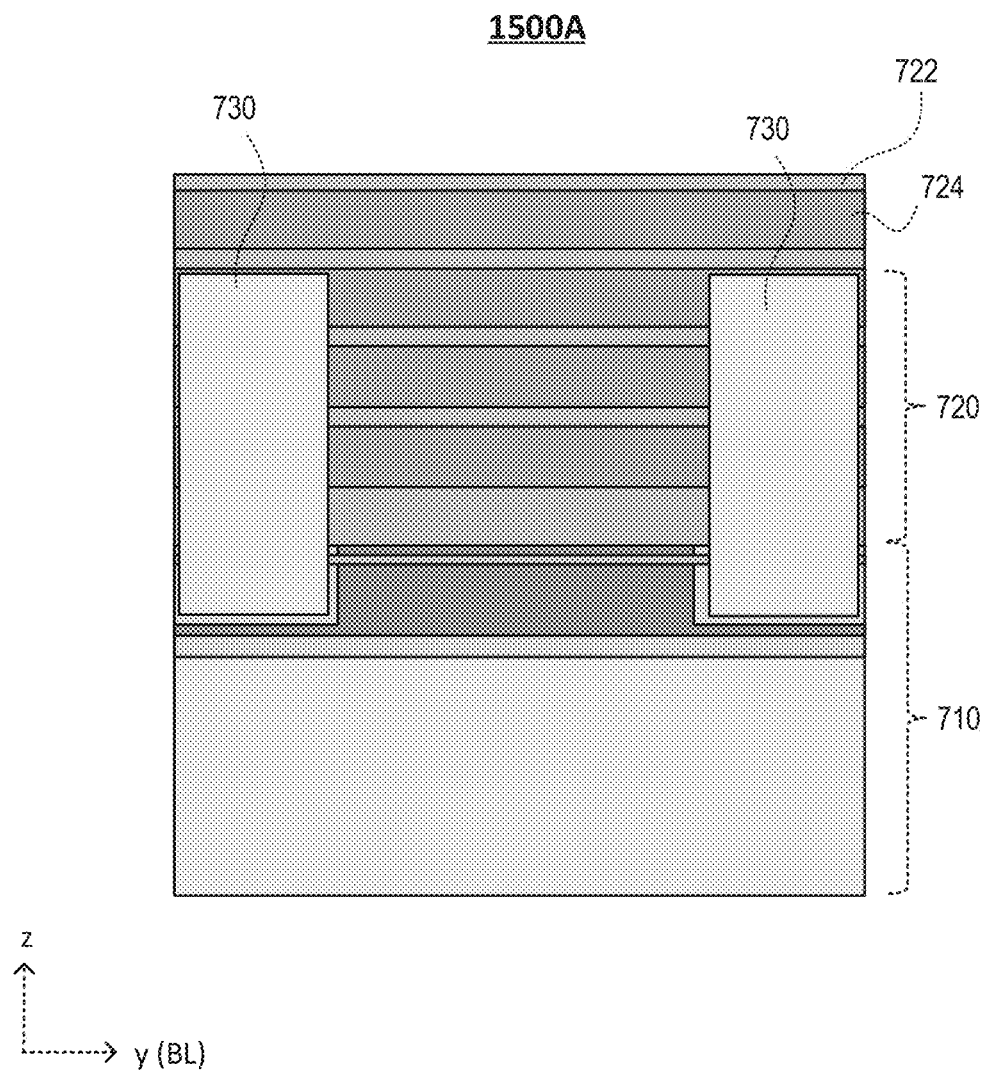
Figure 15B:
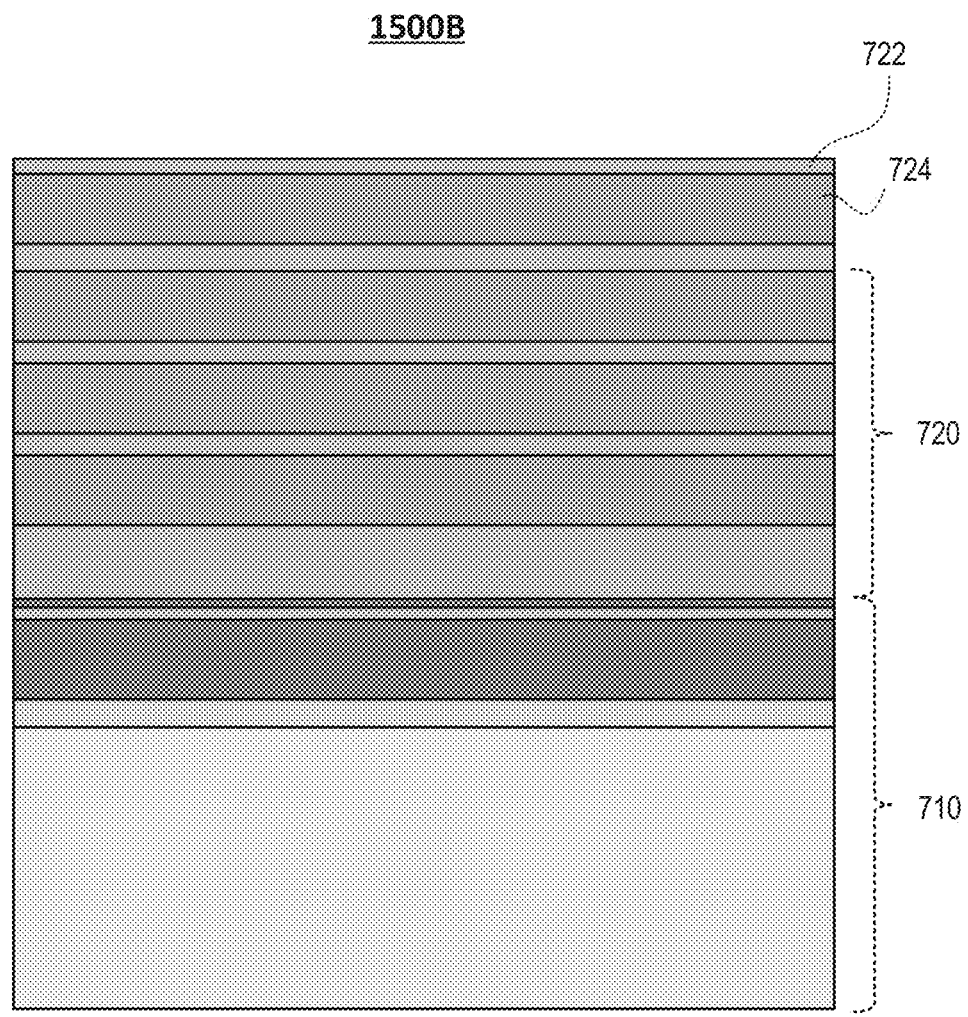
Figure 16A:
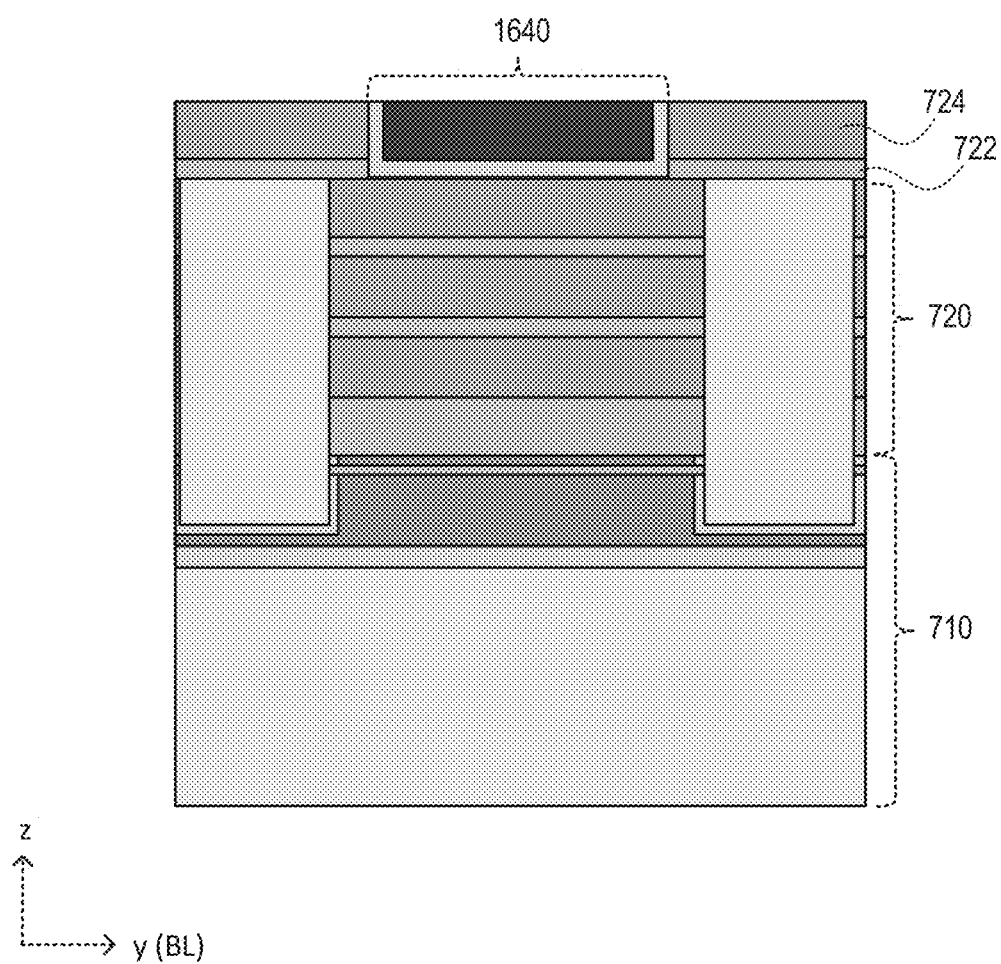
Figure 16B:
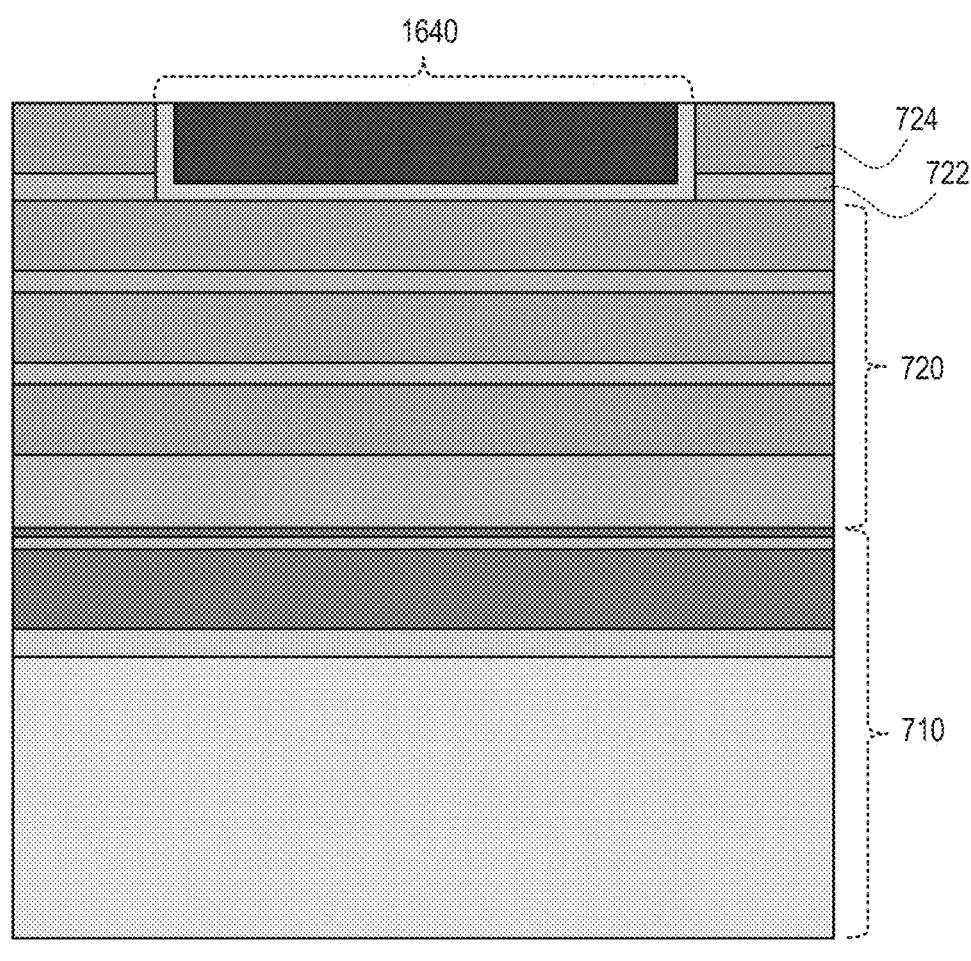
Figure 17A:
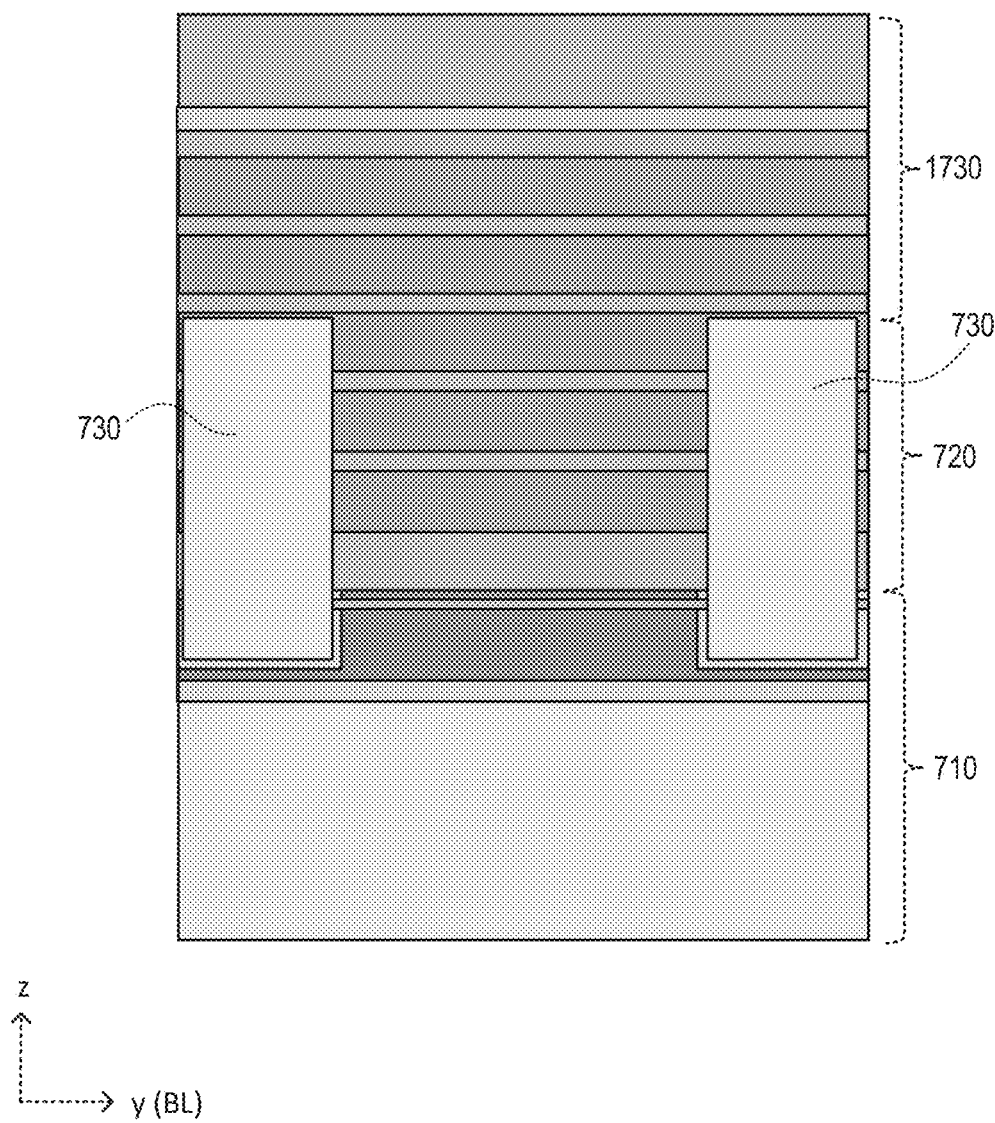
Figure 17B:
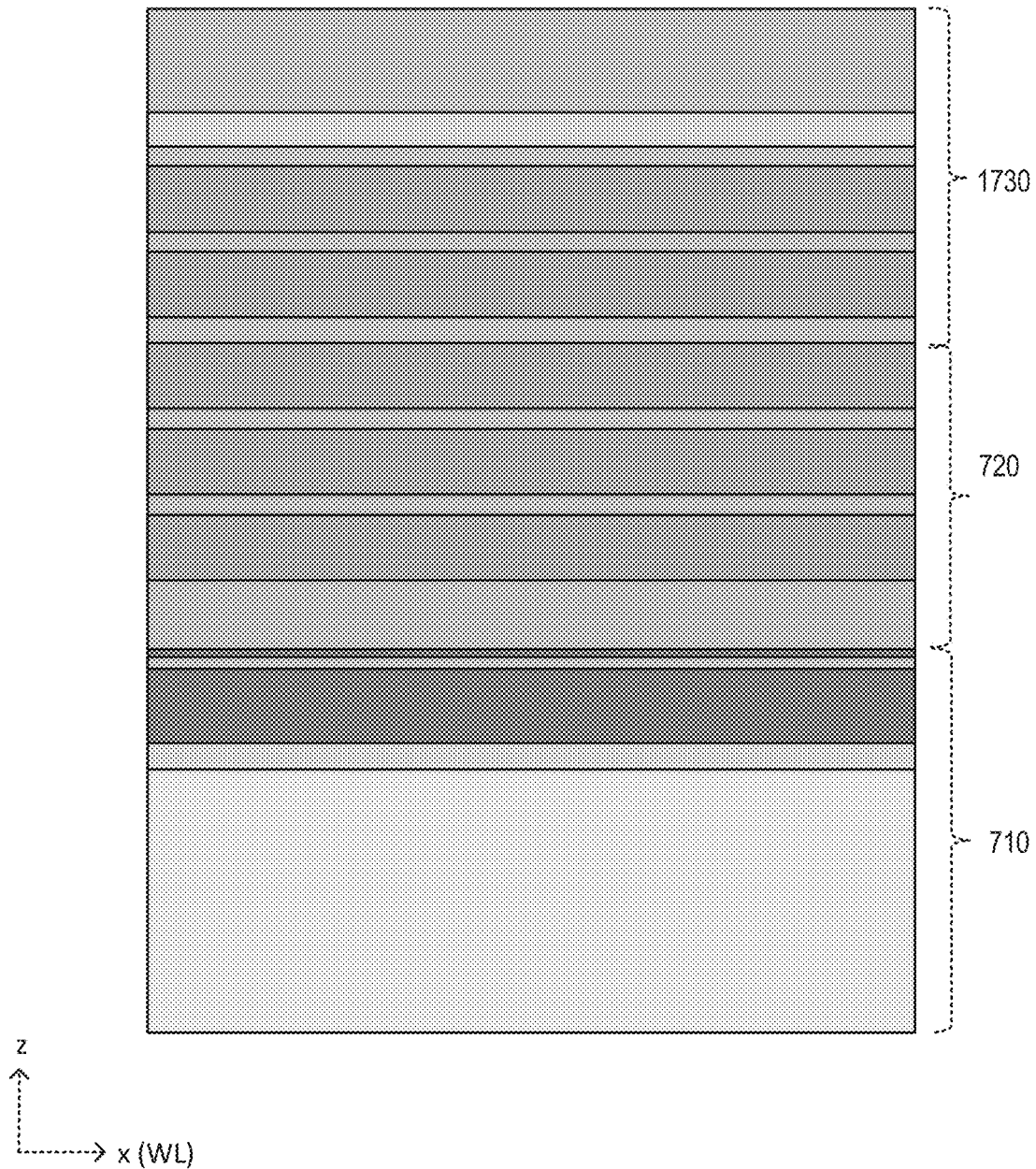

As shown in FIGS. 6B, 15A-15B and 16A-16B, operation S620 can include step S627 for removing portions of the spacer layer 1310 and the sacrificial layer 1320 that are outside of the plurality of recesses 1210. Any suitable planarization method (e.g., CMP) and/or recess etch (e.g., dry etch and/or wet etch) can be performed to remove any excessive portions of the spacer layer 1310 and the sacrificial layer 1320 over the lower alternating dielectric stack 720. After step S627, the portions corresponding to the to-be-formed first type GLS portions 242 remain the same structure as after operation S610. Thus, along the BL direction, the structure shown in FIG. 15A is the same as the structure shown in FIG. 11A. Along the WL direction, the structure shown in FIG. 15B is the same as the structure shown in FIG. 11B. As shown in FIGS. 16A and 16B, the remaining portions of the spacer layer 1310 and the sacrificial layer 1320 inside the plurality of recesses 1210 can form the plurality of the sacrificial structures 1640 each corresponding to a to-be-formed second type GLS portion. The plurality of the sacrificial structures 1640 can have a co-planar top-surface with the lower alternating dielectric stack 720.

Figure 18A:
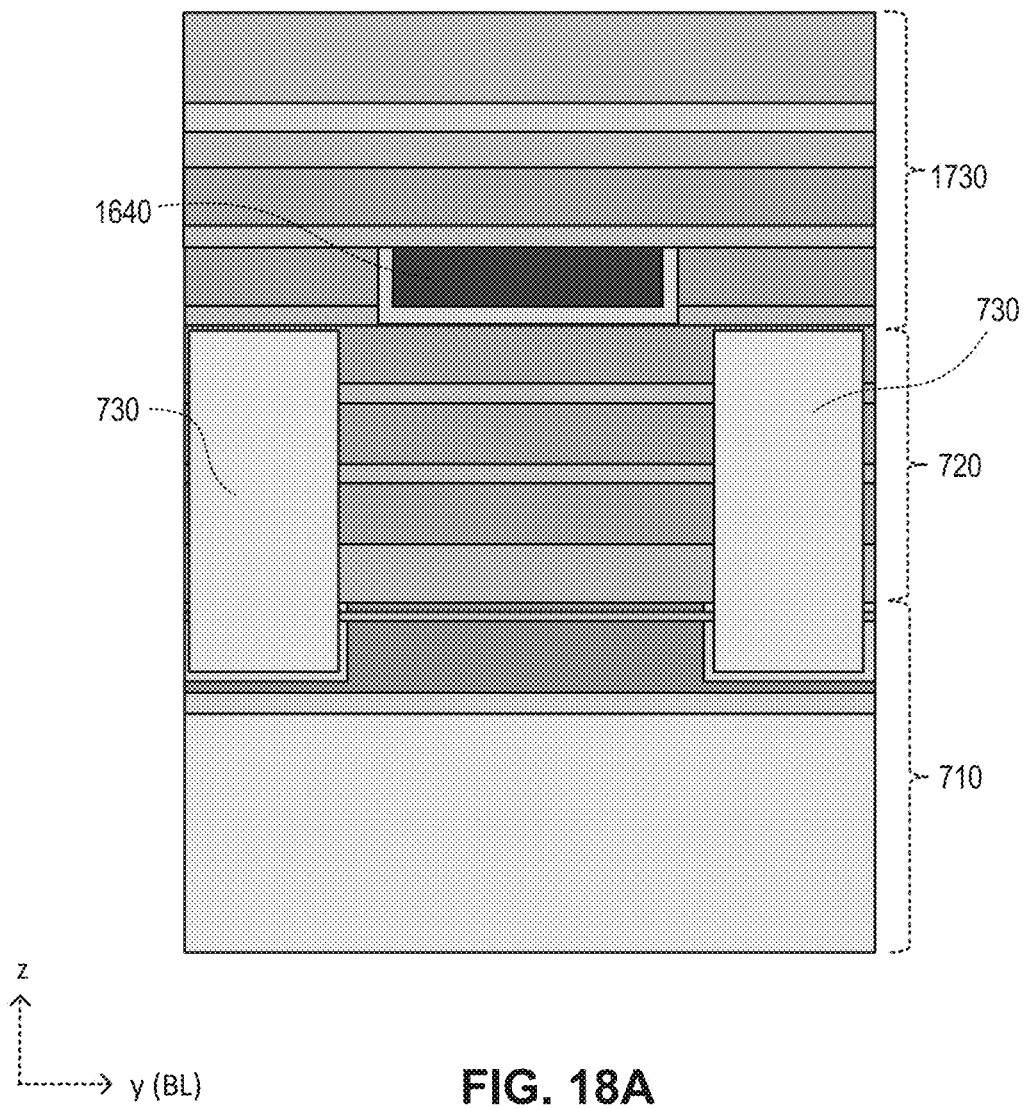
Figure 18B:
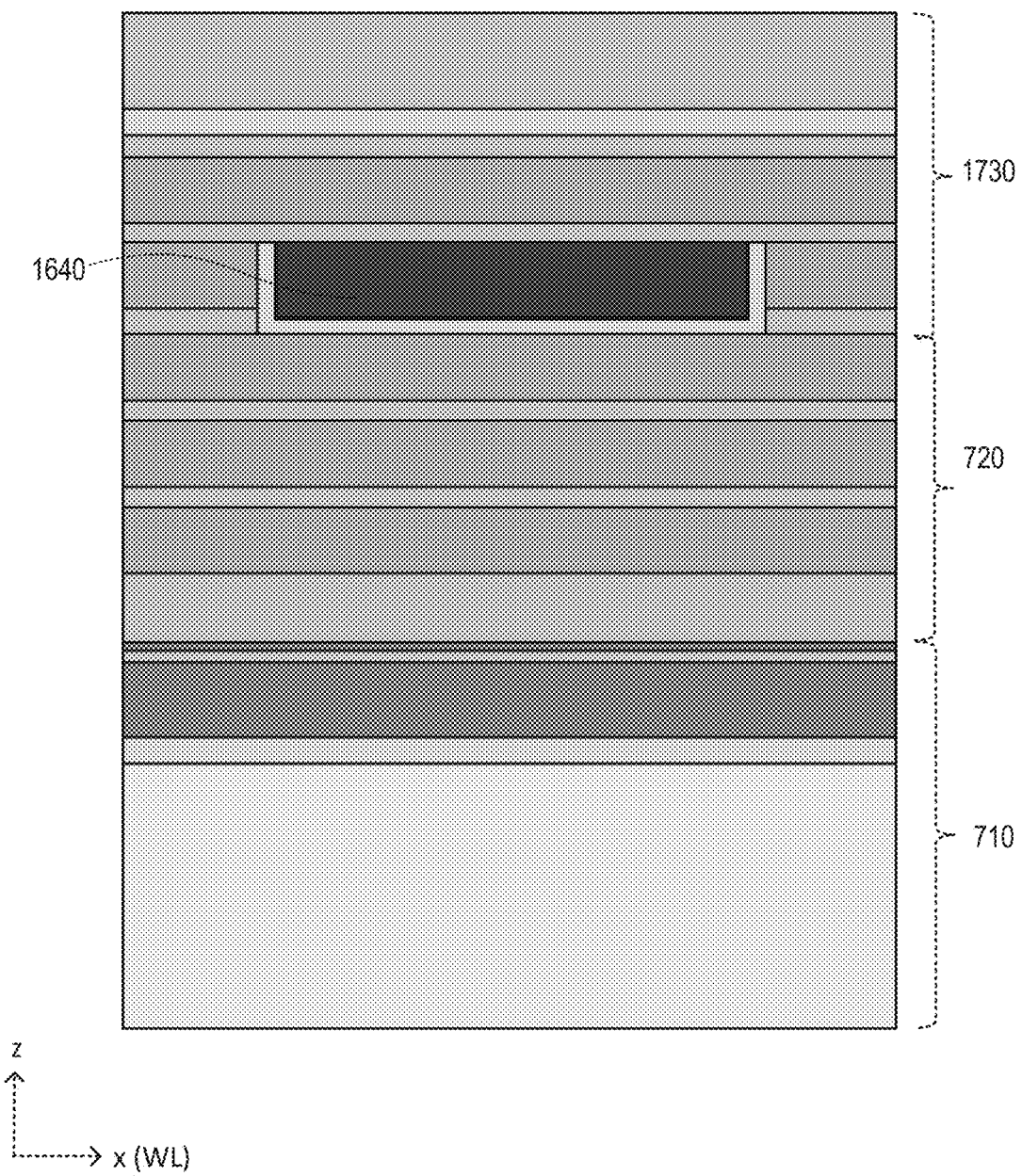

As shown in FIGS. 6B, 17A-17B and 18A-18B, operation S620 can include step S629 for forming one or more additional dielectric layer pairs to cover the plurality of sacrificial structures 1640. The plurality of the dielectric layer pairs formed in steps S621 and S629 form the upper alternating dielectric stack 1730. As shown in 18A and 18B, the plurality of the sacrificial structures 1640 are embedded in the upper alternating dielectric stack 1730. It is noted that, the upper alternating dielectric stack 1730 can include any suitable number of dielectric layer pairs, such as equal to or larger than 32 or 64. The number of dielectric layer pairs in the upper alternating dielectric stack 1730 shown in the figures is exemplary and do not limit the scope of the present disclosure. Further, the height of the sacrificial structure 1640 shown in FIGS. 18A and 18B is equal to the height of a dielectric layer pair. In some other embodiments not shown in the figures, the height of the sacrificial structure 1640 can be less than or greater than the height of a dielectric layer pair.

Figure 19A:
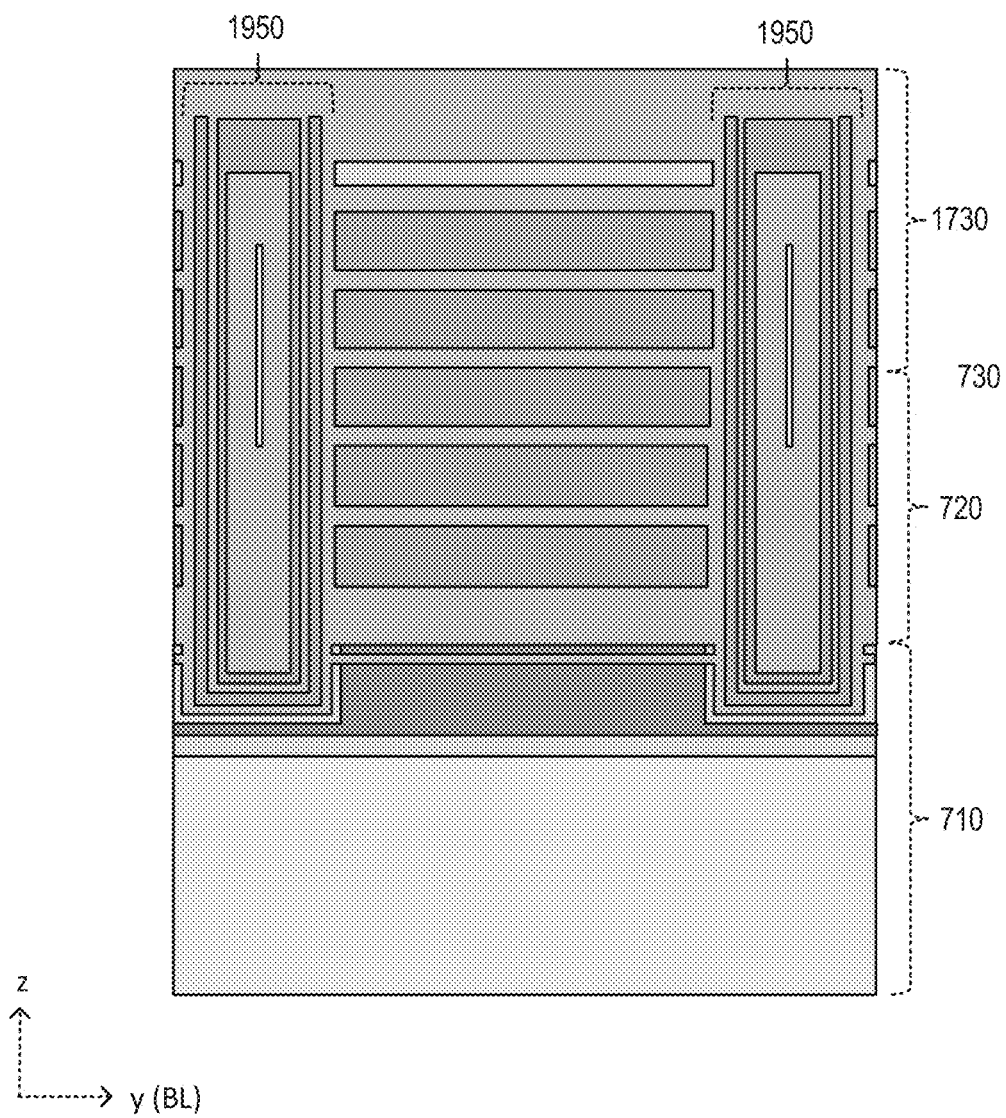
Figure 19B:
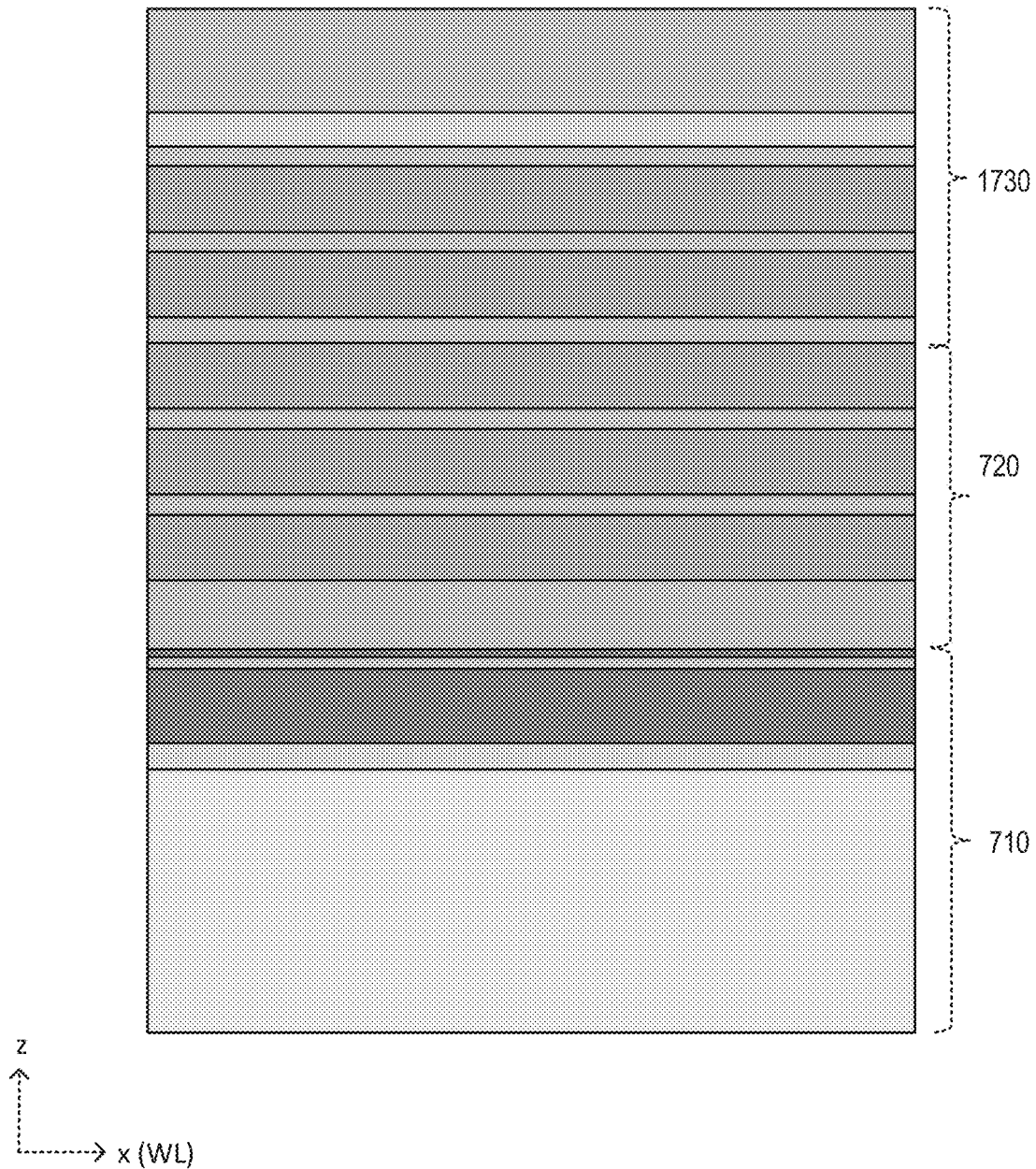
Figure 20A:
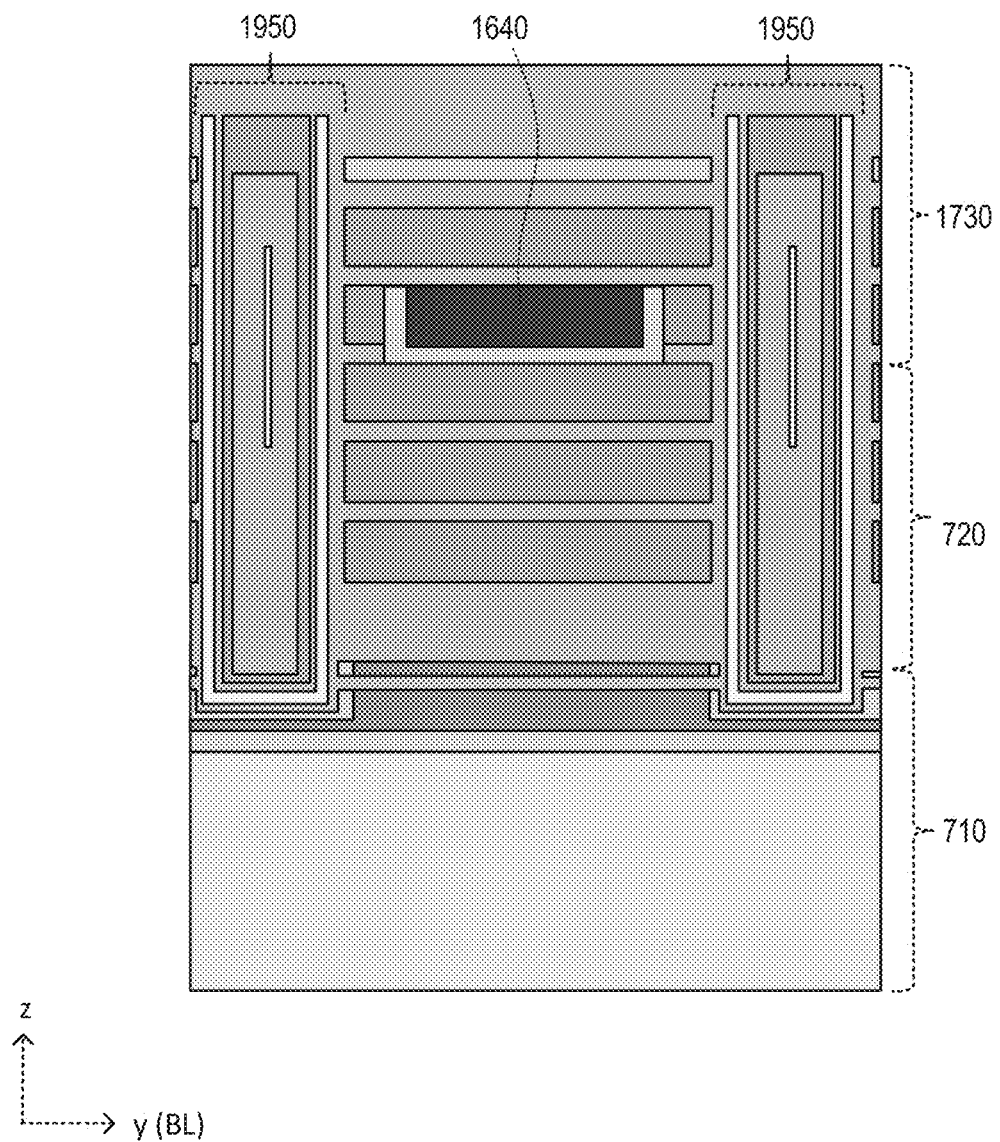
Figure 20B:
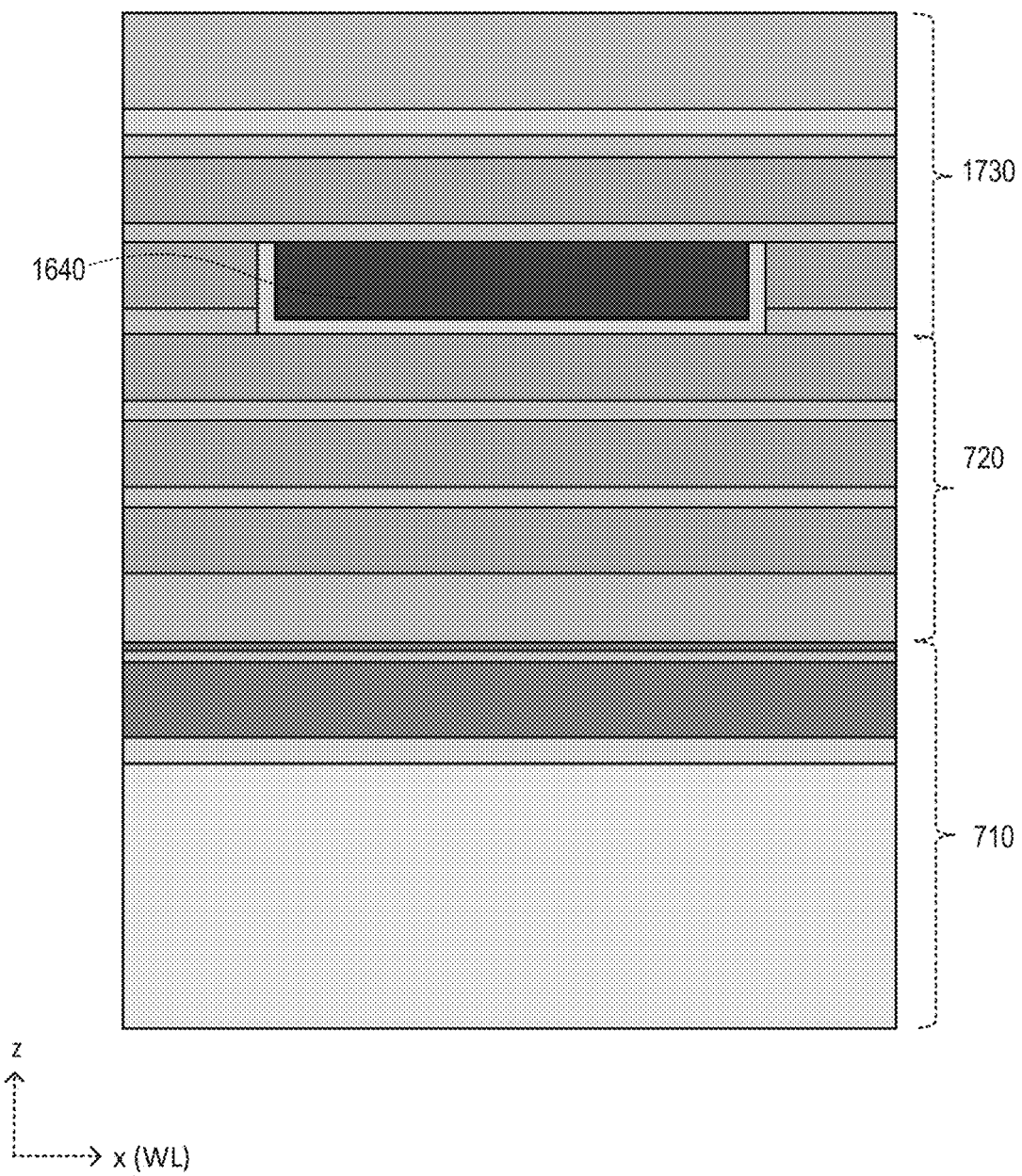

Referring back to FIG. 6A, the method 600 can proceed to operation S630, in which a plurality of channel structures can be formed to penetrate the upper alternating dielectric stack and the lower alternating dielectric stack. FIGS. 19A-19B and 20A-20B illustrate some portions of the 3D structure in a cross-sectional view of after operation S630. Specifically, FIGS. 19A-19B illustrate schematic diagrams of a portion of the 3D structure corresponding to the to-be-formed first type GLS portions 242 along 242-A direction and 242-B direction respectively as shown in FIG. 2, and FIGS. 20A-20B illustrate schematic diagrams of a portion of the 3D structure corresponding to the to-be-formed second type GLS portions 244 along 244-A direction and 244-B direction respectively as shown in FIG. 2, according to some embodiments.

In some embodiments, each channel structure 1950 can include a channel hole extending vertically through the upper alternating dielectric stack 1730 and the lower alternating dielectric stack 720, an epitaxial layer (not shown) on the bottom of the channel hole, a functional layer on the sidewall of the channel hole, a channel layer covering the functional layer, and a filling structure enclosed by the channel layer. In some embodiments, the functional layer can include a barrier layer, a storage layer, and a tunneling layer.

In some embodiments, fabrication processes to form the channel structures 1950 can include forming a plurality of channel holes each extending vertically through the upper alternating dielectric stack 1730 and the lower alternating dielectric stack 720. Each channel hole can have a high aspect ratio, and can be formed by etching portions of the upper alternating dielectric stack 1730 above the sacrificial lower channel filling structure 730, etching the sacrificial lower channel filling structure 730, and a subsequent cleaning process. The etching process to form the channel hole can be a wet etching, a dry etching, or a combination thereof.

In some embodiments, fabrication processes to form the channel structures 1950 can include forming a epitaxial layer at a bottom of each channel hole. In some embodiments, the epitaxial layer can be a polycrystalline silicon (polysilicon) layer formed by using a selective epitaxial growth (SEG) process. For example, an SEG pre-clean process can be performed to clean the multiple channel holes. A following deposition process can be performed to form a polysilicon layer at the bottom of each channel hole. In some embodiments, any suitable doping process, such as an ion metal plasma (IMP) process, can be performed on the polysilicon layer to form the epitaxial layer.

In some embodiments, fabrication processes to form the channel structures 1950 can include forming a functional layer on the sidewall of each channel hole. The functional layer can be a composite dielectric layer, such as a combination of a barrier layer, a storage layer, and a tunneling layer. The functional layer, including the barrier layer, the storage layer, and the tunneling layer, can be formed by one or more thin film deposition processes, such as ALD, CVD, PVD, any other suitable processes, or any combination thereof.

In some embodiments, the barrier layer can be formed between the storage layer and the sidewall of the channel hole. The barrier layer can be used for blocking the outflow of the electronic charges. In some embodiments, the barrier layer can be a silicon oxide layer or a combination of silicon oxide/silicon nitride/silicon oxide (ONO) layers. In some embodiments, the barrier layer includes high dielectric constant (high k-value) dielectrics (e.g., aluminum oxide). In some embodiments, a thickness of the barrier layer can be in a range from about 3 nm to about 20 nm.

The storage layer can be formed between the tunneling layer and the barrier layer. Electrons or holes from the channel layer can tunnel to the storage layer through the tunneling layer. The storage layer can be used for storing electronic charges (electrons or holes) for memory operation. The storage or removal of charge in the storage layer can impact the on/off state and/or a conductance of the semiconductor channel. The storage layer can include one or more films of materials including, but are not limited to, silicon nitride, silicon oxynitride, a combination of silicon oxide and silicon nitride, or any combination thereof. In some embodiments, the storage layer can include a nitride layer formed by using one or more deposition processes. In some embodiments, a thickness of the storage layer can be in a range from about 3 nm to about 20 nm.

The tunneling layer can be formed on the sidewall of the storage layer. The tunneling layer can be used for tunneling electronic charges (electrons or holes). The tunneling layer can include dielectric materials including, but not limited to, silicon oxide, silicon nitride, silicon oxynitride, or any combination thereof. In some embodiments, the tunneling layer can be an oxide layer formed by using a deposition process. In some embodiments, a thickness of the tunneling layer can be in a range from about 3 nm to about 20 nm.

In some embodiments, fabrication processes to form the channel structures 1950 further include forming a channel layer covering the sidewall of the functional layer. In some embodiments, the channel layer can be an amorphous silicon layer or a polysilicon layer formed by using a thin film deposition process, such as ALD, CVD, PVD, or any other suitable process. In some embodiments, a thickness of the channel layer can be in a range from about 5 nm to 20 nm.

In some embodiments, fabrication processes to form the channel structures 1950 further include forming a filling structure to cover the channel layer and fill the channel hole. In some embodiments, the filling structure can be an oxide layer formed by using any suitable deposition process, such as ALD, CVD, PVD, etc. In some embodiments, the filling structure can include one or more airgaps.

Referring back to FIG. 6A, the method 600 can proceed to operation S640, in which a plurality of first type gate line slits (GLSs) and second type GLSs can be formed. The plurality of first type gate line slits (GLSs) and second type GLSs can extend substantially in a straight line along the WL direction between two arrays of channel structures 1950. In some embodiments, each first type GLS can vertically penetrate the upper alternating dielectric stack and the lower alternating dielectric stack. Each second type GLS can include a plurality of first type GLS segments and a plurality of second type GLS segments arranged in a staggered way along the WL direction. Each first type GLS segment can vertically penetrate the upper alternating dielectric stack and the lower alternating dielectric stack, while each second type GLS segment only vertically extends in the upper alternating dielectric stack but does not extend into the lower alternating dielectric stack.

Figure 21A:
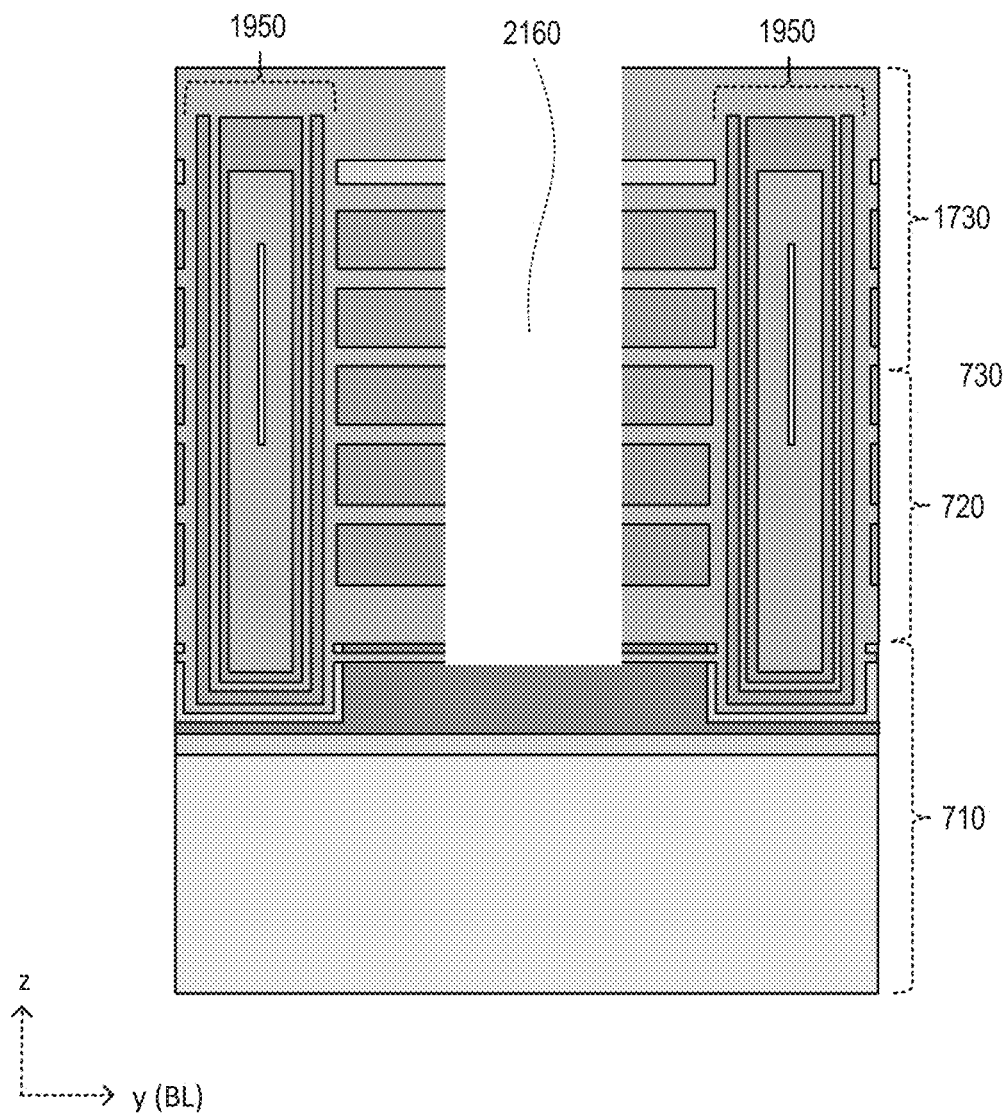
Figure 21B:
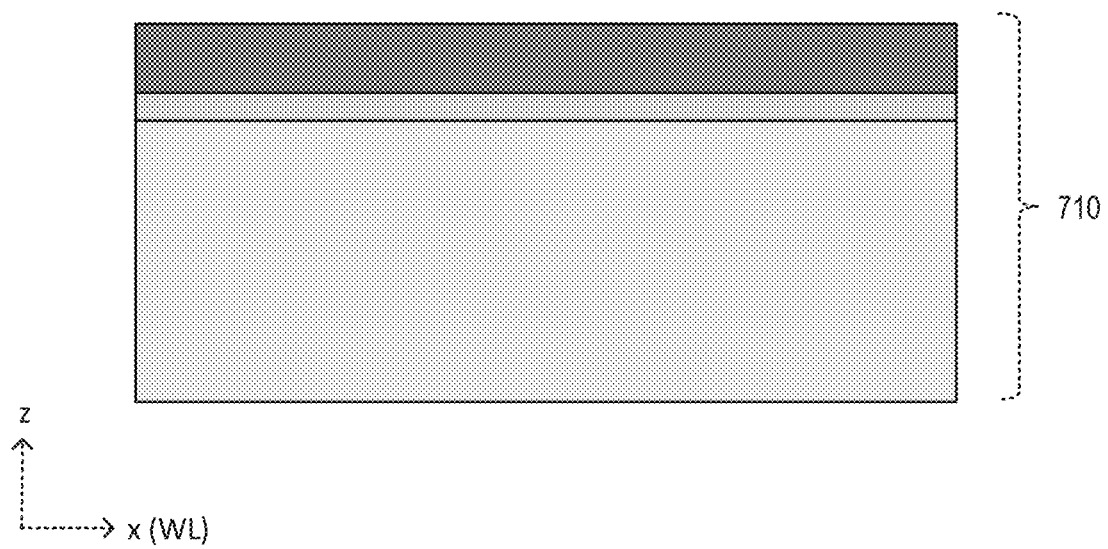
Figure 22A:
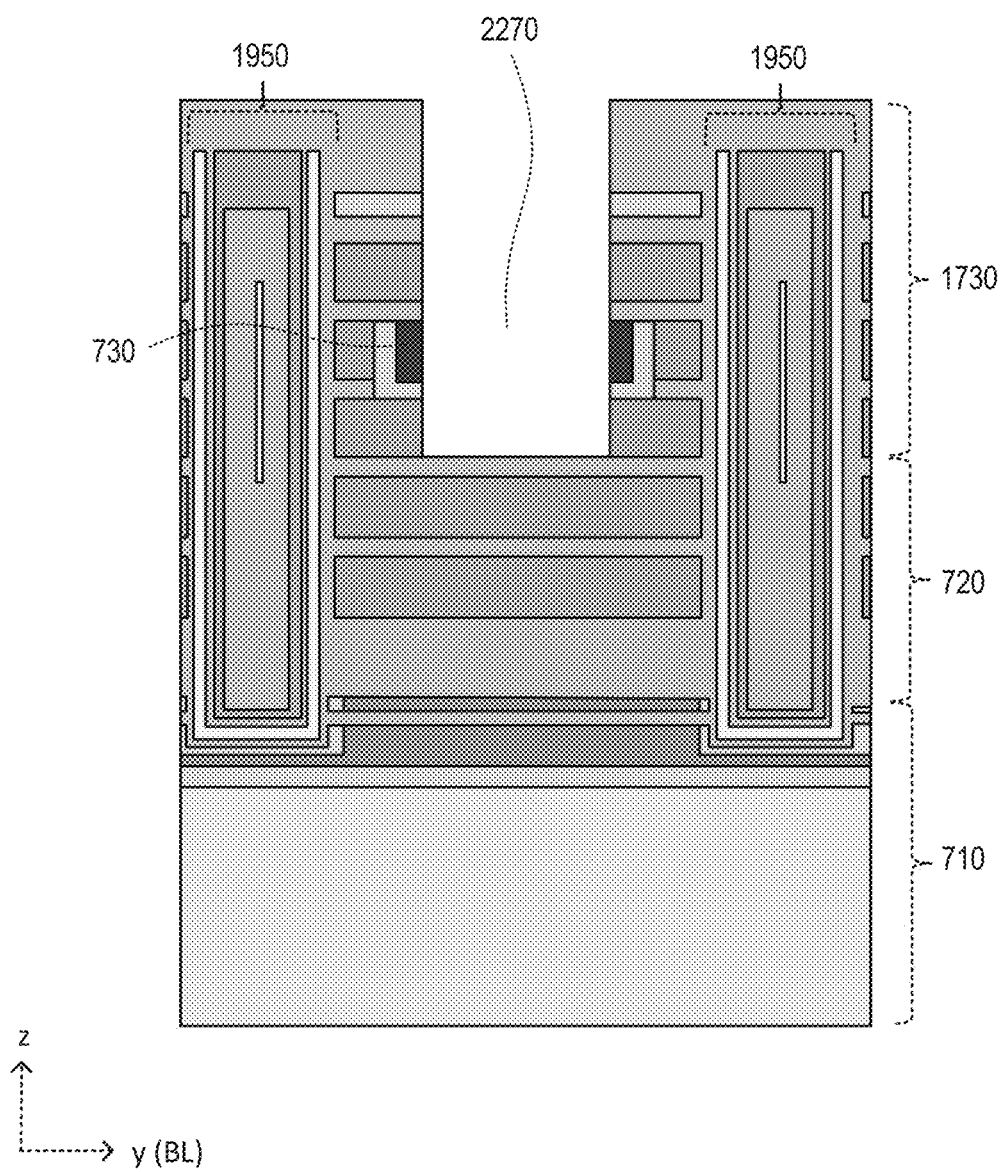
Figure 22B:
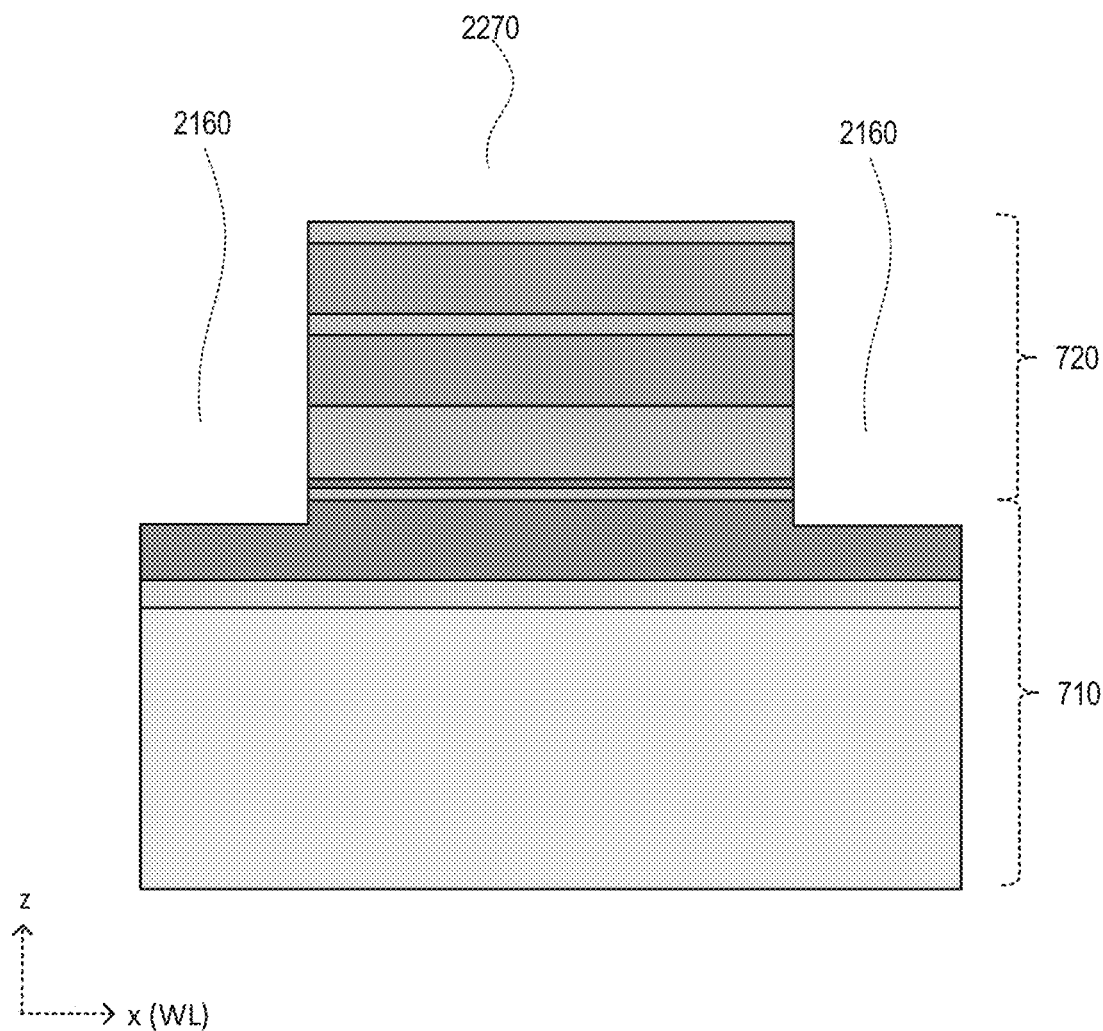

FIGS. 21A-21B and 22A-22B illustrate some portions of the 3D structure in a cross-sectional view of after operation S640. Specifically. FIGS. 21A-21B illustrate schematic diagrams of a portion of the 3D structure corresponding to the to-be-formed first type GLS portions 242 along 242-A direction and 242-B direction respectively as shown in FIG. 2, and FIGS. 22A-22B illustrate schematic diagrams of a portion of the 3D structure corresponding to the to-be-formed second type GLS portions 244 along 244-A direction and 244-B direction respectively as shown in FIG. 2, according to some embodiments.

As shown in FIGS. 21A and 21B, each first type GLS segment 2160 can penetrate the upper alternating dielectric stack and the lower alternating dielectric stack, and may extend into the substrate 710. As shown in FIGS. 22A and 22B, each second type GLS segment only extends in the upper alternating dielectric stack 1730 but does not extend into the lower alternating dielectric stack 720. In some embodiments, the plurality of first type GLSs and second type GLSs can be formed simultaneously in a same fabricating process. For example, the fabricating process can include forming a mask layer over the upper alternating dielectric stack and patterning the mask using, e.g., photolithography, to form openings corresponding to the plurality of first type GLSs and second type GLSs in the patterned mask layer. A suitable selective etching process, e.g., dry etch and/or wet etch, can be performed to remove portions of the upper alternating dielectric stack and the lower alternating dielectric stack exposed by the openings. The mask layer can be removed after the formation of the plurality of first type GLSs and second type GLSs.

The selective etching process can be an isotropic etching process or an anisotropic etching process. The etching ratio of the dielectric pairs can be larger than the etching ratio of the sacrificial structures 1640. Thus, during a same etching process, the etching depth of the dielectric pairs can be larger than sacrificial structures 1640. That is, in the regions without the sacrificial structures 1640, the portions of the upper alternating dielectric stack and the lower alternating dielectric stack can be completely removed during the etching process to form the first type GLS segments 2160 of the second type GLSs to expose the substrate 710, as shown in FIGS. 21A and 21B. In the region having the sacrificial structures 1640, only the portions of the upper alternating dielectric stack can be removed during the etching process to form the second type GLS segments 2270 of the second type GLSs to expose the top surface of the lower alternating dielectric stack 720, as shown in FIGS. 22A and 22B.

In some embodiments, a doped region (not shown) can be formed at a bottom of the first type GLSs and the first type GLS segments 2160 of the second type GLSs in the substrate 710 by using any suitable doping process, such as ion implantation and/or thermal diffusion through the GLS 630. The dopant in the doped region can be any suitable N+ or P+ ions.

Referring back to FIG. 6A, the method 600 can further proceed to operation S650, in which the upper alternating dielectric stack and the lower alternating dielectric stack can be transformed into an alternating conductive/dielectric stack including multiple conductive/dielectric layer pairs. In some embodiments, a gate replacement process (also known as the "word line replacement" process) can be performed to replace second dielectric layers 724 (e.g., silicon nitride) of the upper alternating dielectric stack and the lower alternating dielectric stack with conductive layers 2324.

Figure 23A:
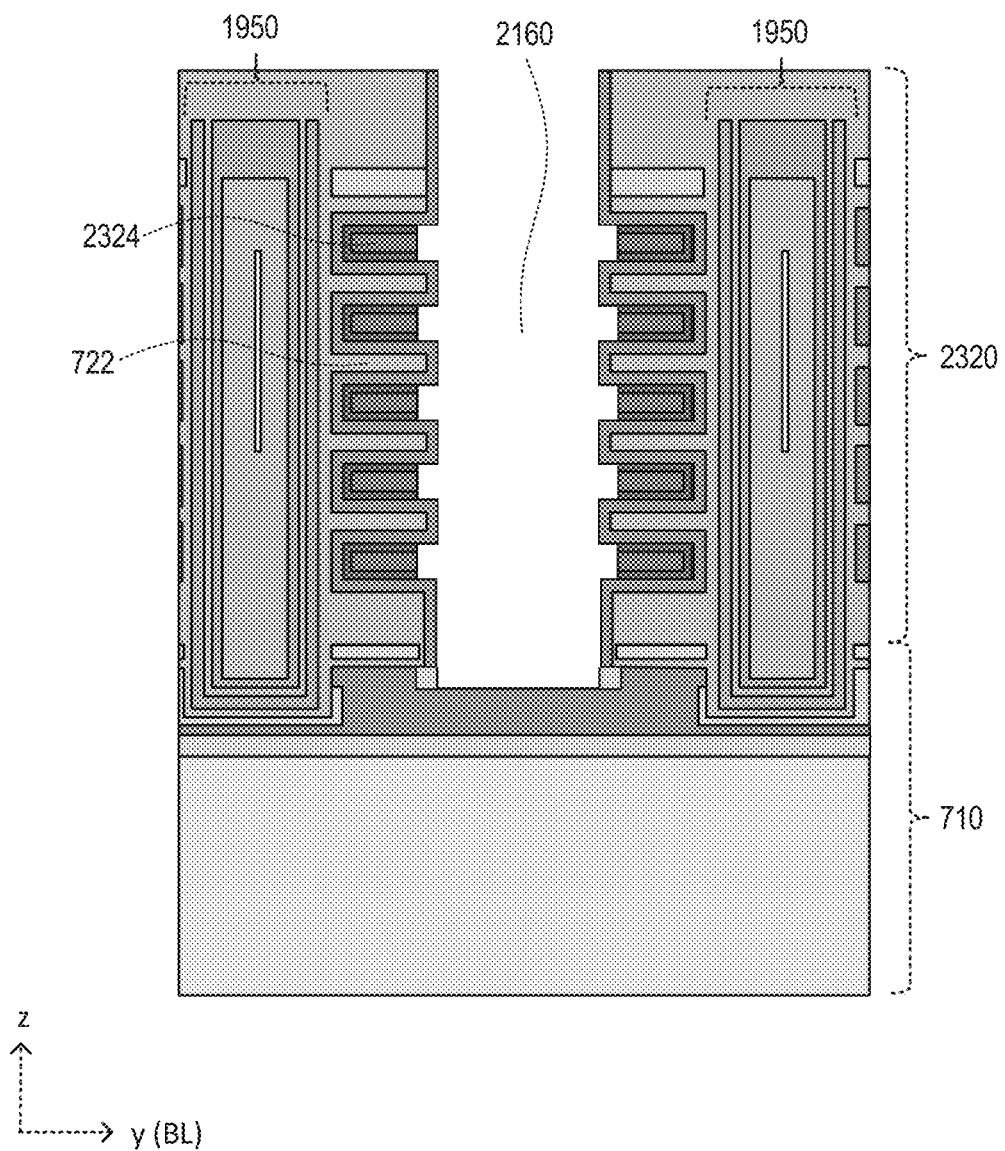
Figure 23B:
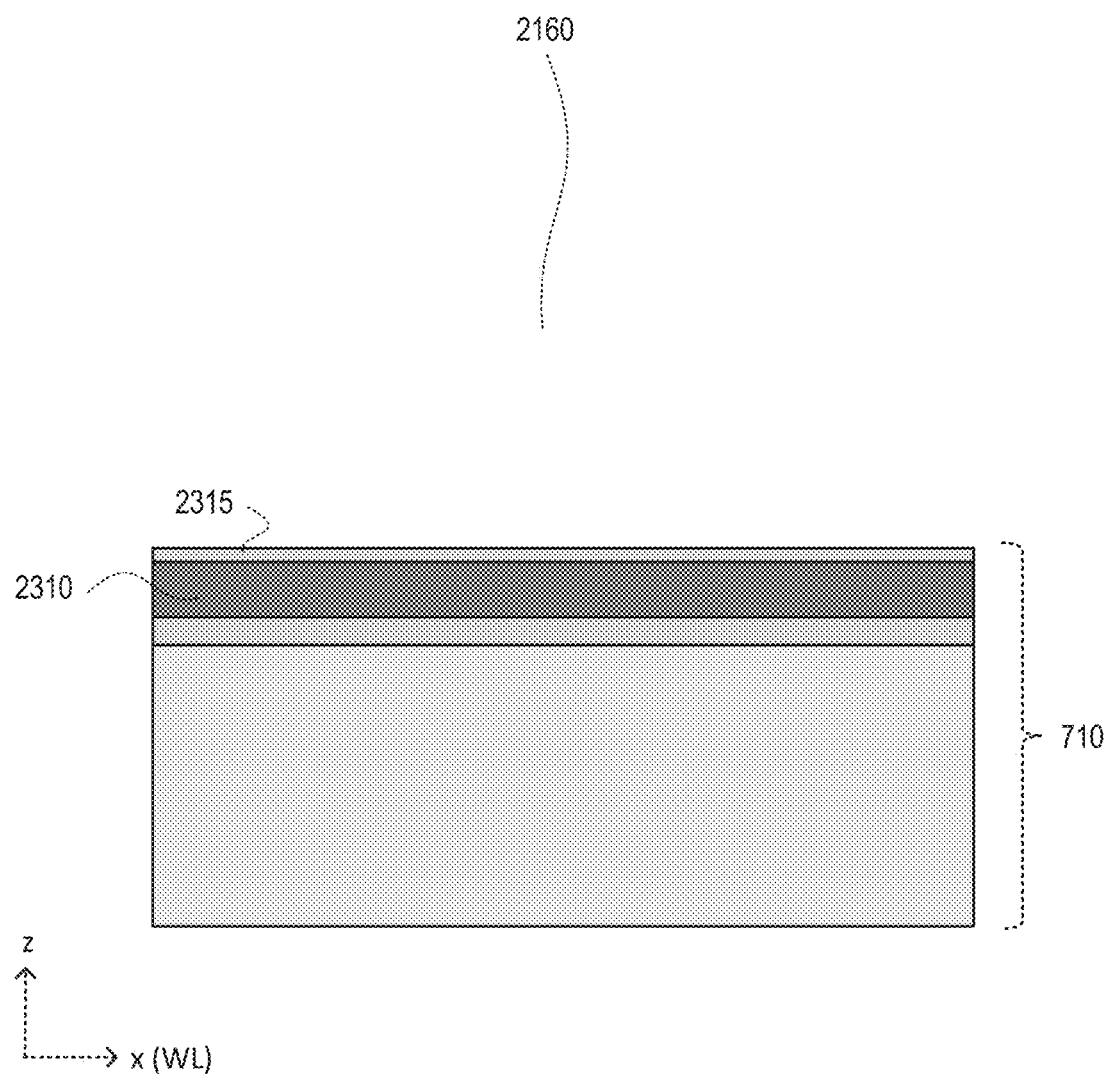
Figure 24A:
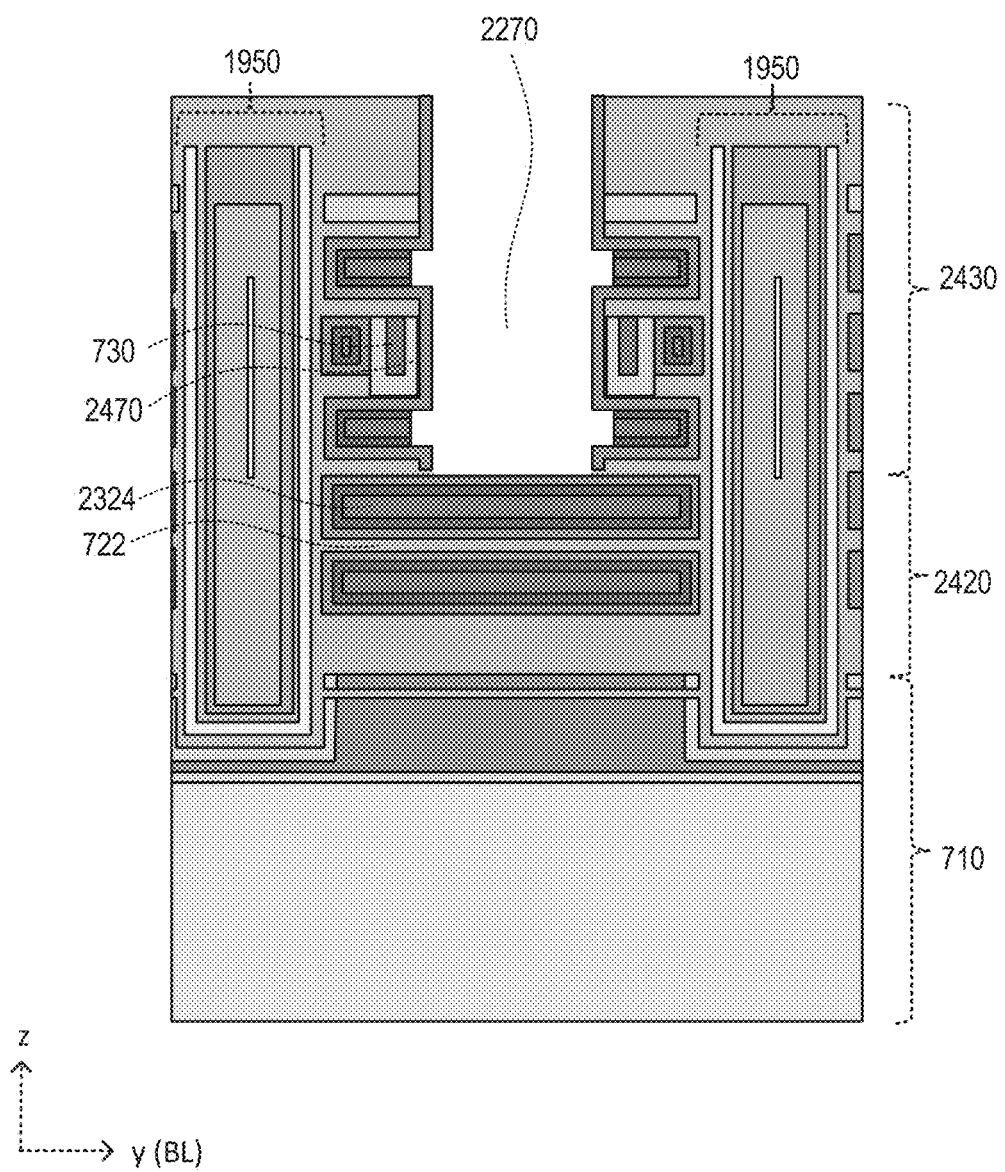
Figure 24B:
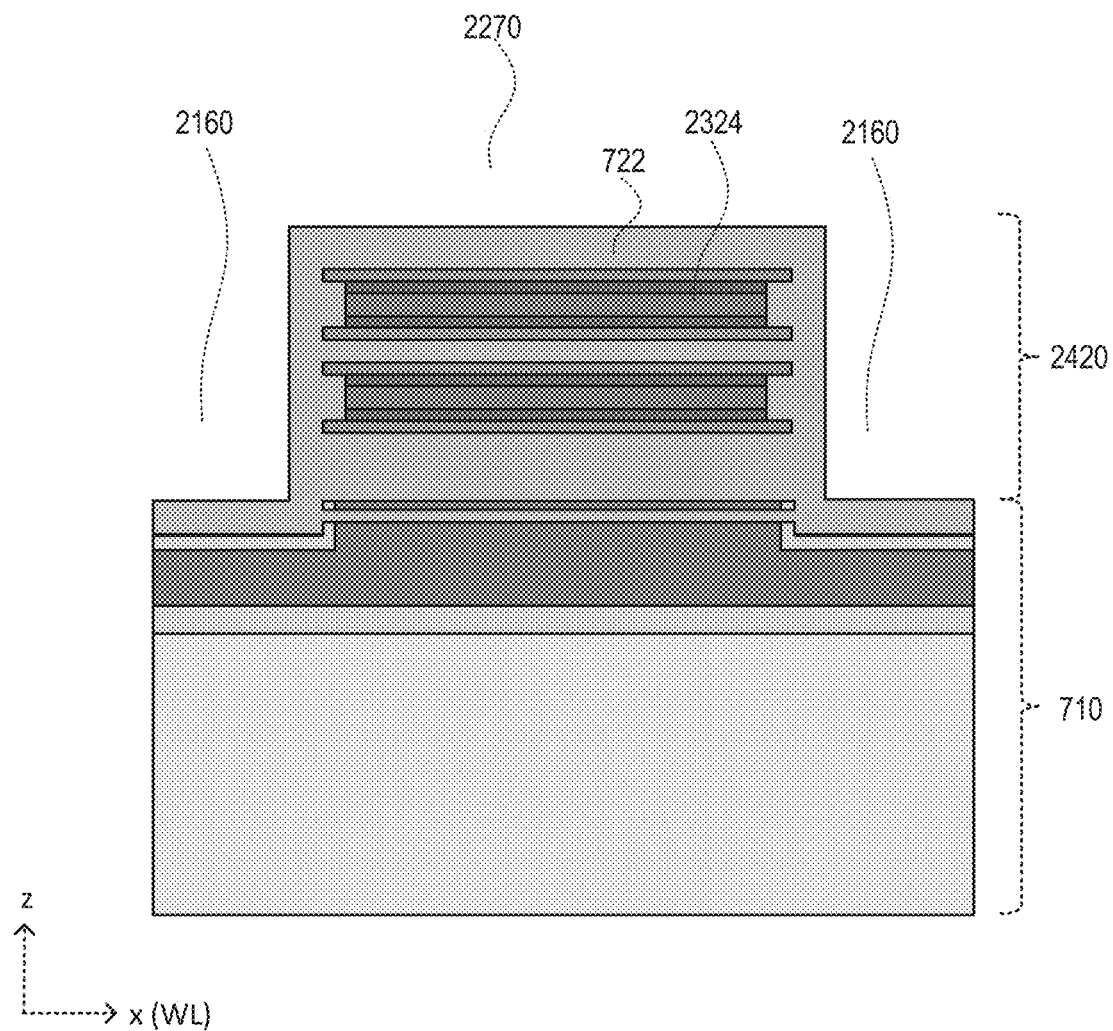

FIGS. 23A-23B and 24A-24B illustrate some portions of the 3D structure in a cross-sectional view of after operation S650. Specifically, FIGS. 23A-23B illustrate schematic diagrams of a portion of the 3D structure corresponding to the to-be-formed first type GLS portions 242 along 242-A direction and 242-B direction respectively as shown in FIG. 2, and FIGS. 24A-24B illustrate schematic diagrams of a portion of the 3D structure corresponding to the to-be-formed second type GLS portions 244 along 244-A direction and 244-B direction respectively as shown in FIG. 2, according to some embodiments.

In some embodiments, after forming the first type GLSs and the second type GLSs, an oxidation process can be performed to oxide the surface of the remaining portions of the sacrificial structures 1640 to form an oxide layer 2470, as shown in FIG. 23A. In some embodiments, in the same oxidation process, the top surface of the substrate 710 exposed by the first type GLSs and the first type GLS segments 2160 of the second type GLSs can also be oxidized to form an oxide layer 2315, as shown in FIG. 23B.

In some embodiments, the second dielectric layers 724 in the upper alternating dielectric stack 1730 and the lower alternating dielectric stack 720 can be removed through the first type GLSs and the second type GLSs to form multiple lateral trenches. The multiple lateral trenches can extend in a lateral direction, and can be used as spaces for conductive layers 2324 to be formed in a subsequent process. It is noted that, the term "lateral/laterally" used herein means a plane parallel to the surface of the substrate 710. The second dielectric layers 724 in the upper alternating dielectric stack 1730 and the lower alternating dielectric stack 720 are used as sacrificial layers, and are removed by used any suitable etching process, e.g., an isotropic dry etch or a wet etch. The etching process can have sufficiently high etching selectivity of the material of the second dielectric layers 724 over the materials of the first dielectric layer 722, such that the etching process can have minimal impact on the first dielectric layer 722. The isotropic dry etch and/or the wet etch and a following cleaning process can remove second dielectric layers 724 in various directions to expose the top and bottom surfaces of each first dielectric layer 722. As such, multiple lateral trenches can then be formed between first dielectric layers 722.

Multiple gate structures can be formed in the multiple lateral trenches. In some embodiments, each gate structure can include a conductive layer 2324 coated with one or more insulating layers. The conductive layer 2324 can be used as a word line (i.e., a gate electrode) in the 3D memory device. The one or more insulating layers coated on the conductive layer 2324 can be used as gate dielectric layers for insulating the word line (i.e., gate electrode). In some embodiments, one or more insulating layers can be formed in each of the multiple lateral trenches to cover the exposed surfaces of the lateral trenches with one or more suitable insulating materials. For example, one or more suitable deposition processes, such as CVD, PVD, and/or ALD, can be utilized to deposit the one or more insulating materials into the lateral trenches. In some embodiments, a recess etch and/or a chemical-mechanical planarization (CMP) can be used to remove excessive insulating material(s). The one or more insulating materials can include any suitable materials (e.g., high k-value dielectrics) that provide electric insulating function. For example, the one or more insulating materials can include silicon oxide, silicon nitride, silicon oxynitride, aluminum oxide, titanium nitride, etc., and/or any suitable combinations thereof. In some embodiments, multiple insulating layers can have different insulating materials.

As shown in FIGS. 23A and 24A-24B, multiple conductive layers 2324 can be formed in the multiple lateral trenches. A conductive layer 2324 can be formed in each lateral trench between the one or more insulating layers. The conductive layer 2324 can be formed by filling the lateral trenches with a suitable gate electrode metal material. The conductive layer 2324 can provide the base material for the subsequently-formed word lines (i.e., gate electrodes). The gate electrode metal material can include any suitable conductive material. e.g., tungsten, aluminum, copper, cobalt, or any combination thereof, for forming the word lines (i.e., gate electrodes). The gate electrode material can be deposited into lateral trenches using a suitable deposition method such as CVD, physical vapor deposition (PVD), plasma-enhanced CVD (PECVD), sputtering, metal-organic chemical vapor deposition (MOCVD), and/or ALD. In some embodiments, the conductive layers 2324 include tungsten formed by CVD. As such, the upper alternating dielectric stack 1730 and the lower alternating dielectric stack 720 can be transformed into an alternating conductive/dielectric stack 2320, as shown in FIG. 23A. Specifically, the upper alternating dielectric stack 1730 can be transformed into the upper alternating conductive/dielectric stack 2430, and the lower alternating dielectric stack 720 can be transformed into the lower alternating conductive/dielectric stack 2420, as shown in FIGS. 24A and 24B.

Referring back to FIG. 6A, the method 600 can proceed to operation S660, in which a plurality of first type GLS structures and second type GLS structures can be formed in the first type GLSs and second type GLSs respectively. The plurality of first type GLS structures and second type GLS structures can extend substantially in a straight line along the WL direction between two arrays of channel structures 1950. In some embodiments, each first type GLS structures can vertically penetrate the upper alternating dielectric stack and the lower alternating dielectric stack. Each second first type GLS structures can include a plurality of first type GLS portions and a plurality of second type GLS portions arranged in a staggered way along the WL direction. Each first type GLS portion can vertically penetrate the upper alternating dielectric stack and the lower alternating dielectric stack, while each second type GLS portion only vertically extends in the upper alternating dielectric stack but does not extend into the lower alternating dielectric stack.

Figure 25A:
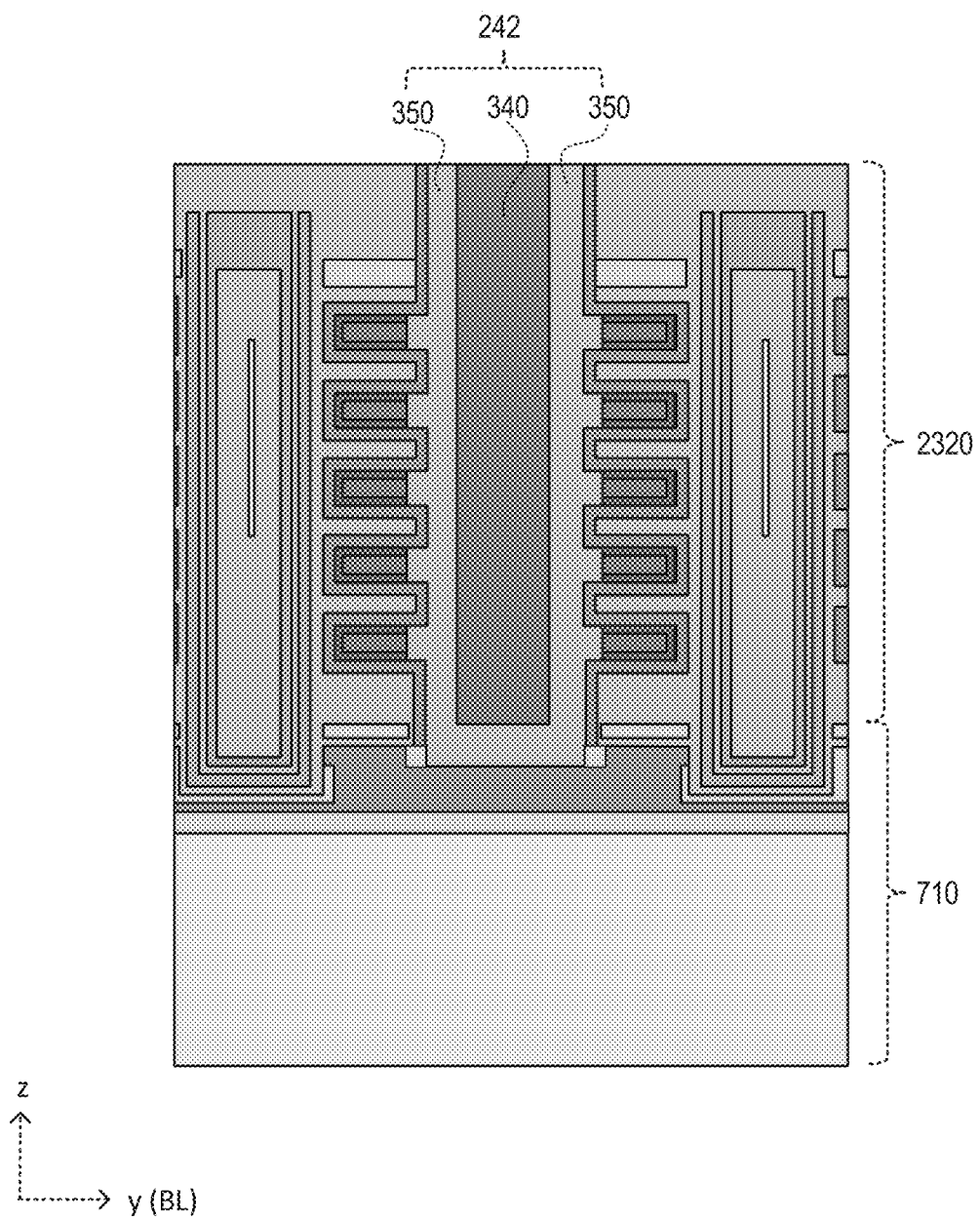
Figure 25B:
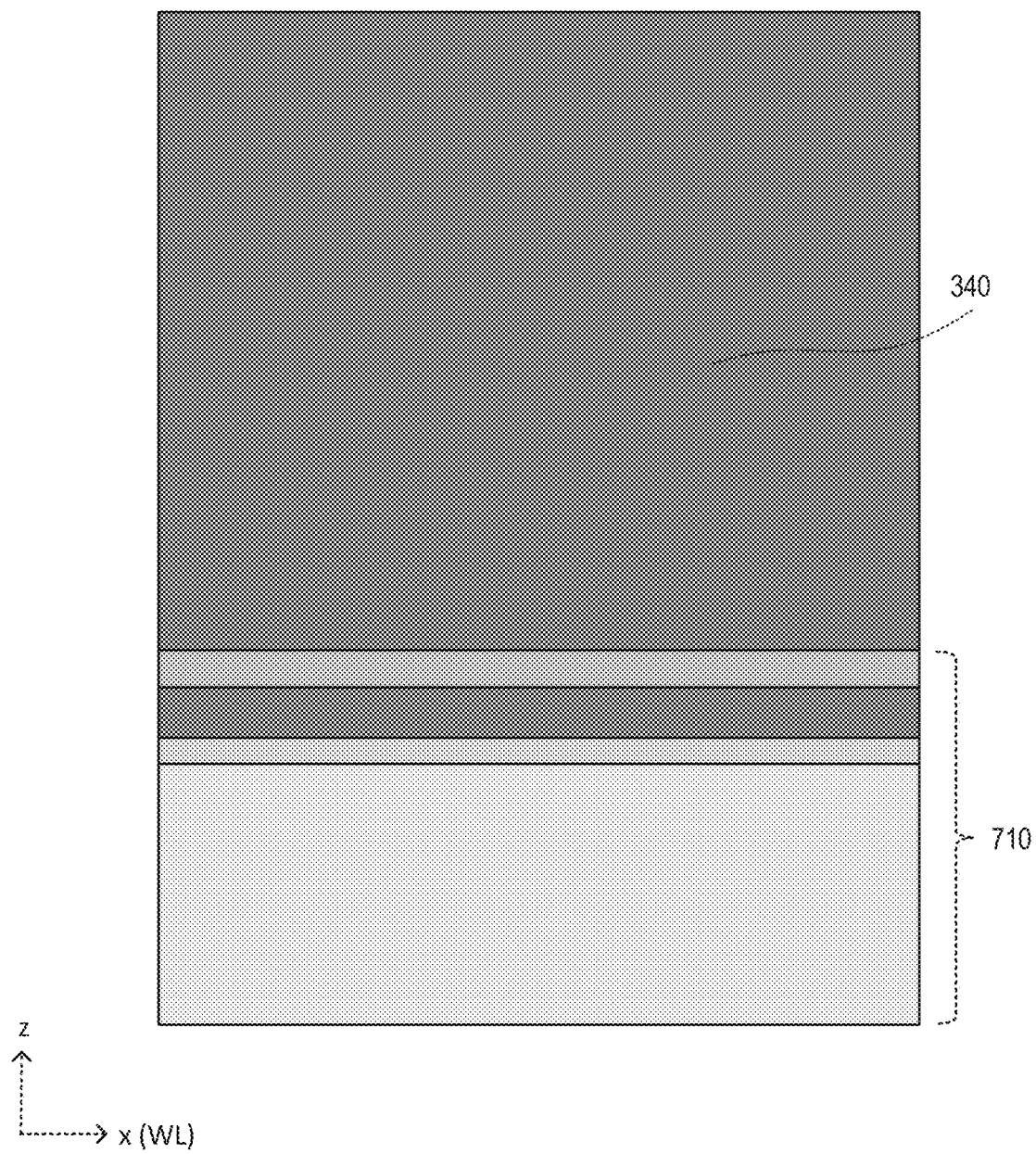

FIGS. 25A-25B and 26A-26B illustrate some portions of the 3D structure in a cross-sectional view of after operation S640. Specifically, FIGS. 25A-25B illustrate schematic diagrams of a portion of the 3D structure corresponding to the first type GLS portions 242 along 242-A direction and 242-B direction respectively as shown in FIG. 2, and FIGS. 22A-22B illustrate schematic diagrams of a portion of the 3D structure corresponding to the second type GLS portions 244 along 244-A direction and 244-B direction respectively as shown in FIG. 2, according to some embodiments.

In some embodiments, a spacer layer 350/450 can be formed on the sidewalls of the first type GLSs and the second type GLSs. The spacer layer 350/450 is also referred as a gate line spacer (GLSP) layer, and can be used to provide electrical insulation between the multiple conductive layers 2324 and a conductive wall 340/440 formed in a subsequent process. In some embodiments, the fabricating process for forming spacer layer 350/450 can include a word line gate recess process. After forming the multiple conductive layers 2324, portions of the multiple conductive layers 2324 (word lines) exposed by the first type GLSs and second type GLSs can be removed by a recess etching process. In some embodiments, in order to ensure the insulation between multiple conductive layers 2324 (word lines), a recess etching process, such as a wet etching process, can be performed to remove portions of the multiple conductive layers 2324 exposed by the first type GLSs and second type GLSs. In doing so, a recess can be formed in each lateral trench adjacent to the first type GLSs or the second type GLSs.

In some embodiments, the spacer layer 350/450 can have a laminated structure (not shown) including two or more spacer sublayers formed by using any suitable deposition processes, such as atomic layer deposition (ALD) processes. For example, the spacer layer 350/450 can include a first spacer sublayer (not shown) covering the sidewall of the first type GLSs and second type GLSs and the exposed surfaces of the multiple gate structures. The first spacer sublayer can include a low temperature oxide material, such as silicon oxide, configured to prevent the multiple conductive layers 2324 from being oxidized in the subsequent processes. The spacer layer 350/450 can further include a second spacer sublayer (not shown) to cover the first spacer sublayer. The second spacer sublayer can include a high k-value material, such as silicon nitride. Such laminated structure can efficiently increase the equivalent oxide thickness (EOT) of the spacer layer 350/450, thereby improving the isolation performance of the spacer layer 350/450.

Figure 26A:
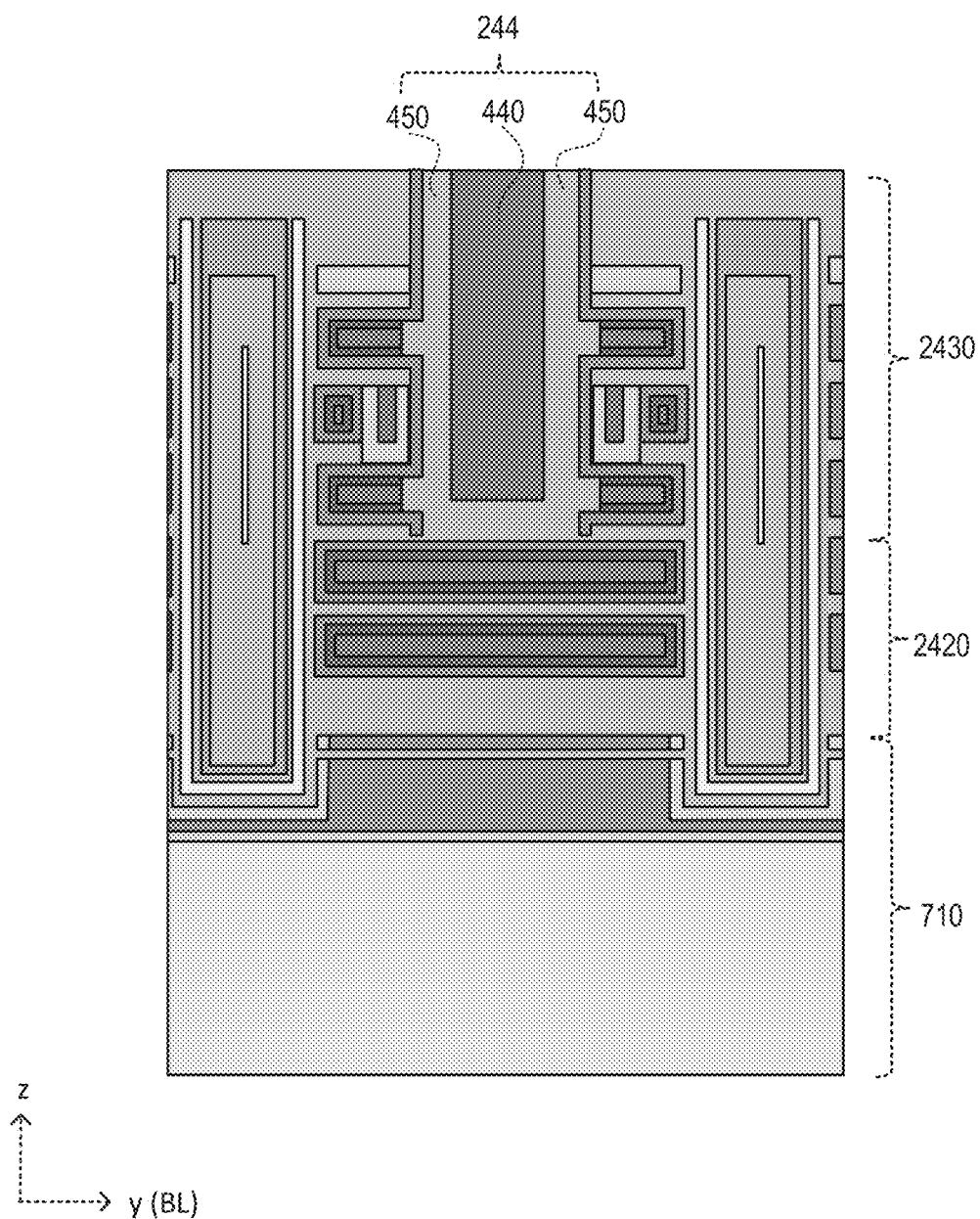
Figure 26B:
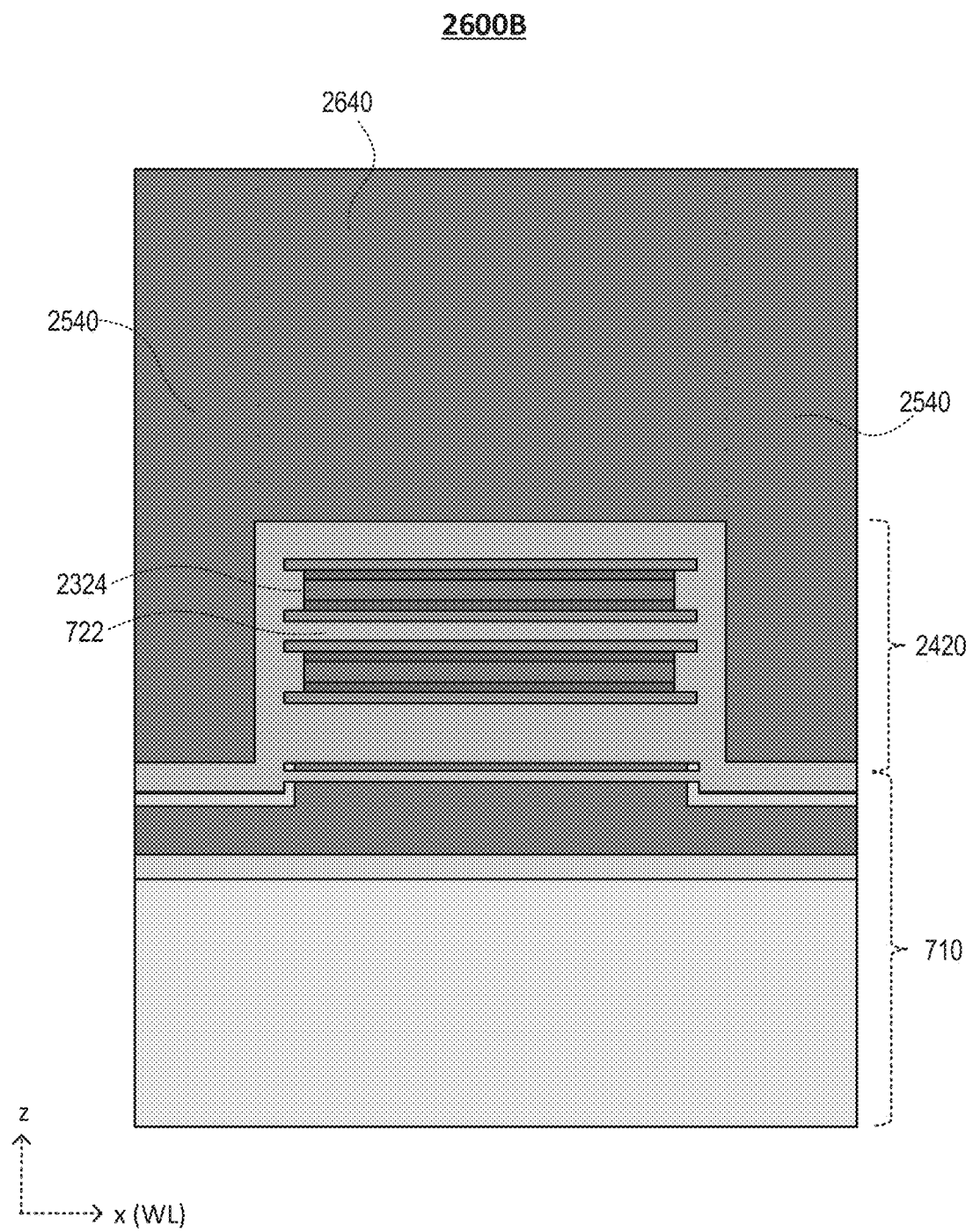

After forming the spacer layer 350/450, a conductive wall 340/440 can be formed in each of the first type GLSs and second type GLSs, and can be used as an array common source (ACS) of the multiple NAND strings. In each first type GLS structure and in each first type GLS portion of the second type GLS structure, the conductive wall 340 in the first type GLS portion 242 can penetrate the alternating conductive/dielectric stack 2320, and be in contact with the doped region (not shown) in the substrate 710, as shown in FIGS. 25A and 25B. In each second type GLS portion of the second type GLS structure, the conductive wall 440 in the second type GLS portion 244 extends vertically in upper alternating conductive/dielectric stack 2430, as shown in FIGS. 26A and 26B. The conductive wall 440 in the second type GLS portion 244 can be in contact with the conductive wall 340 in the first type GLS portion 242 along the WL direction.

In some embodiments, fabricating process for forming the conductive wall 340/440 can include depositing any suitable conductive material, such as tungsten, aluminum, copper, polysilicon, silicides, and/or combinations thereof, etc., to fill the first type GLSs and the second type GLSs by using any suitable deposition method such as CVD, physical vapor deposition (PVD), plasma-enhanced CVD (PECVD), sputtering, metal-organic chemical vapor deposition (MOCVD), and/or ALD. A following a chemical-mechanical planarization (CMP) process can be performed to planarize the top surface of the formed 3D.

Accordingly, various embodiments of 3D memory devices as shown in FIGS. 2, 3A-3B, 4A-4B, and 5A-5F, and a fabricating method as shown in FIG. 6A are disclosed. In the disclosed 3D memory devices, various segment GLS structure designs provide a plurality of first type GLS portions and a plurality of second type GLS portions arranged in a staggered way along the WL direction. In the second type GLS portions, the conductive wall extends only in an upper portion of the film stack. The remained lower portion of the film stack can connect the two adjacent memory fingers, thus increasing the stress supporting and reducing the risk of memory finger collapse. Further, the remained lower portion of the film stack can effectively acts as a widen GLS outer channel spacer, which can reduce the risk of GLS outer channel merge. Therefore, the gate line pitch can be reduced, thereby reducing the die size while keeping the same storage capacity of the 3D NAND memory device.

One aspect of the present disclosure provides a three-dimensional (3D) memory device, comprising: an alternating conductive/dielectric stack on a substrate; a plurality of channel structures in the alternating conductive/dielectric stack; a plurality of gate line slit (GLS) structures in the alternating conductive/dielectric stack, each including: a plurality of first type GLS portions penetrating the alternating conductive/dielectric stack, and a plurality of second type GLS portions in an upper portion of the alternating conductive/dielectric stack.

In some embodiments, the plurality of first type GLS portions and the plurality of second type GLS portions are arranged in staggered positions next to each other in a bit line direction.

In some embodiments, the 3D memory device further comprises a memory block including at least three memory fingers; wherein two GLS structures are located on edges of the memory block. In some embodiments, each second type GLS portion of one of the two GLS structures is aligned with another second type GLS portion of another of the two GLS structures in a bit line direction. In some embodiments, each second type GLS portion of one of the two GLS structures overlaps with a first type GLS portion of another of the two GLS structures in a bit line direction.

In some embodiments, the 3D memory device further comprises a memory block including at least three memory fingers; wherein a middle memory finger is sandwiched by two GLS structures. In some embodiments, each second type GLS portion of one of the two GLS structures is aligned with another second type GLS portion of another of the two GLS structures in a bit line direction. In some embodiments, each second type GLS portion of one of the two GLS structures overlaps with a first type GLS portion of another of the two GLS structures in a bit line direction.

In some embodiments, the 3D memory device further comprises a memory block including at least three memory fingers; wherein each memory finger is sandwiched by two GLS structures. In some embodiments, each second type GLS portion of one GLS structure overlaps with a first type GLS portion in an adjacent second type GLS structures in a bit line direction, and is aligned with another second type GLS portion in a next GLS structure in the bit line direction. In some embodiments, each second type GLS portion of one GLS structure located on an edge of the memory block overlaps with a first type GLS portion in an adjacent second type GLS structures in a bit line direction, and is aligned with another second type GLS portion in another GLS structure located on another edge of the memory block in the bit line direction.

In some embodiments, a length of the second type GLS portion along a word line direction is equal to or less than a half width of a memory finger in a bit line direction.

In some embodiments, a conductive wall in the second type GLS portion is in contact with a conductive wall in the first type GLS portion along the WL direction.

In some embodiments, each channel structures comprises: a functional layer on a sidewall of a channel hole; a dielectric filling structure in each channel hole; and a channel layer between the functional layer and the dielectric filling.

Another aspect of the present disclosure provides a method for forming a three-dimensional (3D) memory device, comprising: forming a lower alternating dielectric stack on a substrate; forming an upper alternating dielectric stack on the lower alternating dielectric stack, and forming a plurality of sacrificial structures in the upper alternating dielectric stack; forming a plurality of gate line slits (GLSs), each including: a plurality of first type GLS segments penetrating the upper alternating dielectric stack and the lower alternating dielectric stack, and a plurality of second type GLS segments in the upper alternating conductive/dielectric stack; transforming the upper alternating dielectric stack and the lower alternating dielectric stack into an alternating conductive/dielectric stack; and forming a GLS structure in each GLS.

In some embodiments, forming the plurality of GLS includes forming the plurality of first type GLS portions and the plurality of first type GLS portions in a staggered positions next to each other in a bit line direction.

In some embodiments, forming the GLS structure in each GLS including: forming a plurality of first type GLS portions in the plurality of first type GLS segments, each first type GLS portion penetrating the alternating conductive/ dielectric stack, and forming a plurality of second type GLS portions in the plurality of second type GLS segments, each second type GLS portion extends in the upper alternating conductive/dielectric stack.

In some embodiments, forming the an upper alternating dielectric stack and the plurality of sacrificial structures includes: forming one or more dielectric layer pairs on the lower alternating dielectric stack, forming a plurality of recesses in the one or more dielectric layer pairs; forming a sacrificial structure in each recess; and forming one or more additional dielectric layer pairs to cover the plurality of sacrificial structures.

In some embodiments, forming the plurality of GLSs includes: forming the plurality of first type and the plurality of second type GLS segments in a same etching process, wherein an etching ratio of the dielectric pairs is larger than an etching ratio of the sacrificial structures.

In some embodiments, the method further comprises: before forming the upper alternating dielectric stack, forming a plurality of sacrificial lower channel filling structures in the lower alternating dielectric stack; and after forming the upper alternating dielectric stack, forming a plurality of channel structures penetrating the upper alternating dielectric stack and the lower alternating dielectric stack by removing the plurality of sacrificial lower channel filling structures and portions of the upper alternating dielectric stack corresponding to the plurality of sacrificial lower channel filling structures.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A three-dimensional (3D) memory device, comprising:
an alternating conductive/dielectric stack on a substrate, wherein the alternating conductive/dielectric stack includes a first portion and a second portion relative to the substrate, and wherein the first portion is further from the substrate than the second portion;
a plurality of channel structures in the alternating conductive/dielectric stack; and
a plurality of gate line slit (GLS) structures in the alternating conductive/dielectric stack, each including:
a plurality of first type GLS portions penetrating the first portion and the second portion of the alternating conductive/dielectric stack; and
a plurality of second type GLS portions penetrating only the first portion of the alternating conductive/dielectric stack, wherein a conductive wall in a second type GLS portion of the plurality of second type GLS portions is in contact with a conductive wall in a first type GLS portion of the plurality of first type GLS portions along a word line direction.

2. The 3D memory device of claim 1, wherein the plurality of first type GLS portions and the plurality of second type GLS portions are arranged in staggered positions next to each other in a bit line direction.

3. The 3D memory device of claim 1, further including a memory block including at least three memory fingers, wherein two GLS structures are located on edges of the memory block.

4. The 3D memory device of claim 3, wherein each second type GLS portion of one of the two GLS structures is aligned with another second type GLS portion of another of the two GLS structures in a bit line direction.

5. The 3D memory device of claim 3, wherein each second type GLS portion of one of the two GLS structures overlaps with the first type GLS portion of another of the two GLS structures in a bit line direction.

6. The 3D memory device of claim 1, further including a memory block including at least three memory fingers wherein a middle memory finger is sandwiched by two GLS structures.

7. The 3D memory device of claim 6, wherein each second type GLS portion of one of the two GLS structures is aligned with another second type GLS portion of another of the two GLS structures in a bit line direction.

8. The 3D memory device of claim 6, wherein each second type GLS portion of one of the two GLS structures overlaps with the first type GLS portion of another of the two GLS structures in a bit line direction.

9. The 3D memory device of claim 1, further including a memory block including at least three memory fingers, wherein each memory finger is sandwiched by two GLS structures.

10. The 3D memory device of claim 9, wherein each second type GLS portion of one GLS structure overlaps with the first type GLS portion in an adjacent second type GLS structure in a bit line direction, and is aligned with another second type GLS portion in a next GLS structure in the bit line direction.

11. The 3D memory device of claim 9, wherein each second type GLS portion of one GLS structure located on an edge of the memory block overlaps with the first type GLS portion in an adjacent second type GLS structure in a bit line direction, and is aligned with another second type GLS portion in another GLS structure located on another edge of the memory block in the bit line direction.

12. The 3D memory device of claim 1, wherein a length of the second type GLS portion along the word line direction is equal to or less than a half width of a memory finger in a bit line direction.

13. The 3D memory device of claim 1, wherein each channel structure includes:
a functional layer on a sidewall of a channel hole;
a dielectric filling structure in the channel hole; and a channel layer between the functional layer and the dielectric filling structure.

14. A method for forming a three-dimensional (3D) memory device, comprising:
- forming a first alternating dielectric stack on a substrate;
- forming a second alternating dielectric stack on the first alternating dielectric stack, wherein the first alternating dielectric stack is closer to the substrate than the second alternating dielectric stack;
- forming a plurality of sacrificial structures in the second alternating dielectric stack;
- forming a plurality of gate line slits (GLSs), each including:
  - a plurality of first type GLS segments penetrating the second alternating dielectric stack and the first alternating dielectric stack; and
  - a plurality of second type GLS segments penetrating only the second alternating dielectric stack, wherein a conductive wall in a second type GLS portion of the plurality of second type GLS segments is in contact with a conductive wall in a first type GLS portion of the plurality of first type GLS segments along a word line direction;
- transforming the second alternating dielectric stack and the first alternating dielectric stack into an alternating conductive/dielectric stack; and
- forming a GLS structure in each GLS.

15. The method of claim 14, wherein forming the plurality of GLSs includes forming the plurality of first type GLS segments and the plurality of second type GLS segments in staggered positions next to each other in a bit line direction.

16. The method of claim 14, wherein forming the GLS structure in each GLS includes:
- forming a plurality of first type GLS portions in the plurality of first type GLS segments, each first type GLS portion penetrating the alternating conductive/dielectric stack; and
- forming a plurality of second type GLS portions in the plurality of second type GLS segments, each second type GLS portion extending only into a first alternating conductive/dielectric stack, wherein the alternating conductive/dielectric stack includes the first alternating conductive/dielectric stack and a second alternating conductive/dielectric stack, and wherein the first alternating conductive/dielectric stack is farther from the substrate than the second alternating conductive/dielectric stack.

17. The method of claim 14, wherein forming the second alternating dielectric stack and the plurality of sacrificial structures includes:
- forming one or more dielectric layer pairs on the first alternating dielectric stack;
- forming a plurality of recesses in the one or more dielectric layer pairs;
- forming a sacrificial structure in each recess; and
- forming one or more additional dielectric layer pairs to cover the plurality of sacrificial structures.

18. The method of claim 14, wherein forming the plurality of GLSs includes forming the plurality of first type GLS segments and the plurality of second type GLS segments in a same etching process, wherein an etching ratio of dielectric pairs is larger than an etching ratio of the sacrificial structures.

19. The method of claim 14, further including:
- before forming the second alternating dielectric stack, forming a plurality of sacrificial lower channel filling structures in the first alternating dielectric stack; and
- after forming the second alternating dielectric stack, forming a plurality of channel structures penetrating the second alternating dielectric stack and the first alternating dielectric stack by removing the plurality of sacrificial lower channel filling structures and portions of the second alternating dielectric stack corresponding to the plurality of sacrificial lower channel filling structures.

20. The method of claim 14, wherein a length of the second type GLS portion along the word line direction is equal to or less than a half width of a memory finger in a bit line direction.

* * * * *